(12) United States Patent
Baldwin et al.

(10) Patent No.: US 12,532,811 B2
(45) Date of Patent: Jan. 27, 2026

(54) GRAIN TRUCK FILL DETECTION

(71) Applicant: MACDON INDUSTRIES LTD, Winnipeg (CA)

(72) Inventors: John Edward Baldwin, Winnipeg (CA); Younes Rakhshani Fatmehsari, Winnipeg (CA); Perry Allan Klassen, Winnipeg (CA)

(73) Assignee: MacDon Industries Ltd., Winnipeg (CA)

( * ) Notice: Subject to any disclaimer, the term of this patent is extended or adjusted under 35 U.S.C. 154(b) by 124 days.

(21) Appl. No.: 18/382,123

(22) Filed: Oct. 20, 2023

(65) Prior Publication Data

US 2024/0130290 A1 Apr. 25, 2024
US 2024/0224871 A9 Jul. 11, 2024

Related U.S. Application Data

(60) Provisional application No. 63/417,729, filed on Oct. 20, 2022.

(51) Int. Cl.
| | | |
|---|---|---|
| *A01B 69/00* | (2006.01) | |
| *A01D 90/10* | (2006.01) | |
| *B62D 15/02* | (2006.01) | |
| *G05D 1/00* | (2006.01) | |

(Continued)

(52) U.S. Cl.
CPC ............ *A01D 90/10* (2013.01); *A01B 69/004* (2013.01); *B62D 15/025* (2013.01); *G05D 1/0234* (2013.01); *G05D 1/0287* (2013.01); *G05D 1/247* (2024.01); *G05D 9/12* (2013.01)

(58) Field of Classification Search
CPC ............ A01B 69/004; G05D 2107/21; G05D 2109/10; A01D 41/1217
See application file for complete search history.

(56) References Cited

U.S. PATENT DOCUMENTS

| | | |
|---|---|---|
| 8,626,406 B2 | 1/2014 | Schleicher et al. |
| 8,649,940 B2 | 2/2014 | Bonefas |
| 8,868,304 B2 | 10/2014 | Bonefas |

(Continued)

*Primary Examiner* — Paul J Gray
(74) *Attorney, Agent, or Firm* — Miller, Canfield, Paddock and Stone

(57) ABSTRACT

A system is provided for controlling a grain cart relative to a grain truck. The grain cart includes a grain tank and an unload auger configured to transfer crop material out of the grain tank. The grain truck includes a truck box extending from a first end to a second end. The truck box includes a top edge extending around the top of the truck box. The system comprises a ranging device and a controller. The ranging device is configured to identify a distance to the top edge of the truck box and identify a distance to an area in the truck box. The controller is configured to determine a position of the grain cart relative to the grain truck, and determine whether the grain cart is positioned near the first end of the truck box. If the controller determines that the grain cart is positioned near the first end of the truck box, the controller is configured to determine a fill level in the area based on the distance to the top edge of the truck box and the distance to the area in the truck box, determine whether the fill level exceeds a threshold, and if the controller determines that the fill level does not exceed the threshold, the controller is configured to start the unload auger.

10 Claims, 39 Drawing Sheets

(51) Int. Cl.
*G05D 1/247* (2024.01)
*G05D 9/12* (2006.01)

(56) References Cited

U.S. PATENT DOCUMENTS

| | | |
|---|---|---|
| 9,119,342 B2 | 9/2015 | Bonefas |
| 10,028,442 B1 | 7/2018 | Crosby |
| 10,966,369 B2 | 4/2021 | Suleman |
| 11,188,098 B2 | 11/2021 | Desai et al. |
| 11,399,462 B2 | 8/2022 | Suleman |
| 2012/0085458 A1 | 4/2012 | Wenzel |
| 2012/0087771 A1 | 4/2012 | Wenzel |
| 2012/0215394 A1 | 8/2012 | Wang et al. |
| 2013/0019580 A1 | 1/2013 | Anderson et al. |
| 2014/0032035 A1 | 1/2014 | Thomson |
| 2015/0362922 A1 | 12/2015 | Dollinger et al. |
| 2015/0366134 A1 | 12/2015 | Dollinger et al. |
| 2018/0053406 A1 | 2/2018 | Kawamata et al. |
| 2020/0315097 A1 | 10/2020 | Desai et al. |
| 2020/0319632 A1 | 10/2020 | Desai et al. |
| 2022/0011444 A1* | 1/2022 | Eichhorn .............. G05D 1/0297 |
| 2022/0015290 A1* | 1/2022 | Yao ...................... A01D 41/127 |
| 2022/0121861 A1 | 4/2022 | Mugnai et al. |

* cited by examiner

GRAIN TRUCK FILL DETECTION

CROSS-REFERENCE TO RELATED APPLICATIONS

This application claims priority to U.S. provisional patent application No. 63/417,729, filed Oct. 20, 2022, which is incorporated herein by reference.

BACKGROUND OF THE INVENTION

1. Field of the Invention

The present invention relates generally to systems and methods for autonomously controlling grain carts.

2. Description of Related Art

A harvester gathers and processes crop material from a field. The harvester transfers the crop material to a grain cart either continuously, such as with a forage harvester, or after intermediate storage, as with a combine harvester. In either case, during the transfer, the grain cart operator controls the position of the grain cart to accurately maintain the relative distance between the two vehicles so that the unload auger on the combine remains directly over the grain cart tank. After the grain cart is sufficiently full, the grain cart operator drives the grain cart to a grain truck zone and pulls it alongside a grain truck in order to unload the crop material from the grain cart into the grain truck. The grain trucks used can vary between producers, and each producer may have several different truck types (e.g., tandem trucks, semi-trailers, super Bs, etc.). Different grain trucks have different load requirements and may require a different sequence of loading for best weight distribution within the truck. For example, tandem trucks should be loaded over the rear axle first, and a semi-trailer should be loaded over the 5$^{th}$ wheel hitch first. Grain cart operators generally understand each truck/trailer and can identify how best to load it.

Grain cart operation requires the operator to control the unloading process into the grain truck so that the truck is full, but not overfull so that the truck does not spill any of the crop material when it transports it away from the field. To do so, the operator visually watches the fill level and moves the cart when the pile of crop material reaches the top of the container walls. The operator also needs to visually check if the grain tarp on the grain truck is open, and if the grain truck already has a previous load or is full. Determining how much to fill in the truck is up to the operator's discretion, and the drivers sometimes estimate the fill volume to try to get an appropriate total fill weight.

Operator control of the grain cart is a difficult task because the grain cart operator must monitor many functions of the grain cart to keep it operating efficiently and effectively. It is desirable to automate the operation of grain carts to reduce operation contribution, and thus, operator error.

SUMMARY OF THE INVENTION

According to one aspect of the invention, a system is provided for controlling a grain cart relative to a grain truck. The grain cart includes a grain tank and an unload auger configured to transfer crop material out of the grain tank. The grain truck includes a truck box extending from a first end to a second end. The truck box includes a top edge extending around the top of the truck box. The system comprises a ranging device and a controller. The ranging device is configured to identify a distance to the top edge of the truck box and identify a distance to an area in the truck box. The controller is configured to determine a position of the grain cart relative to the grain truck, and determine whether the grain cart is positioned near the first end of the truck box. If the controller determines that the grain cart is positioned near the first end of the truck box, the controller is configured to determine a fill level in the area based on the distance to the top edge of the truck box and the distance to the area in the truck box, determine whether the fill level exceeds a threshold, and if the controller determines that the fill level does not exceed the threshold, the controller is configured to start the unload auger.

According to another aspect of the invention, a system is provided for controlling a grain cart relative to a grain truck. The grain cart includes a grain tank and an unload auger configured to transfer crop material out of the grain tank. The grain truck includes a truck box extending from a first end to a second end. The truck box includes a top edge extending around the top of the truck box. The system comprises a ranging device and a controller. The ranging device is configured to identify a distance to the top edge of the truck box and identify a distance to an area in the truck box. The controller is configured to identify a configuration of the grain truck, determine a fill strategy based on the configuration of the grain truck, drive the grain cart to the first or the second end of the truck box based on the fill strategy, determine a fill level in the area based on the distance to the top edge of the truck box and the distance to the area in the truck box, and determine whether the fill level exceeds a threshold. If the controller determines that the fill level does not exceed the threshold, the controller is configured to start the unload auger.

According to another aspect of the invention, a method is provided for controlling a grain cart relative to a grain truck. The grain cart includes a grain tank and an unload auger configured to transfer crop material out of the grain tank. The grain truck includes a truck box extending from a first end to a second end. The truck box includes a top edge extending around the top of the truck box. The method comprises the steps of identifying a distance to the top edge of the truck box, identifying a distance to an area in the truck box, determining a position of the grain cart relative to the grain truck, and determining whether the grain cart is positioned near the first end of the truck box. if it is determined that the grain cart is positioned near the first end of the truck box, the method includes the steps of determining a fill level in the area based on the distance to the top edge of the truck box and the distance to the area in the truck box, determining whether the fill level exceeds a threshold, and if it is determined that the fill level does not exceed the threshold, starting the unload auger.

According to another aspect of the invention, a method is provided for controlling a grain cart relative to a grain truck. The grain cart includes a grain tank and an unload auger configured to transfer crop material out of the grain tank. The grain truck includes a truck box extending from a first end to a second end. The truck box includes a top edge extending around the top of the truck box. The method comprises the steps of identifying a distance to the top edge of the truck box, identifying a distance to an area in the truck box, identifying a configuration of the grain truck, determining a fill strategy based on the configuration of the grain truck, driving the grain cart to the first or the second end of the truck box based on the fill strategy, determining a fill level in the area based on the distance to the top edge of the truck box and the distance to the area in the truck box, determining whether the fill level exceeds a threshold, and if it is determined that the fill level does not exceed the threshold, starting the unload auger.

BRIEF DESCRIPTION OF THE DRAWINGS

Advantages of the present disclosure will be readily appreciated as the same becomes better understood by reference to the following detailed description when considered in connection with the accompanying drawings, wherein.

DETAILED DESCRIPTION OF THE EMBODIMENTS

Figure 1:
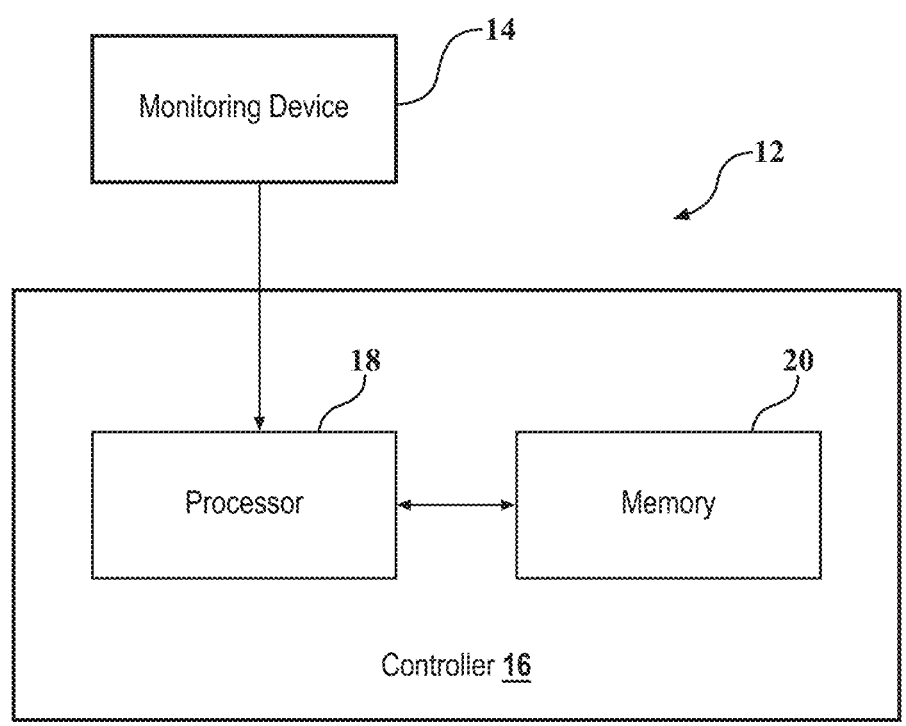
FIG. 1 illustrates an exemplary system for controlling the operation of a grain cart according to the embodiments of the present invention.

The present invention relates to systems and methods for autonomously controlling the operation of a grain cart 10. FIG. 1 illustrates an exemplary system 12 for controlling the operation of the grain cart 10. The grain cart system 12 includes one or more monitoring devices 14 and a controller 16. The monitoring devices 14 include perception devices, such as a camera, and scanning or ranging devices, such as lidar, radar or stereo cameras to monitor various operations of the grain cart 10. The controller 16 includes a processor 18 and memory 20. The processor 18 processes the information from the monitoring devices 14, and the controller 16 controls the operation of the grain cart 10.

Figure 2:
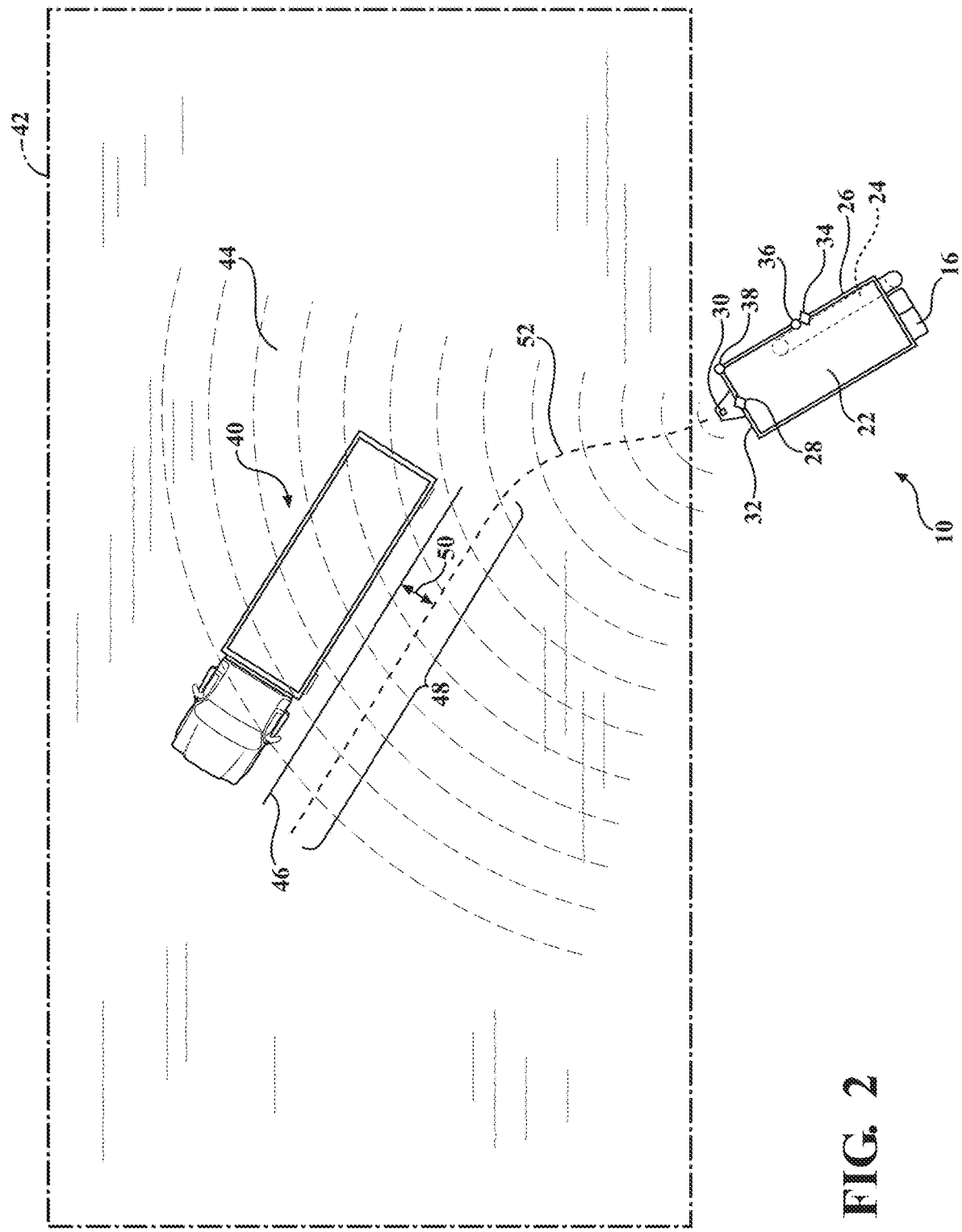
FIG. 2 is a top view of a grain cart moving toward a grain truck according to one implementation of the present invention.
Figure 6:
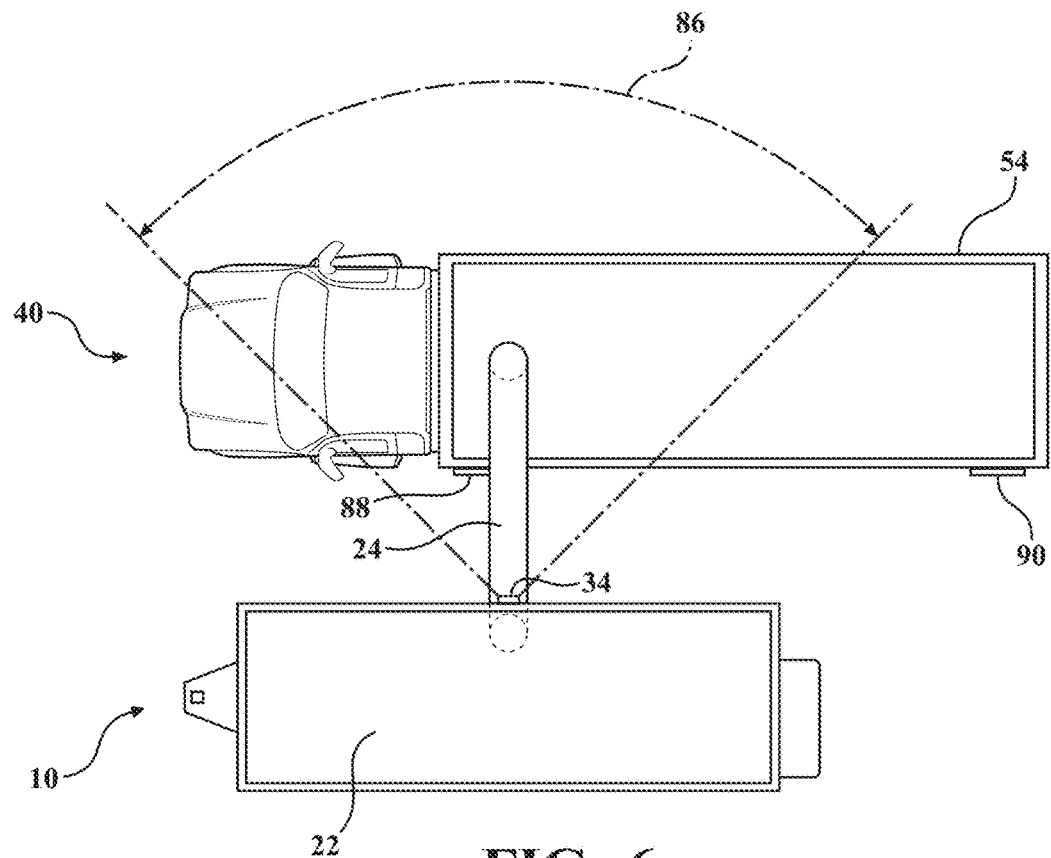
FIG. 6 is a top view of a grain cart aligned with a grain truck according to one implementation of the present invention.

Referring to FIG. 2, the grain cart 10 includes a grain cart tank 22 and an unload auger 24 on one side 26 of the grain cart 10. In FIG. 2, the unload auger 24 is depicted in a storage position along the side wall 26 of the grain cart 10. When extended, as illustrated in FIG. 6, the unload auger 24 transfers grain from the grain cart tank 22 into a receptacle, such as a truck box 54. Returning to FIG. 2, the grain cart 10 includes a camera 28 and lidar 30 on the front 32 of the cart 10. The grain cart 10 also includes a camera 34 and lidar 36 on the side 26 of the cart 10 that includes the unload auger 24. The grain cart 10 may also include a corner lidar 38 on the front corner of the grain cart 10 toward the side 26 of the cart 10 that includes the unload auger 24. It will be understood that the locations of the cameras 28, 34 and lidars 30, 36, 38 on the grain cart 10 may vary without departing from the scope of the present invention.

Figure 3:
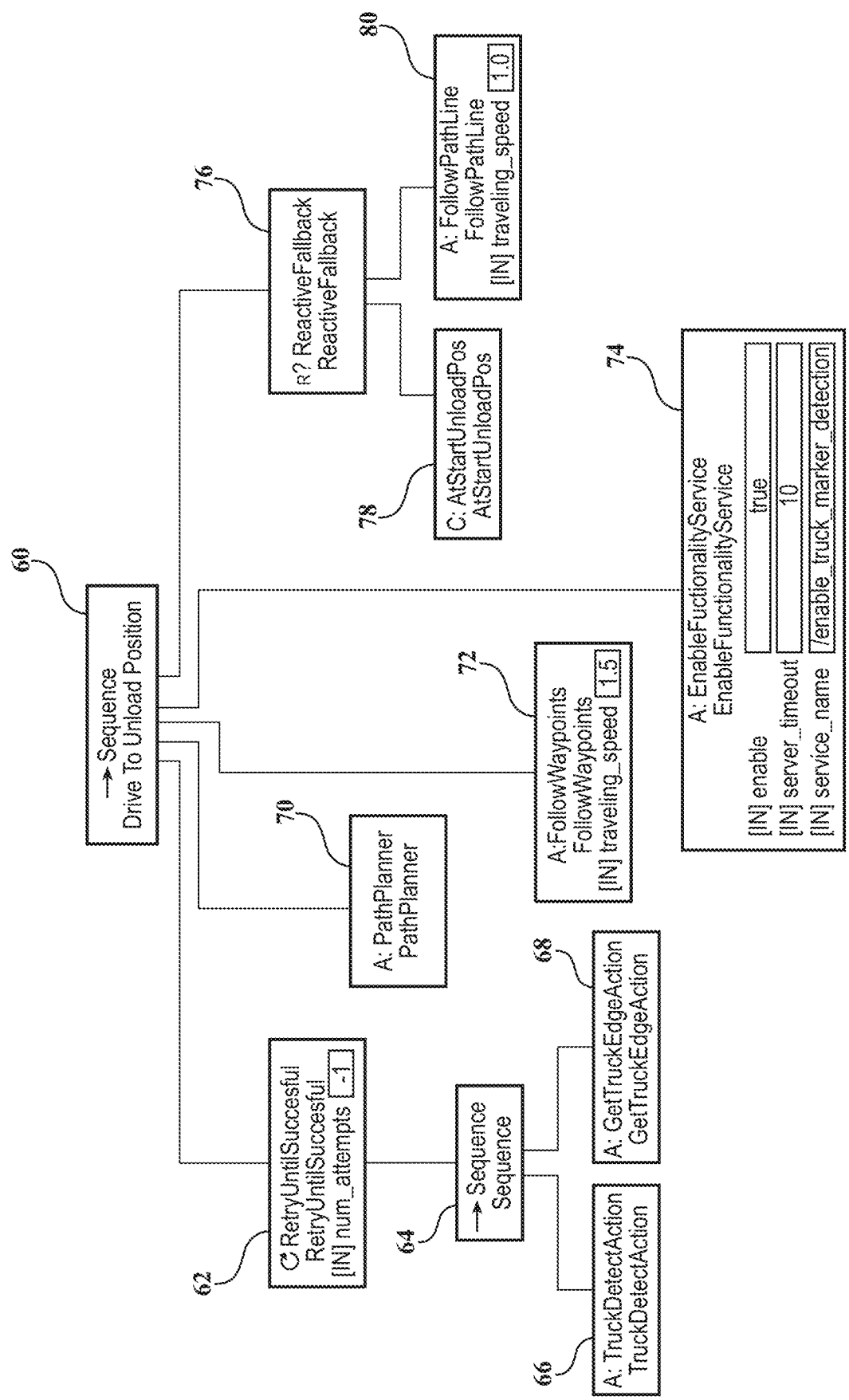
FIG. 3 is a behavior tree illustrating a method for detecting and approaching a grain truck according to one implementation of the present invention.
Figure 4:
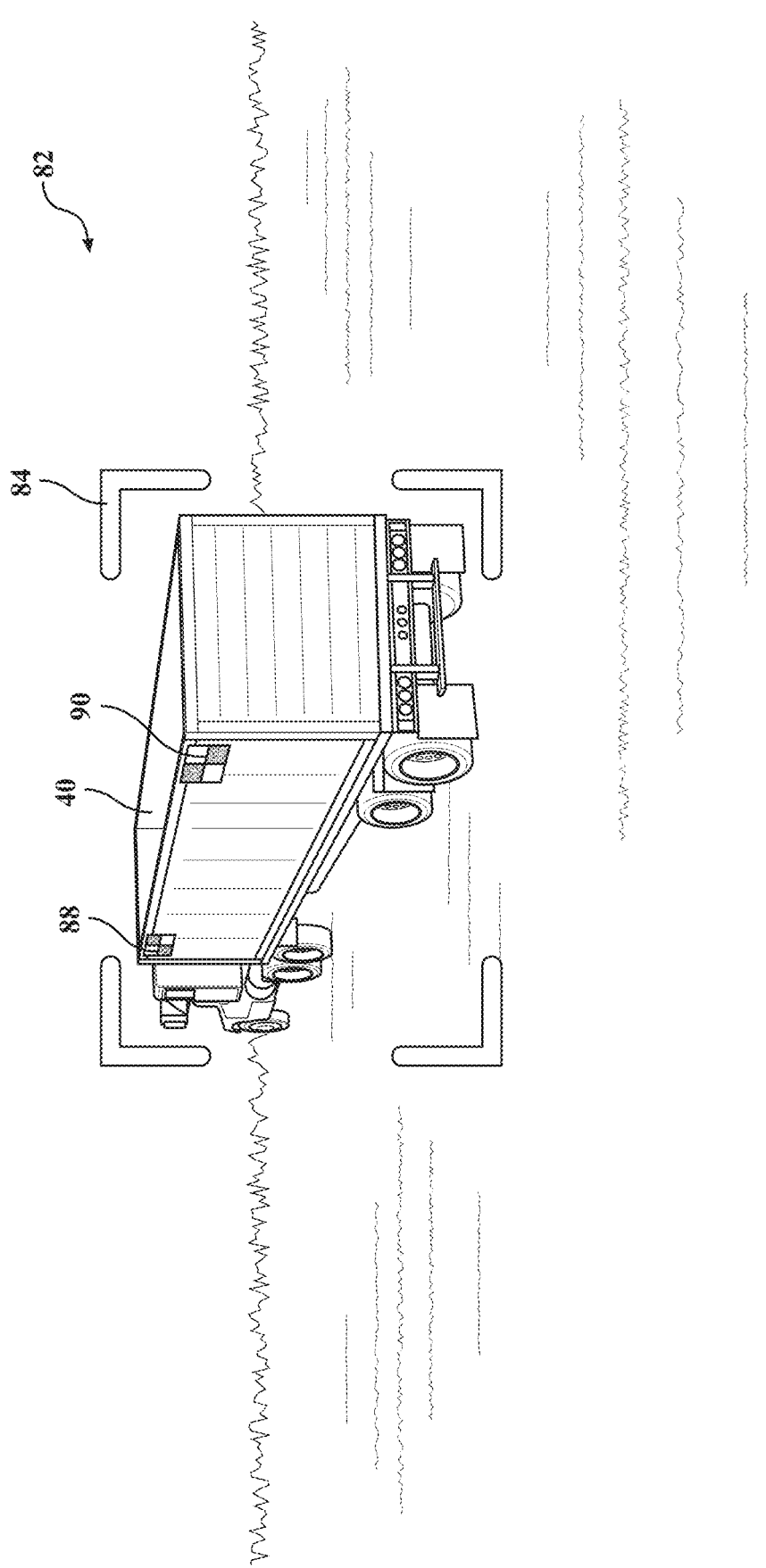
FIG. 4 illustrates an exemplary image obtained by an imaging device on the grain cart according to one implementation of the present invention.

FIGS. 2-15 relate to systems and methods for grain truck detection and localization, according to one embodiment of the present invention. Referring to FIG. 2, when the grain cart 10 is ready to unload crop material into a grain truck 40, the controller 16 drives the grain cart 10 toward an area in which the grain truck 40 is expected to be parked, such as a truck zone 42, and initiates a process for detecting and approaching the grain truck 40. FIG. 3 illustrates a method 60 performed by the system 12 for detecting and approaching the grain truck 40. Referring to FIGS. 2-4, the front camera 28 on the grain cart 10 obtains images 82 of the truck zone 42 as the grain cart 10 approaches the truck zone 42 or after the grain cart 10 is parked at the edge of the truck zone 42. The system 12 uses the images 82 from the camera 28 to run an object classification algorithm, such as YOLO v4, until it recognizes an object 84. After recognizing the object 84, the controller 16 starts a truck identification sequence (step 64, FIG. 3). If the system 12 detects a grain truck 40 in the truck zone 42 (step 66, FIG. 3), the system 12 runs an algorithm to determine the coordinates and orientation of that grain truck 40 (step 68, FIG. 3).

Referring to FIG. 2, the system 12 uses the lidar 30 on the front 32 of the grain cart 10 to scan an area 44 in front of the grain cart 10 and detect the position of the grain truck 40 relative to the grain cart 10. To reduce false positives from objects in the area that are not the grain truck 40, the camera 28 and lidar 30 viewpoints are correlated so that the lidar 30 only returns the position of objects that are in the same view or area as the grain truck 40 that has been detected using the camera 28. The system 12 then uses the lidar data to extract the position of the truck edge 46 (step 68). This process 64 returns a line that is the length of the grain truck 40 and positioned along the length of the grain truck 40.

After the system 12 determines the truck edge 46 (step 62), the system 12 creates a goal path 48 that is offset by a given distance 50 from the edge 46 of the grain truck 40 to position the grain cart 10 roughly at the proper distance from the grain truck 40 for the unload auger 24 to be centered in the grain truck box 54. Using the goal path 48 as an ultimate target, the system 12 plans a path 52 to get from the current position of the grain cart 10 to a goal point 100 where the grain cart 10 is aligned with the truck edge 46 (step 70) and ready to travel along the goal path 48. The controller 16 then drives the grain cart 10 along the planned path 52 to position the grain cart 10 at the goal point 100 (step 72).

Figure 5:
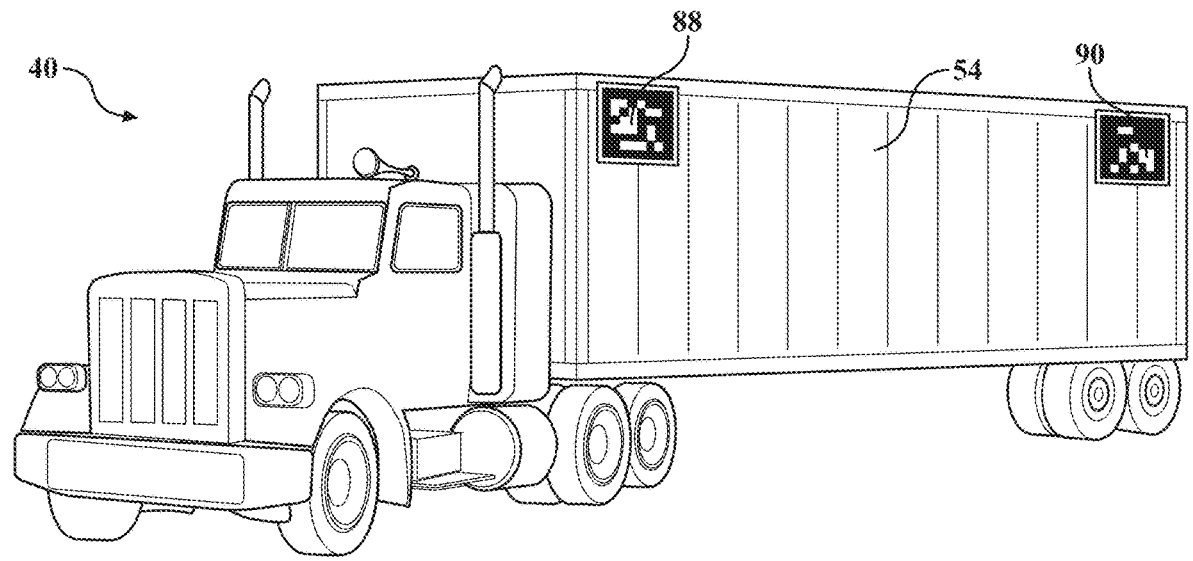
FIG. 5 is a perspective view of a grain truck with markers according to one implementation of the present invention.

The system 10 then enables truck marker detection by turning on the camera 34 on the side 26 of the grain cart 10 (step 74). Referring to FIGS. 4 and 5, the system 12 uses markers 88, 90, such as ArUco markers, positioned on the front and back of the truck box 54 to determine when the grain cart 10 is in the correct position relative to the grain truck 40. Other methods could be used to determine when the grain cart 10 is in the correct position, such as LIDAR or object detection with a camera.

Referring to FIG. 6, when the grain cart 10 is parked next to the grain truck 40, the markers 88, 90 are in the field of view 86 of the camera 34. The system 12 then checks the position of the ArUco marker 88, 90 relative to the camera image (step 78). If the marker 88, 90 indicating that the grain cart 10 is in the correct start position is detected in the correct position of the image, the task is returned as a success, and the grain cart 10 will stop (step 76). If the marker 88, 90 is not detected, the grain cart 10 will travel along continue the goal path 48 until it detects the marker 88, 90 indicating that the grain cart 10 is in the correct start position (step 80). Other methods could be used to determine when the grain cart 10 is in the correct position, such as LIDAR or object detection with a camera.

FIGS. 7-15 provide additional details regarding how the system 12 extracts the truck line 46 (i.e., the edge of the grain truck 40) from the lidar 30 and determines the position of the path line 48 (i.e., the goal path). Initially, the system 12 filters the data from the lidar 30. For example, if the lidar 30 is a 2D lidar with 270 degrees field of view (FOV), the system 12 removes data at the beginning and the end of the data points (e.g., the first 45 and the last 45 data points) since those data points may include the body of the grain cart 10 itself as a result of the wide FOV. The system 12 also removes infinite values. The system 12 converts the polar coordinates from the lidar 30 into cartesian coordinates and fits a line onto these points in order to determine the truck line 46. For example, a Huber regressor may be used to fit a first order model to the data points and derive the truck line 46:

$$y = m * x + b.$$

Alternatively, since the regressor does not work well if the line is close to a perpendicular line, the system 12 may initially determine the standard deviation of the x values, and if the system 12 determines that the standard deviation is a small value (e.g., if the standard deviation is less than 1.0), the system 12 may switch the x and y data before deriving the truck line 46. In this case, the truck line 46 is:

$$y=(1/m)*x+(-b/m).$$

The system 12 then determines the path line 48, which is the line along which the grain cart 10 travels to unload the crop material. The path line 48 is parallel to the truck line 46. Thus, the path line 48 has the same slope as the truck line 46, but a different bias value. Assuming that d represents the distance 50 between the truck line 46 and the path line 48, the path line 48 can be represented by:

$$Y=m*x+b', \text{ where } b'=b-d*\text{sqrt}(1+m\textasciicircum 2).$$

Figure 7:
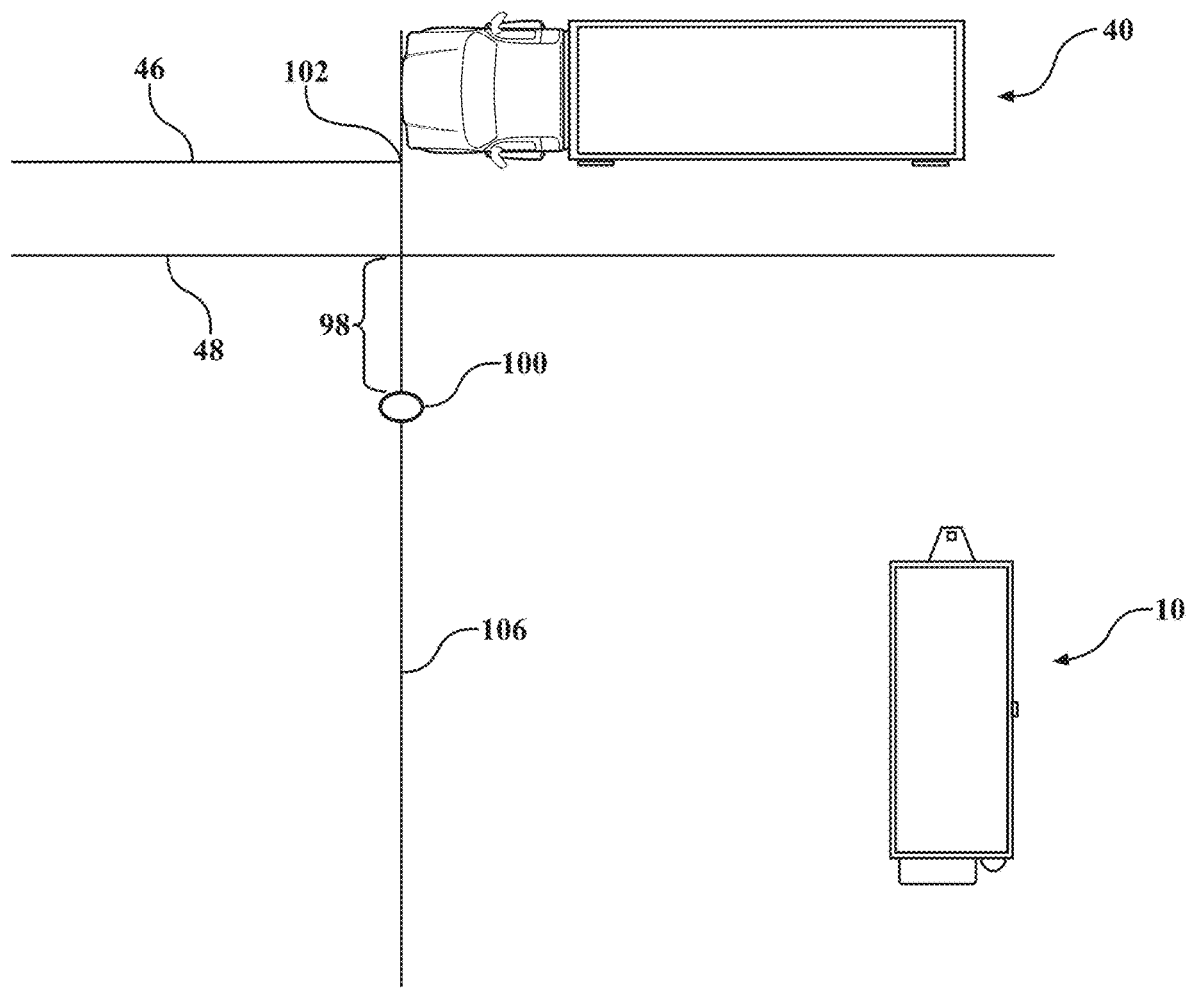
FIG. 7 is a top view of a grain cart positioned relative to grain truck according to one implementation of the present invention.
Figure 8:
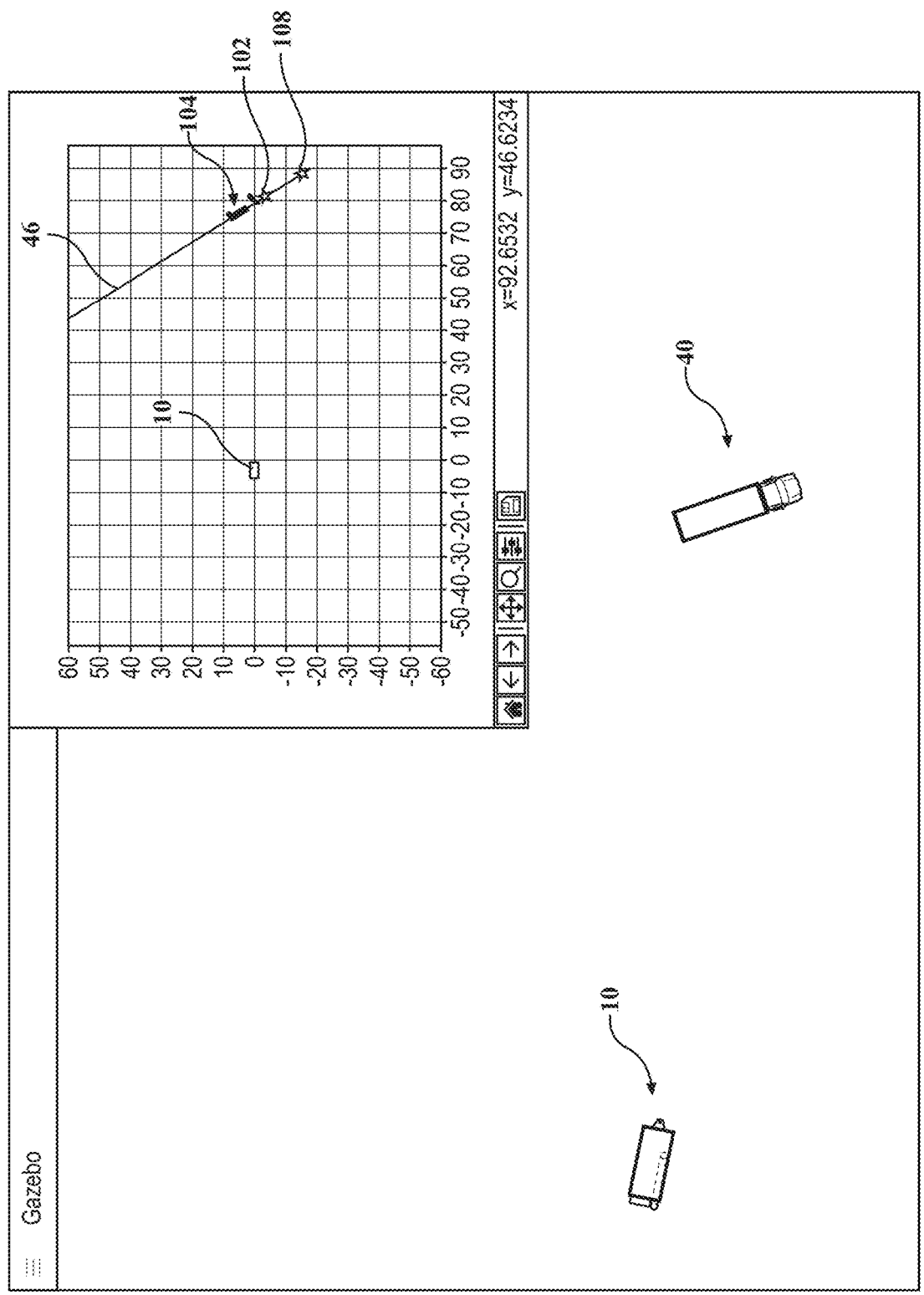
FIG. 8 illustrates a process for planning a path from a grain cart to a grain truck according to one implementation of the present invention.

Referring to FIGS. 7 and 8, after determining the truck line 46 and the path line 48, the system 12 determines the goal point 100, which the initial target position for the grain cart 10. To determine the goal point 100, the system 12 initially determines the end point 102 of the grain truck 40 by checking the lidar points 104 from left to right, and selecting the first one that is close to the fitted truck line 46. The system 12 then calculates the line perpendicular 106 to the truck line 46 going through the end point 102. The goal point 100 is at a distance that is a predetermined offset value 98 away from the end point 102 along the perpendicular line 106.

If the position of the grain cart 10 relative to the grain truck 40 requires the grain cart 10 to make a very sharp turn to get to the path line 48, the system 12 may select an offset point 108 that is a set distance (e.g., 15 meters) from the truck end 102 along the truck line 46, and find a goal point 100 on the offset perpendicular line 110. FIG. 8 illustrates the lidar points 104 that hit the grain truck 40, the rear end point 102 of the grain truck 40, and the offset point 108 that is a set distance away from the rear end point 102 of the truck 40.

Figure 9:
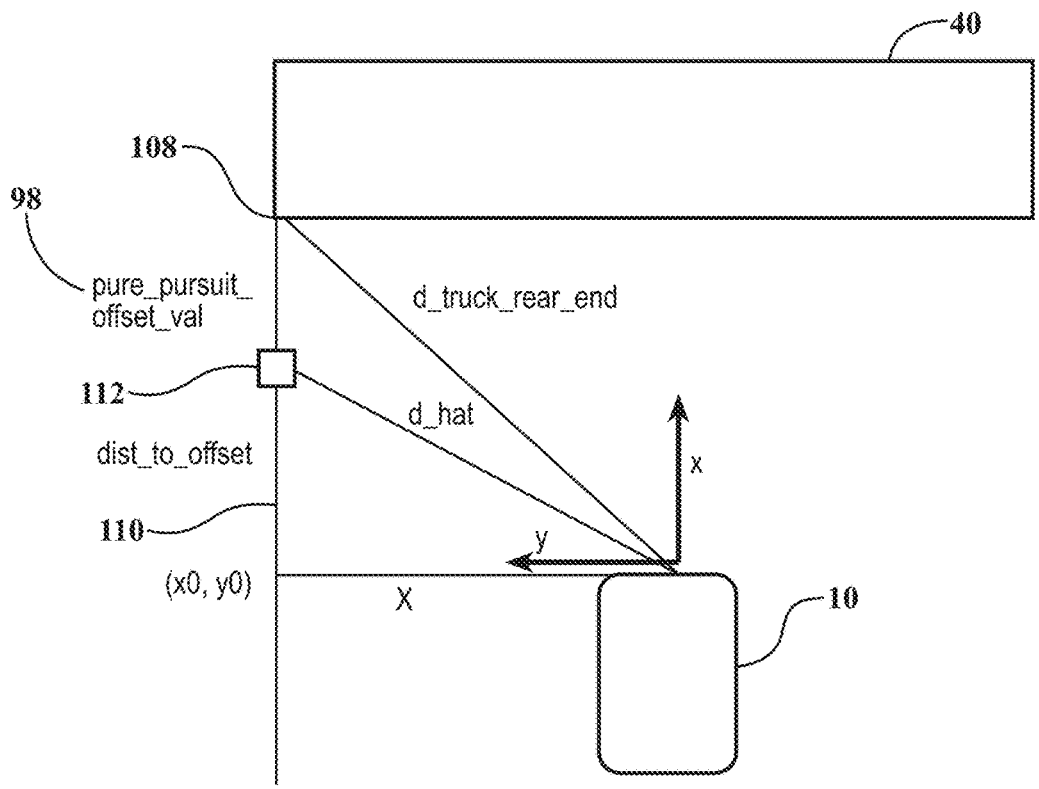
FIG. 9 illustrates a process for planning a path from a grain cart to a grain truck according to one implementation of the present invention.

Referring to FIG. 9, the system 12 can determine the distance from the origin (i.e., the lidar 30 at the front 32 of the grain cart 10) to the offset perpendicular line 110 (X). If the distance from the closest point (x0, y0) on the offset perpendicular line 110 to the offset point 108 of the grain truck 40 is less than the predetermined offset value 98, then the system 10 sets the predetermined offset value 98 to 75% of this distance.

The system 12 can use the values for the distance between the lidar 30 and the offset point 108 (d_truck_rear_end), predetermined offset value 98 (pure_pursuit_offset_val) and the distance from the origin (i.e., the lidar 30 at the front 32 of the grain cart 10) to the offset perpendicular line 110 (X) to calculate dist_to_offset and d_hat:

$$\text{dist\_to\_offset}=\sqrt{d\_truck\_rear\_end^2-X^2}-\text{pure\_pursuit\_offset\_yal}$$

$$d\_hat=\sqrt{X^2+\text{dist\_to\_offset}^2}$$

The angle between d_truck_rear_end and d_hat is:

$$\tan^{-1}\frac{\text{pure\_pursuit\_offset\_val}+\text{dist\_to\_offset}}{X}-\tan^{-1}\frac{\text{dist\_to\_offset}}{X}$$

The angle (theta) to the goal point 112 can be determined by adding and subtracting this value from the angle to the offset point 108, and determining which point lies on the offset perpendicular line 110.

Figure 10:
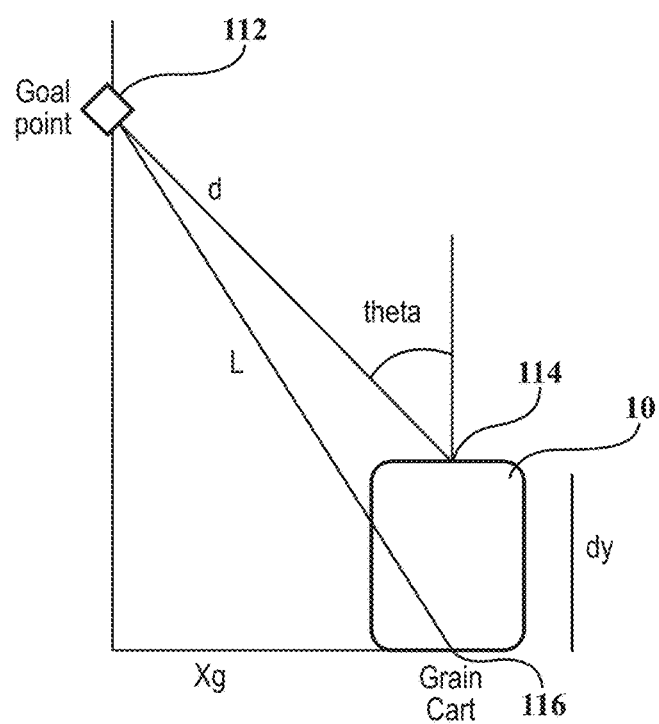
FIG. 10 illustrates a process for planning a path from a grain cart to a grain truck according to one implementation of the present invention.
Figure 11:
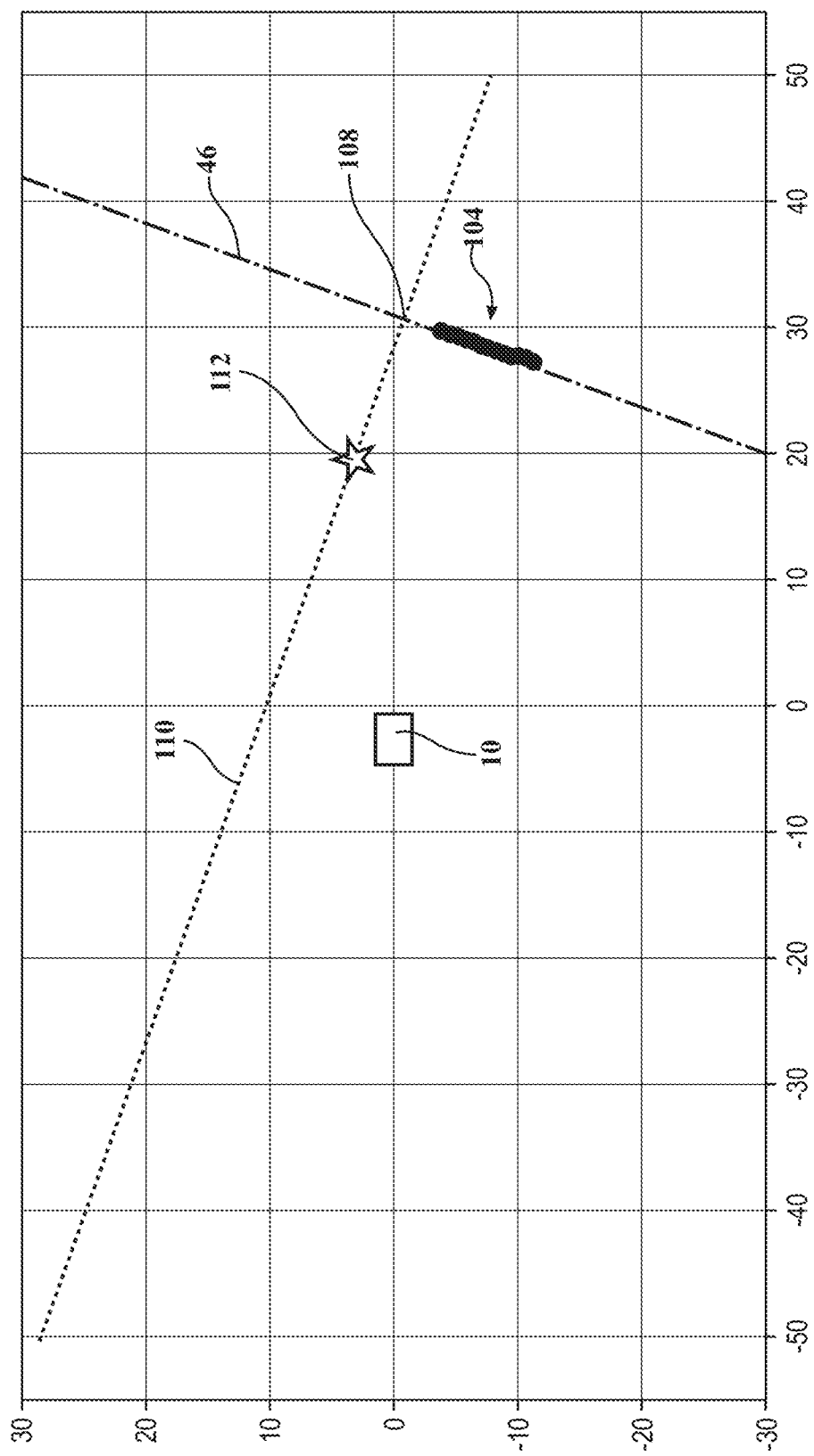
FIG. 11 illustrates a process for planning a path from a grain cart to a grain truck according to one implementation of the present invention.

With the distance (d_hat) and angle (theta) of the goal point 112 from the lidar 30 on the front 32 of the grain cart 10, the system 12 can use the pure pursuit algorithm to navigate the grain cart 10 toward the goal point 112. Once the grain cart 10 reaches the goal point 112, the system 10 switches to Stanley controller in order to follow the path line 48. FIG. 10 illustrates the parameters required by the Stanley controller. FIG. 11 illustrates the lidar points 104 that hit the grain truck 40, the offset point 108 that is a set distance away from the rear end point 102 of the grain truck 40, the offset perpendicular line 110 and the goal point 112 on the offset perpendicular line 110 relative to the grain cart 10.

Figure 12:
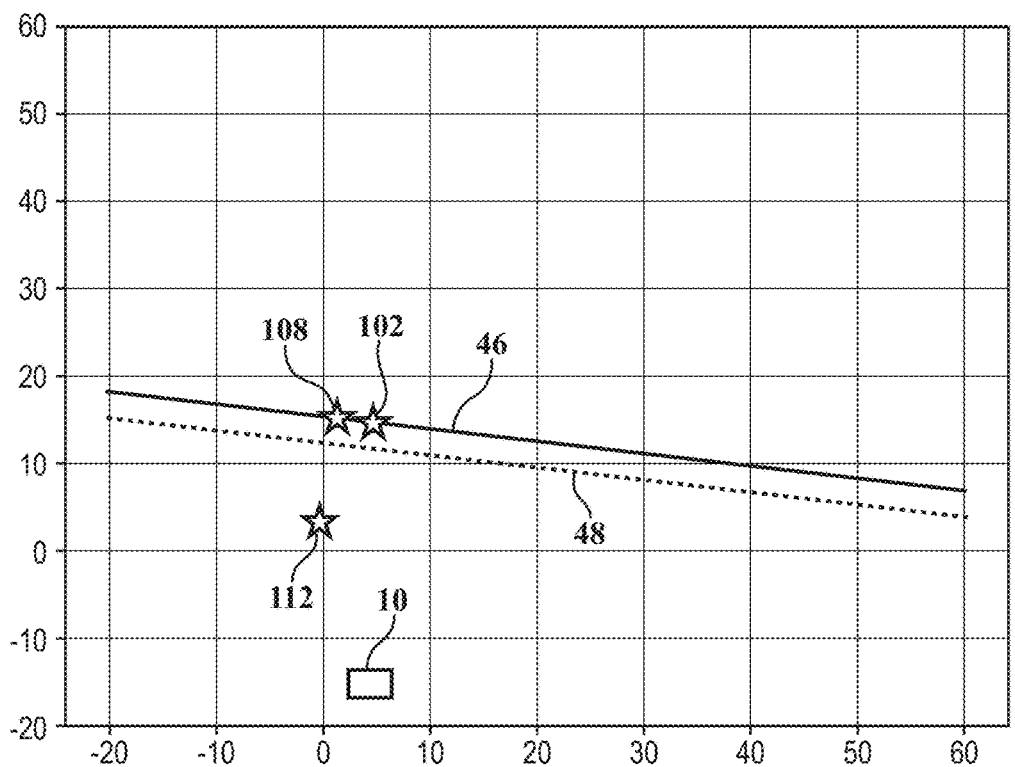
FIG. 12 illustrates a process for planning a path from a grain cart to a grain truck according to one implementation of the present invention.
Figure 13:
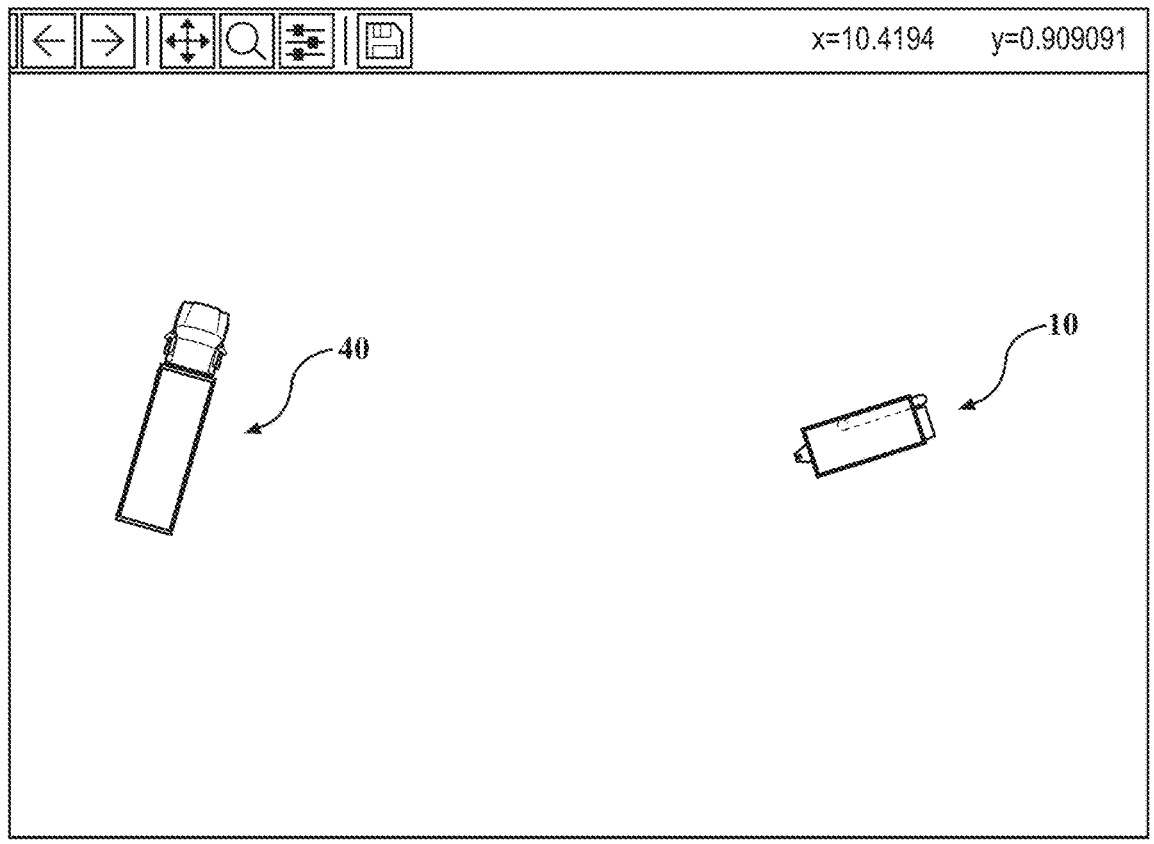
FIG. 13 illustrates a process for planning a path from a grain cart to a grain truck according to one implementation of the present invention.

Using only lidar 30 to navigate to the grain truck 40 has its limitations. For example, if the lidar 30 has a narrow FOV (e.g., 120 degrees), then it will not be able to see the grain truck 40 from certain angles so that the grain cart 10 may get lost and/or not know where to go. Thus, in an alternative embodiment, the system 12 may use a camera, a lidar and GPS to navigate to the goal point 112. After detecting the grain truck 40 and the goal point 100, 112, the system 10 transforms the detected truck line 46 and the goal point 100, 112 from a lidar coordinate system (where the lidar is the origin of the coordinate system) to a world coordinate system to use GPS to navigate to the goal point 112. FIGS. 12 and 13 illustrate the detected truck line 46, the parallel path 48, the rear end of the truck point 102, the offset point 108 and the goal point 112 in the world coordinate system.

The system 12 continues to use pure pursuit algorithm to navigate the grain cart 10 towards the goal point 112, Stanley controller to follow the path line 48, and rear wheel based feedback method to go in reverse on the path line 48. The system 12 will transform the front and rear axle points from the cart coordinate system to the world coordinate system to use GPS to for the Stanley controller and the rear wheel based method.

In an alternate embodiment, rather than using one goal point 112 on the offset perpendicular line 110 to get close to the grain truck 40, the system 12 may use Dubins Path for path planning, which provides a list of waypoints. The grain cart 10 uses the pure pursuit algorithm to get from one waypoint to the next. After the grain cart 10 reaches all of the waypoints, then the system 10 switches to Stanley controller to follow the path line 48 that is parallel to the edge 46 of the grain truck 40. When using the pure pursuit algorithm, each waypoint is the goal point, and the system 12 calculates the distance from the grain cart 10 to each goal point and also the angle of the line going from the grain cart 10 to each goal point.

In order to determine how far the grain cart 10 is from the next waypoint, the system 12 finds the projection of the grain cart 10 on the line that goes through the next waypoint and the previous waypoint and measures the distance from this point to the next waypoint. If this distance is smaller than a threshold value, then the system 12 determines that the waypoint has been reached. After reaching all of the waypoints, the system 12 uses Stanley controller to follow the path line 48.

In order to provide the angle in the proper range, the world coordinate system is divided into four areas. For areas 0 and 1 where the truck line angle is between −45 degrees and +45 degrees, y values are used to decide which side of the grain truck 40 the grain cart 10 is (above the grain truck 40 or below the grain truck 40). For areas 2 and 3, where the truck line angle is more than 45 degrees, x values are used to decide which side of the grain truck 40 the grain cart 10 is (on the left side or the right side of the grain truck 40). Also, based on what area the grain cart 10 is in the world, the system 12 can determine the angle for the last waypoint which lies on the parallel path line.

In order to find the proper angle between the grain cart 10 and the path line for Stanley controller, the system 12 compares the cart angle to the cart angle +2*pi and the cart angle −2*pi, and determines which values provides the smallest absolute value angle between the grain cart 10 and path line (theta_e). Also, depending on what area the grain cart 10 is in the world (cart_direction) the system 12 might use y or x values to determine the sign of e. e is positive if the grain cart 10 is on the left side of the path line, and e is negative if the grain cart 10 is on the right side of the path line.

In real-world applications, GPS location data is very noisy. The noise is a combination of white noise and colored noise. Two common types of colored noise for GPS are flicker noise (pink noise) and random walk noise (brown noise or red noise or drunkward's walk). Both flicker noise and random walk noise have more power at lower frequencies. In flicker noise, power is proportional to 1/f, and in random walk noise, power is proportional to $1/f^2$. One of the most popular GPS noise models is white noise and random walk noise. The noise from a GPS system makes it difficult to navigate the grain cart 10 to the proper location relative to the grain truck 40. As a result, the grain cart 10 may either park too close or too far from the grain truck 40. To increase the accuracy of positioning the grain cart 10 in the proper location relative to the grain truck 40, the system 12 includes a second 2D lidar 38 with 270 degrees FOV at the front corner of the grain cart 10.

As the grain cart 10 approaches the grain truck 40, the system 12 uses the lidar 38 on the front corner of the grain cart 10 to detect the truck line 46. Alternatively, the side lidar 36 at the side 26 of the grain cart 10 may be used in place of or in addition to the corner lidar 38 to improve the accuracy of the reading. Initially, the system 12 scales the x, y location data by 100 to convert the data from meters to centimeters to increase the resolution of the image. The system 12 calculates the minimum and maximum ranges for the x and y data, calculates the shape of the image to reconstruct from the laser data, and initializes the image matrix with zeros. For each x, y point, the system 12 sets the value in the image matrix to 255. The x and y are shifted by their minimum values so that the images start at the origin (0, 0).

The system 12 then creates a morphology element and dilates the image so that it is easier to detect lines. The system 12 applies Hough Transform to the dilated image to detect lines. The system 12 finds the longest line among all of the detected lines and calculates the slope and intercept of the line. Before calculating the intercept value, the system adds x_min to the x values and y_min to the y values and divides them by 100 to scale the image properly.

If the slope and intercept of the line are valid values, and if the length of the line is more than 3 meters, the system 12 recognizes that this line represents the side edge of the grain truck 40. Thus, this line is the truck line 122 as determined from the corner lidar 38. If the length of the line is not more than 3 meters but is more than 2 meters, then the system 12 recognizes this line as the end (i.e., front or back) of the grain truck 40, and thus would be an end line 124 rather than a truck line 122. If the detected line is an end line 124, the truck line 122 would be perpendicular to the end line 124 with a slope of −1/m. Also, the end line 124 and the truck line 122 pass through the corner point (the point with the smallest x value). Accordingly, the system 12 can calculate the intercept of the truck line 122.

After calculating the truck line 122, the system 12 can calculate the path line 126 which is parallel to the truck line 122 but a given distance 50 (e.g., 3 meters) away from it. Since the path line 126 could be on either side of the truck line 122, the system 12 chooses the side that is closer to the midpoint of the rear axle 116 of the grain cart 10. With the slope and intercept of the path line 126, the system 12 can use Stanley controller to calculate the steering values to follow the path line 126.

Figure 14:
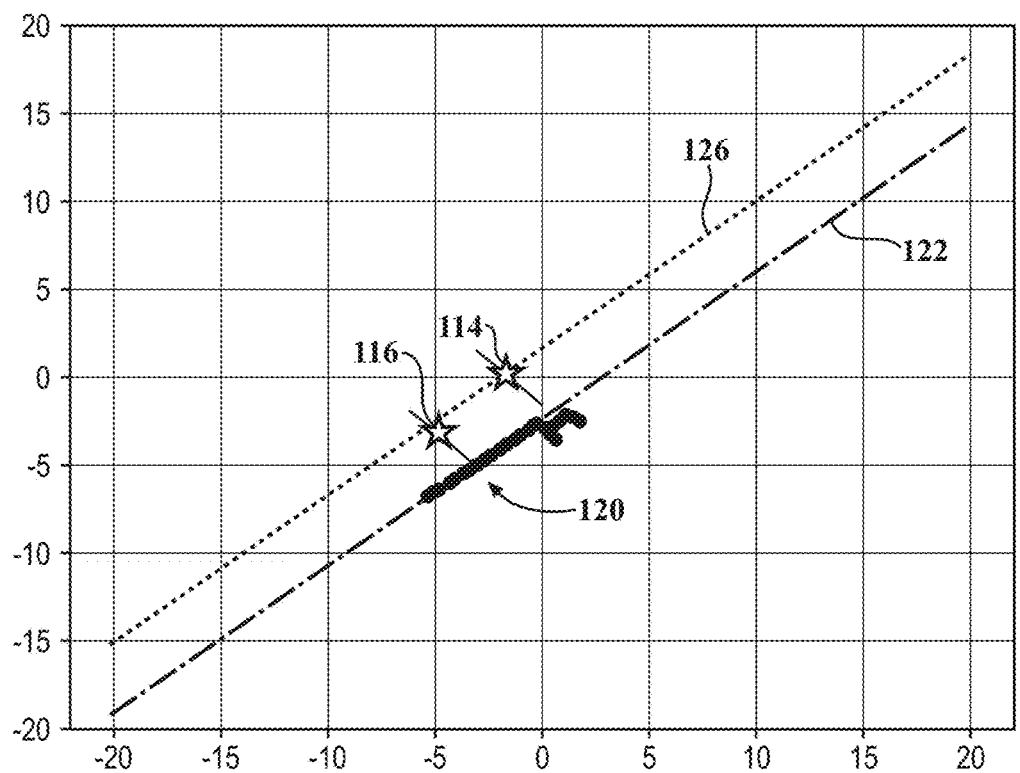
FIG. 14 illustrates a process for planning a path from a grain cart to a grain truck according to one implementation of the present invention.
Figure 15:
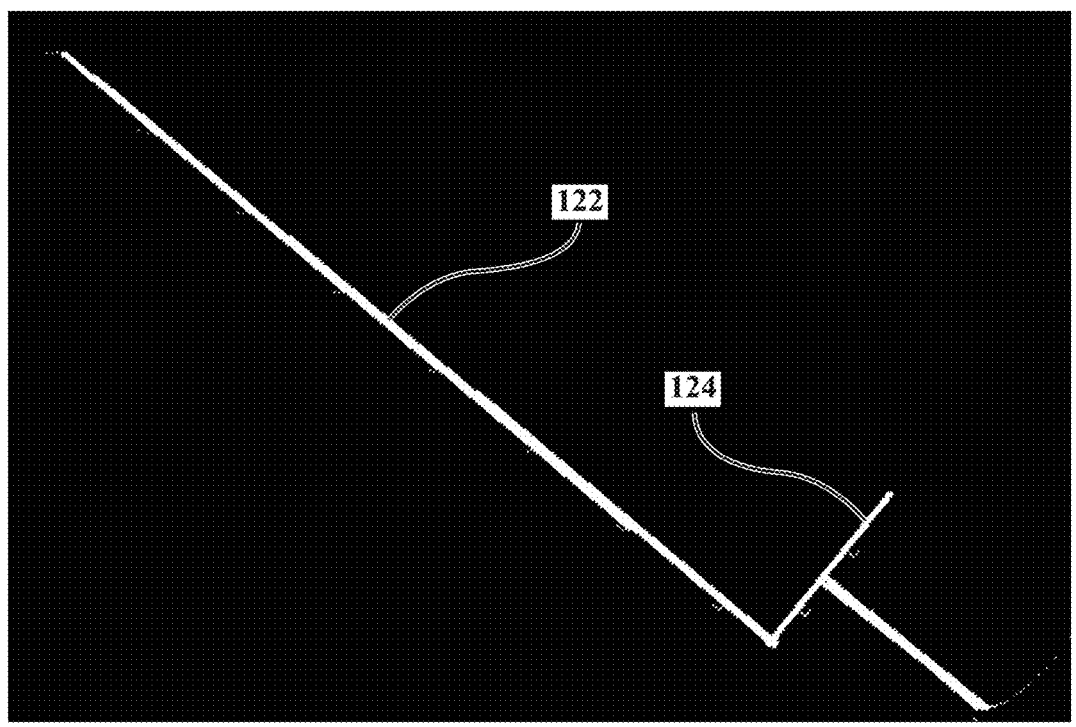
FIG. 15 illustrates an exemplary image obtained by a ranging device on the grain cart according to one implementation of the present invention.

FIG. 14 shows the lidar data points 120 when the grain cart 10 is beside the grain truck 40, the truck line 122 (detected by Hough Transform), the path line 126, which the grain cart 10 would follow, the middle of the front axle 114 and the middle of the rear axle 116 of the grain cart 10. Ideally, these points 114, 116 will lie on the path line 126. FIG. 15 shows the corresponding reconstructed image from the lidar data 120, which is used by Hough Transform to detect the truck line 122.

The parameters that are required for the steering command include the slope of the path line 126 (m), the intercept of the path line 126 (b), the x and y coordinates of the midpoint of the front axle, the x and y coordinates of the midpoint of the rear axle and the wheel base. Because the information is based on the coordinate system for the corner lidar 38 on the front corner of the grain cart 10, the heading of the grain cart 10 relative to the x axis of the corner lidar 38 is always 45 degrees or pi/4 radians. The direction of the path line 126 can be calculated by using the slope of the line (arctan(m) if m>0). If m<0, the line must be rotated by 180 degrees before determining the direction of the path line 126.

In an alternate embodiment, the model predictive control (MPC) algorithm may be used to follow the waypoints. MPC may also be used to steer the grain cart 10 rather than using Stanley controller or rear wheel feedback.

After the grain cart 10 reaches the path line 126, the grain cart 10 can use its side facing sensors (e.g., the camera 34 or lidar 36) to provide increased accuracy and real-time detection of the vehicle with which it is trying to align. The side facing sensor 34, 36 can be used to provide a more accurate detection of the edge of the grain truck 40. In addition, the side facing sensor 34, 36 can be used to detect ArUco markers identifying the front and rear ends of the truck box 54. Other methods could be used, such as 3D lidar, stereo camera, radar or an array of ultrasonic sensors.

Figure 16:
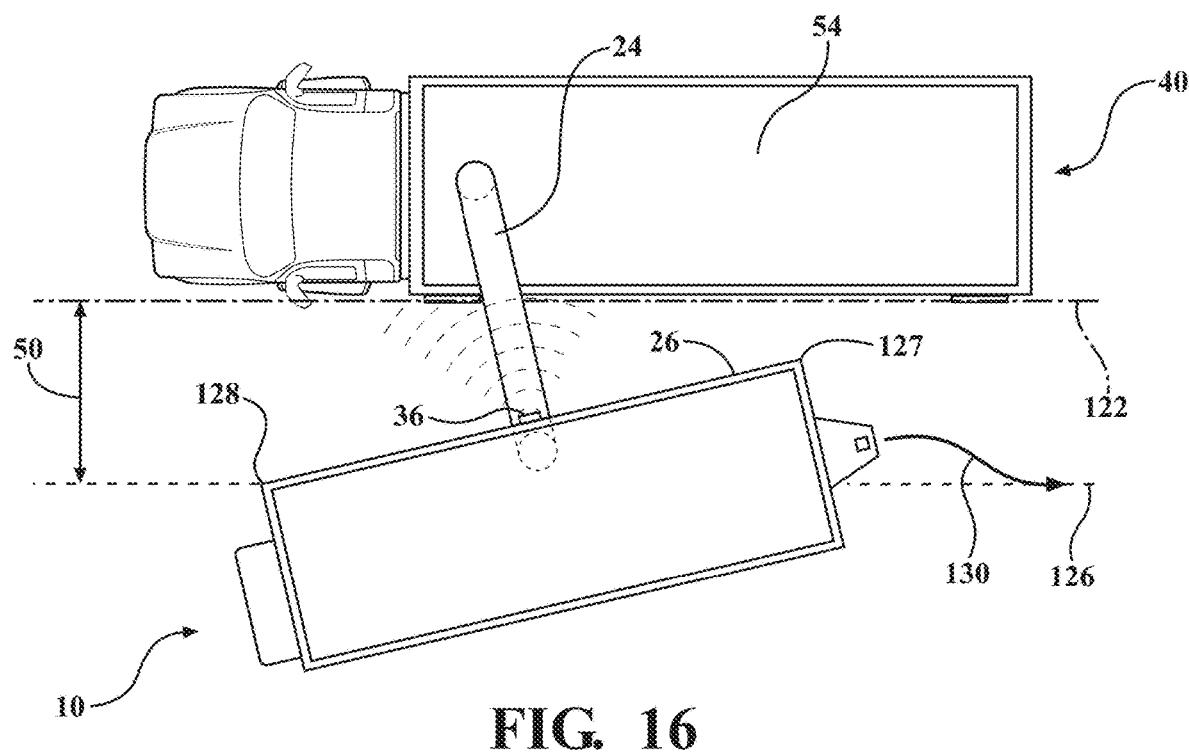
FIG. 16 is a schematic top view of a grain cart aligning with a grain truck according to one implementation of the present invention.
Figure 17:
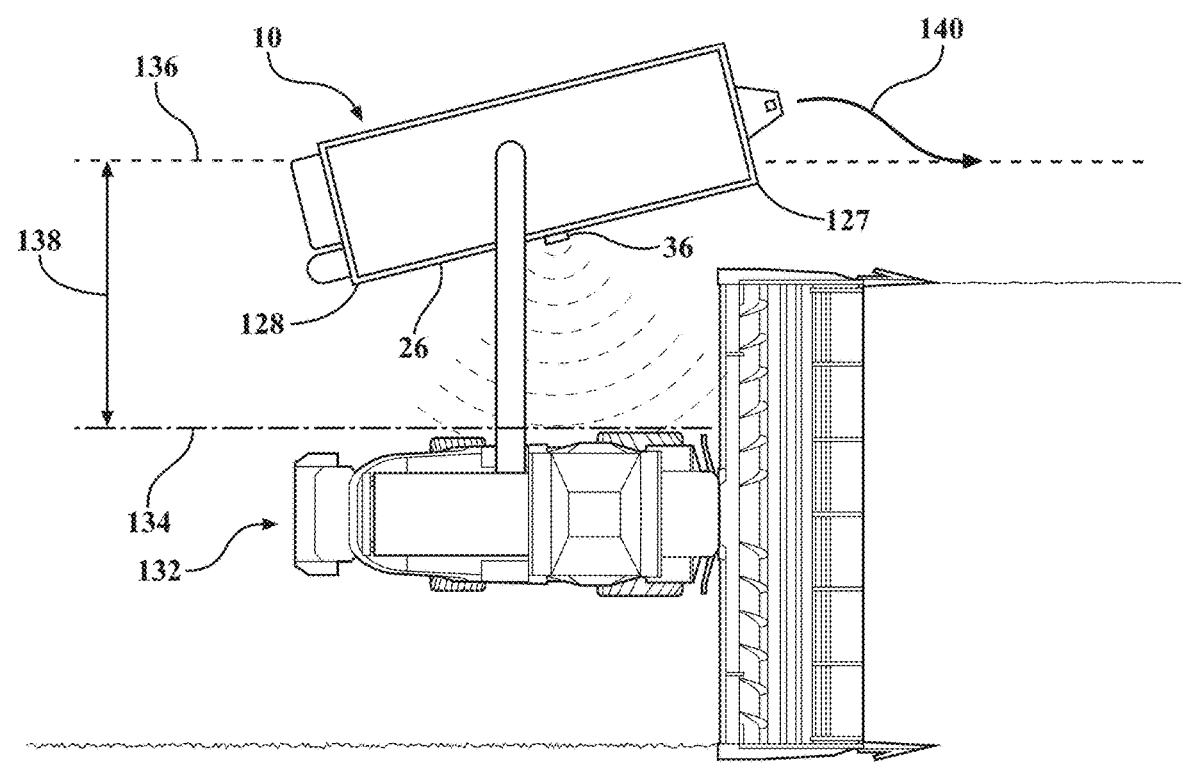
FIG. 17 is a schematic top view of the grain cart aligning with a combine according to one implementation of the present invention.

FIGS. 16-17 relate to systems and methods for aligning the grain cart 10 to the grain truck 40 or another vehicle, according to another embodiment of the present invention. Referring to FIG. 16, when the grain cart 10 is next to the grain truck 40, the grain cart 10 uses the corner lidar 38 to measure the distance and angle of the truck line 46 along the edge 26 of the grain truck 40 to improve alignment of the grain cart 10 for unloading. Alternatively, the side lidar 36 at the side edge 26 of the grain cart 10 may be used in place of or in addition to the corner lidar 38 to improve the accuracy of the reading. The system 12 can use this data to correct the path 130 and position of the grain cart 10 so that it is on the goal path 48 parallel to the truck line 46 and at the specified offset 50 from the truck line 46. This will ensure that the unload auger 24 is located correctly above the truck box 54.

Referring to FIG. 17, the corner lidar 38 or the side lidar 36 also can be used to detect and measure the distance and angle between a combine 132 and the grain cart 10. The system 12 could use this data to correct the goal path 136 of the grain cart 10 so that is at the correct offset 138 from the combine line 134 along the edge of the combine 132.

Figure 18:
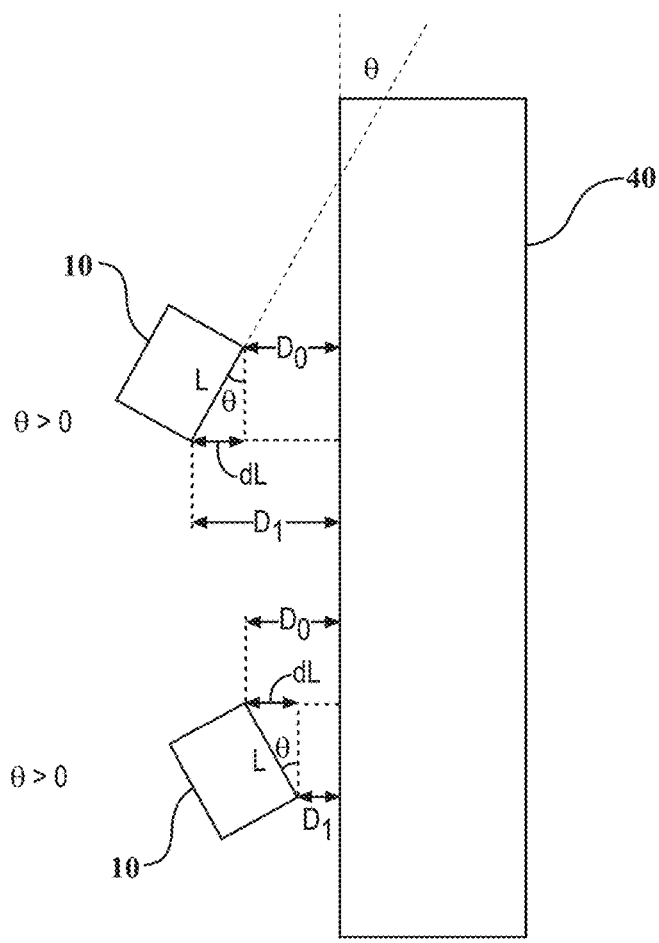
FIG. 18 illustrates a process for aligning a grain truck to a vehicle according to one implementation of the present invention.

After the grain cart 10 is parked parallel to the grain truck 40 and before deploying the unload auger 24, the system 12 determines whether the grain cart 10 is at a proper distance from the grain truck 40. A similar process may be used to ensure that the grain cart 10 is at the proper distance and orientation relative to any vehicle, such as a combine 132. Referring to FIG. 18, the corner lidar 38 on the front corner (i.e., the front edge 127) of the grain cart 10 is used to find the truck line 46 defined with a slope of m and a bias of b. Alternatively, the side lidar 36 at the side edge 26 of the grain cart 10 may be used in place of or in addition to the corner lidar 38 to improve the accuracy of the reading. The orientation of the grain cart 10 in the corner lidar coordinate system is always 45 degrees. Thus, the angle between the grain cart 10 and grain truck 40 is:

$$\theta = \tan^{-1} m - \pi/4$$

The system 12 then determines the distance from the front edge 127 of the grain cart 10 to the grain truck 40 ($D_0$) and the distance from the rear edge 128 of the grain cart 10 to the grain truck 40 ($D_1$). When the front edge 127 of the grain cart 10 is closer to the grain truck 40, $\theta > 0$ and:

$$D_1 = D_0 + dL = D_0 + L \sin \theta$$

And when the rear edge 128 of the grain cart 10 is closer to the grain truck 40, $\theta < 0$ and:

$$D_1 = D_0 - dL = D_0 - L \sin|\theta| = D_0 + L \sin \theta$$

$D_0$ is the distance from the front edge 127 of the grain cart 10 to the grain truck 40 (the distance from point (0, 0) to line (m, b)):

$$D_0 = \frac{|y - m * x - b|}{\sqrt{1 + m^2}} = \frac{|b|}{\sqrt{1 + m^2}}$$

The minimum distance from the grain cart 10 to the grain truck 40 is the minimum of $D_0$ and $D_1$, and the maximum distance from the grain cart 10 to the grain truck 40 is the maximum of $D_0$ and $D_1$.

To position the grain cart 10 at the proper position and orientation to the grain truck 40, the system 12 sets the cart speed to a negative value because the grain cart 10 has parked at the far end of the grain truck 40 and thus has room to move in reverse. The system 12 uses the corner lidar data points to find the truck line and get the current time. Then the cart position is corrected until the distance from the front edge 127 and rear edge 128 of the grain cart 10 to the grain truck 40 are within an acceptable range, and the angle between the grain cart 10 and grain truck 40 is less than a threshold, e.g., 3 degrees. In particular, if the maximum distance is greater than a maximum threshold, the system 10 will steer the grain cart 10 to reduce the maximum distance. Similarly, if the minimum distance is less than the minimum threshold, the system will steer the grain cart 10 to increase the minimum distance. The system 10 will also steer the grain cart 10 if the angle θ between the edge 26 of the grain cart 10 and the edge 46 of the truck 40 is greater than a maximum angle (e.g., three degrees).

The system 12 then calculates the elapsed time and the distance traveled. If either the grain cart 10 has traveled more than a threshold distance (e.g., 13 meters), or the corner lidar 38 cannot see the grain truck 40 because it is too far from it (if the length of the detected truck line is less than 4.0 meters), then the grain cart 10 travels in the opposite direction and resets the time.

The system then calculates the steering command using linear MPC algorithm. The system 12 then sleeps for a certain amount of time (e.g., 200 ms) and finds the truck line again and continues the loop until the grain cart 10 is at the proper distance from the grain truck 40 and is parallel to it.

After properly aligning with the path line 48, the system 12 uses markers 88, 90, such as ArUco markers, positioned on the front and back of the truck box 54 to indicate the type of grain truck 40, to distinguish between the front and back of the grain truck 40 and also to determine when the grain cart 10 is in the correct position relative to the grain truck 40. Other methods may be used to determine when the grain cart 10 is in the correct position, such as lidar or object detection with a camera.

Figure 19:
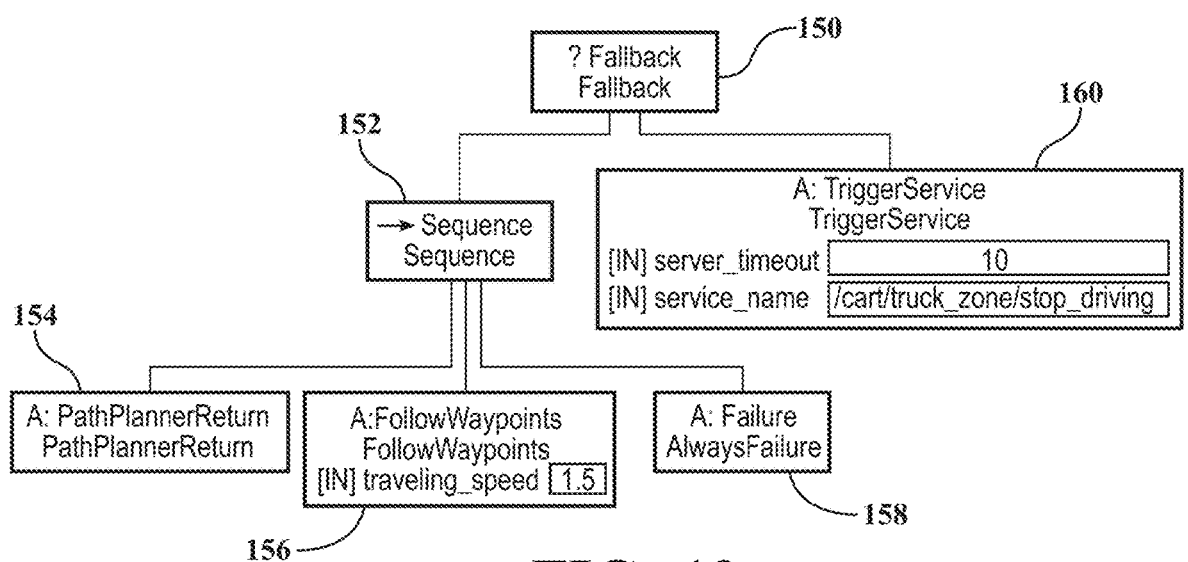
FIG. 19 is a behavior tree illustrating a method for returning to an edge of a truck zone according to one implementation of the present invention.

After the grain cart 10 has unloaded or completed its task, the system 12 will plan a path away from the grain truck 40 back to the point that the grain cart 10 entered the truck zone 42. FIG. 19 illustrates the sequence performed by the system 12 for returning the grain cart 10 back to its point of origination. The system 12 plans a path to get from the current location of the grain cart 10 to the point that the grain cart 10 entered the truck zone 42 (step 154), and the grain cart 10 will travel along the planned way points (step 156). The process is designed to only perform these steps once (steps 150, 152, 158). The system 12 then stops the grain cart 10 (step 160).

Figure 20:
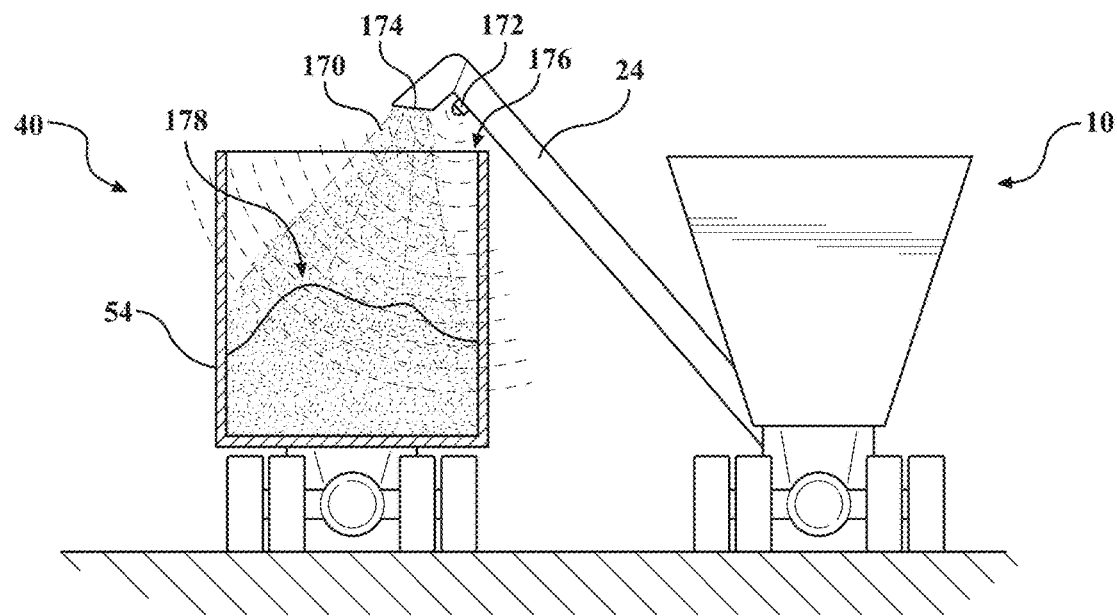
FIG. 20 is schematic rear view of a grain cart unloading crop material into a grain truck according to one implementation of the present invention.
Figure 21:
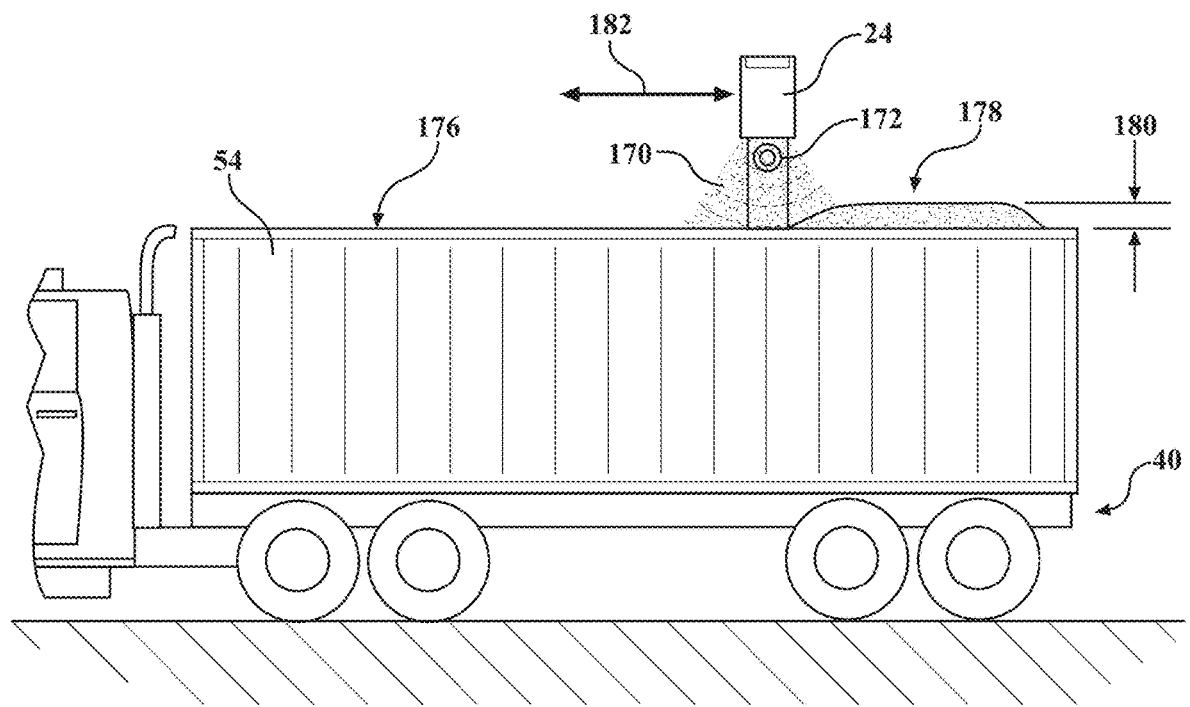
FIG. 21 is a side view illustrating the unloading process of FIG. 20.

FIGS. 20-21 relate to systems and methods for using depth perception data to detect the amount of crop material 170 filling into the grain truck 40, according to another embodiment of the present invention. The grain cart 10 includes a depth perception device 172, such as a 3D camera, a lidar or a radar, mounted near the spout end 174 of the unload auger 24. The depth perception device 172 is positioned so that it can look directly down into the truck box 54 and include a view of the top edge(s) 176 of the container 54. The depth perception device 172 detects the top of the truck box 54 and the depth 178 of the crop material 170 as it loads the grain truck 40.

The system 12 uses the data from the depth perception device 172 to determine if the tarp is closed (i.e., if the depth of the material in the truck box 54 doesn't change from the boundaries of the walls of the truck box 54) or if the truck box 54 is empty (i.e., if the depth is consistent with the measured wall height of the truck box 54). If the truck box 54 is empty, the grain cart 10 can begin the unloading procedure. During unloading, the grain cart system 12 continues to monitor the depth 178 of the crop material 170 as it fills the truck box 54. When the depth 178 reaches a threshold or target fill level 180 relative to the top 176 of the container wall, the system 12 will drive the grain cart 10 forward or backward (e.g., arrow 182) to unload the crop material 170 in an adjacent area that is not yet full. The speed at which the grain cart 10 drives may be modified or adjusted so that an even fill is achieved as it moves. If the adjacent locations are full, or the grain cart 10 is at the end of the truck box 54, the system 12 will command the unload auger 24 to stop the unloading process.

The targeted fill value 180 relative to the top 176 of the truck box 54 can be adjusted to change the total volume the grain cart 10 will fill into the truck box 54. This can be calibrated to create a fill level that does not exceed legal load limits without the use of grain cart load cell data.

Figure 22:
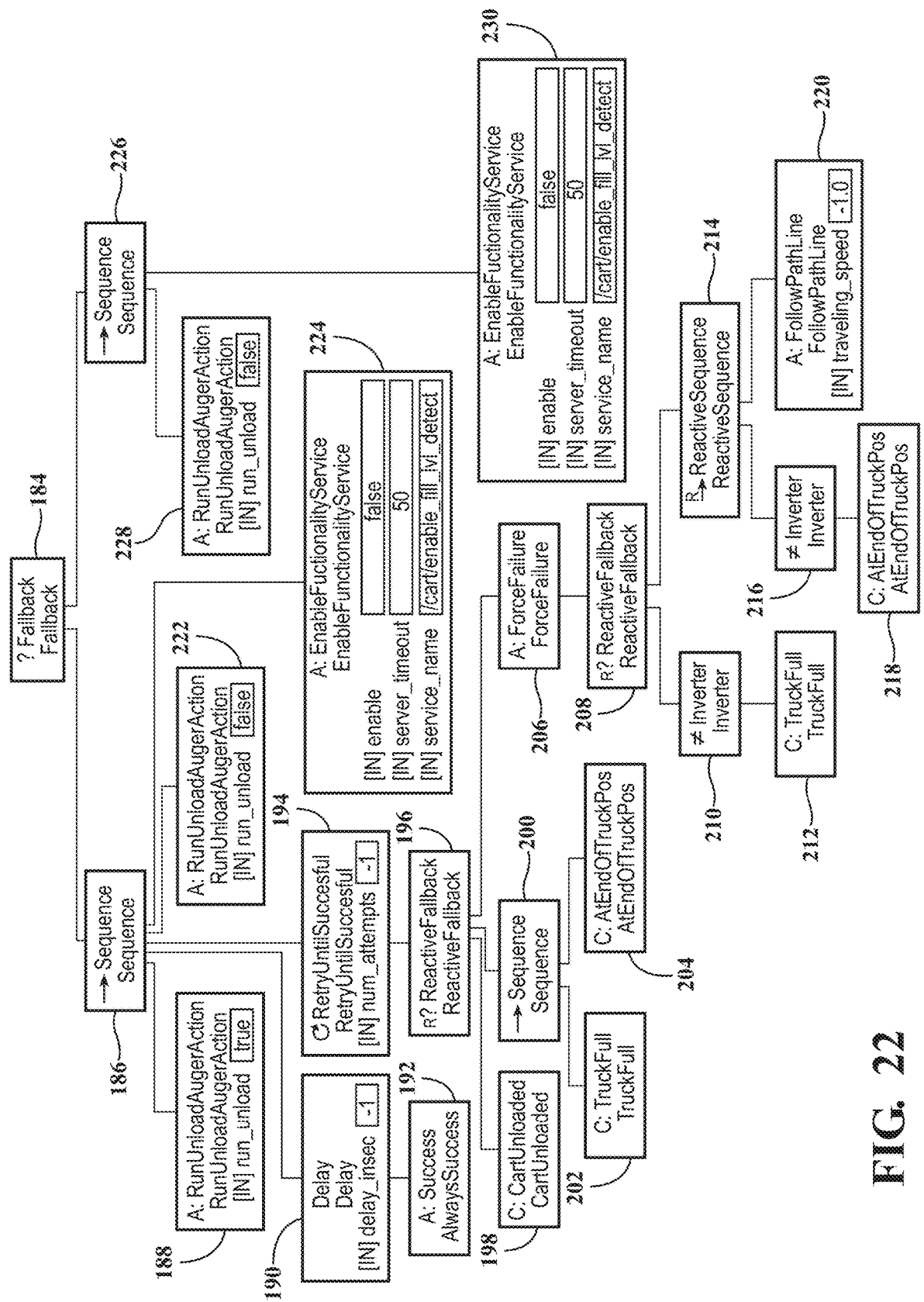
FIG. 22 is a behavior tree illustrating a method for unloading a grain cart according to one implementation of the present invention.
Figure 23:
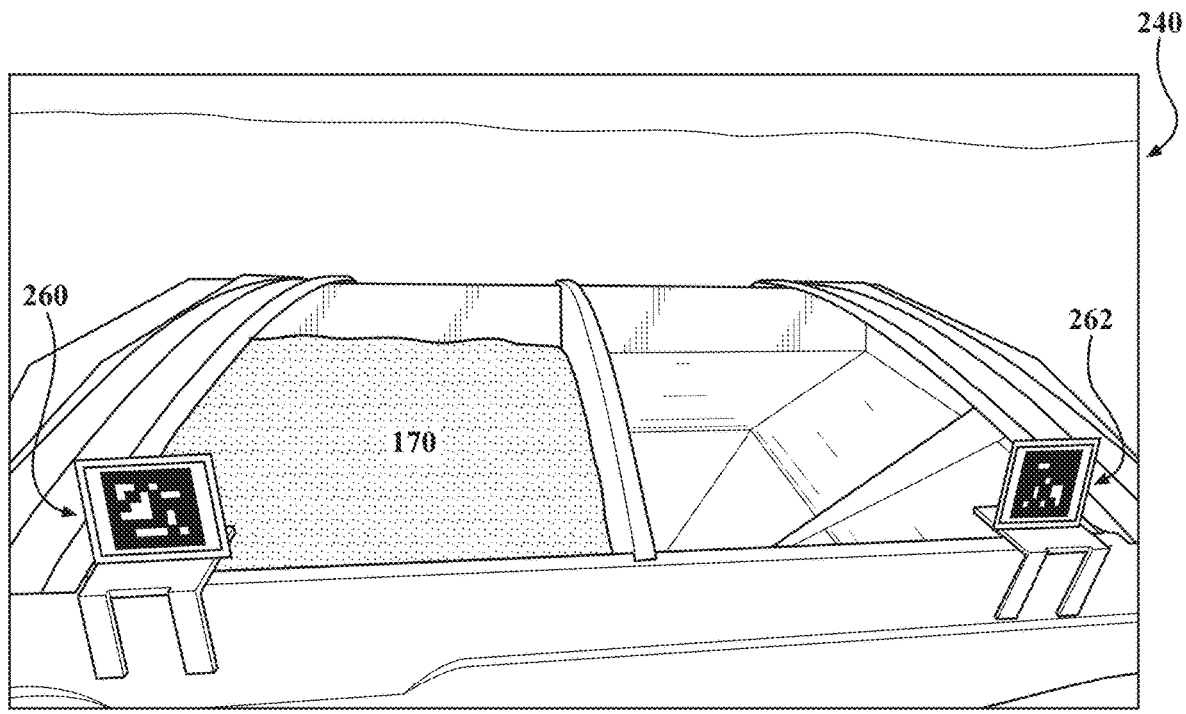
FIG. 23 illustrates an exemplary image of a grain truck box obtained by an imaging device on a grain cart according to one implementation of the present invention.
Figure 24:
FIG. 24 illustrates a process for unloading crop material from a grain cart into a grain truck according to one implementation of the present invention.
Figure 25:
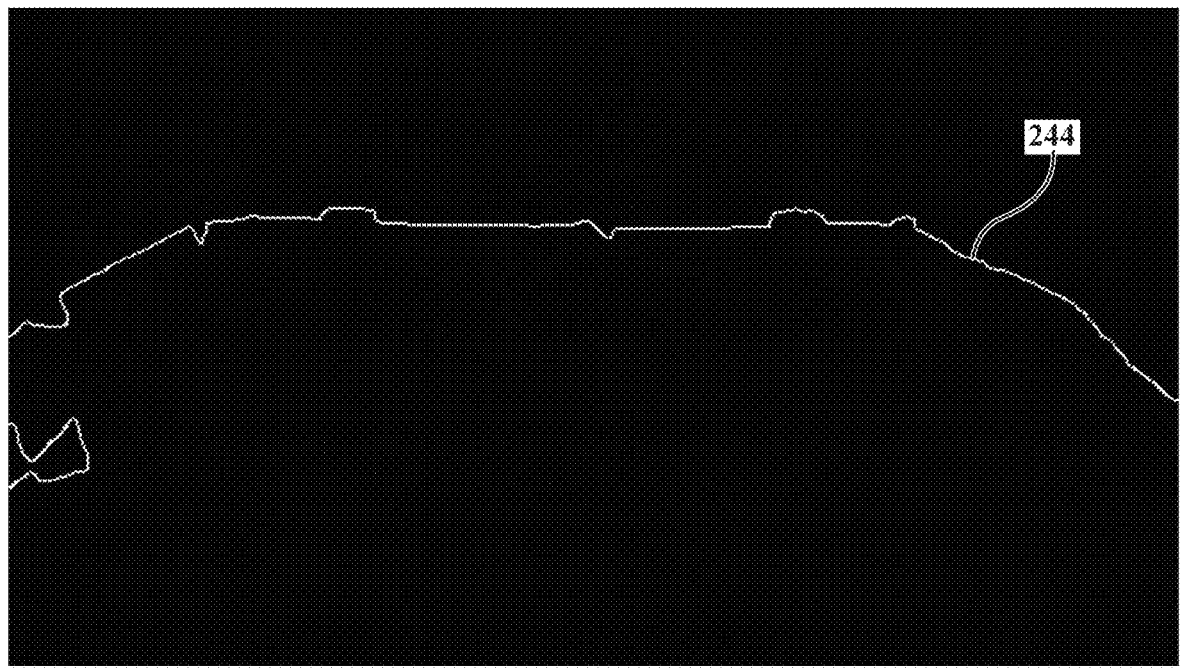
FIG. 25 illustrates a process for unloading crop material from a grain cart into a grain truck according to one implementation of the present invention.
Figure 26:
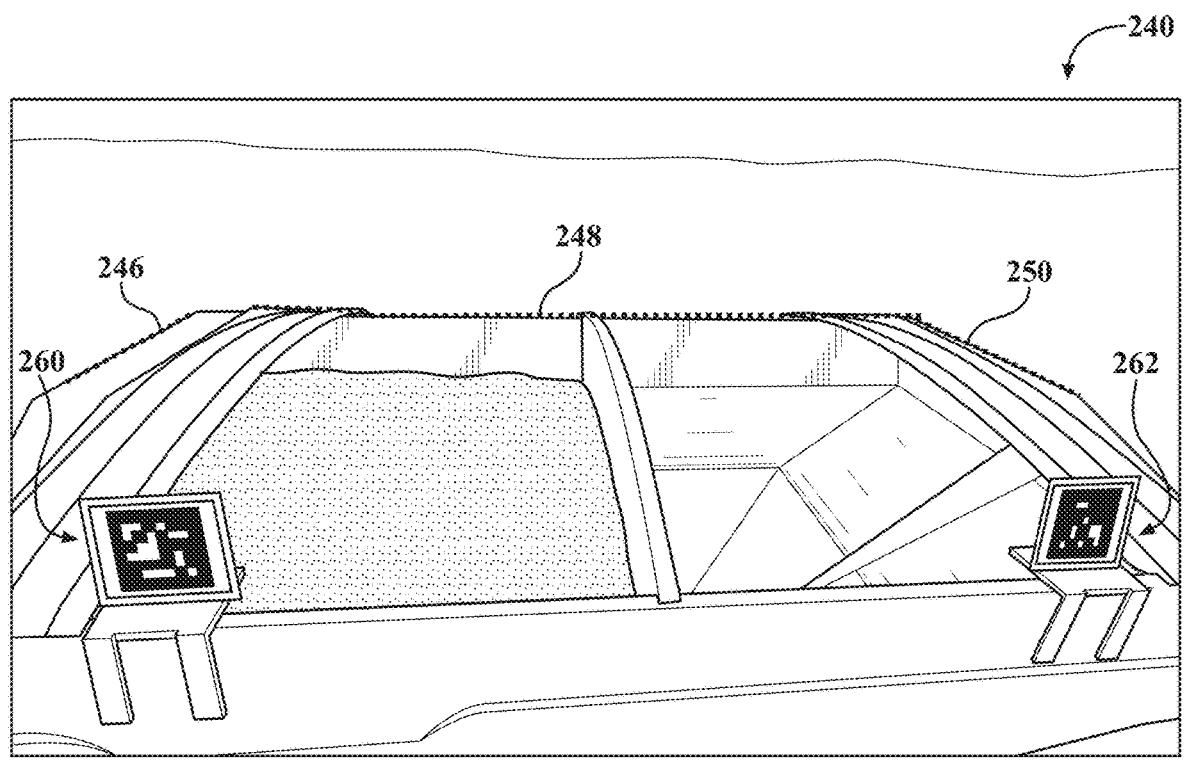
FIG. 26 illustrates a process for unloading crop material from a grain cart into a grain truck according to one implementation of the present invention.

FIG. 22 illustrates a behavior tree describing the process for monitoring the fill level of the grain truck 40. The process includes a fallback node 184 to perform two sequences 186, 226. The first sequence 186 performs the steps to unload the crop material from the grain cart 10, and the second sequence 226 turns off the system 12 after either the grain cart 10 has unloaded all of the crop material or the grain truck 40 is completely full.

Initially, the system turns on the unload auger 24 (step 188) and waits for a set period of time (steps 190, 192) before it begins a loop to monitor and control the unload process until the unload process ends (steps 194, 196). The system 12 determines whether the grain cart 10 is unloaded (step 198). The system 12 may determine that the grain cart 10 is unloaded if the amount of crop material in the grain cart tank 22 is below a minimum threshold. If the grain cart 10 is not unloaded, the system 12 runs a sequence 200 to determine whether the truck box area is full (step 202) and the grain cart 10 is at the end of the truck box (step 204). If the truck box area is not full and the grain cart 10 is not at the end of the truck box, the system 12 waits until the truck box area is full (steps 210, 212) before determining whether the grain cart 10 is at the end of the truck box (steps 216, 218). If the grain cart 10 is not at the end of the truck box, the system 12 moves the grain cart 10 along the path (step 220) and returns to step 198 to determine whether the grain cart 10 has fully unloaded. If at steps 216, 218, the grain cart 10 is at the end of the truck box, the system will confirm that the grain truck 40 is full and that the grain cart 10 is at the end of the truck box (steps 200, 202, 204) before exiting the unload process loop (steps 194, 196). The system 12 will also exit the unload process loop (steps 194, 196) if it determines at step 198 that the grain cart 10 is fully unloaded.

After exiting the unload process loop (steps 194, 196), the system turns off the unload auger 24 (step 222, 228) and turns off the unload detection system (step 224, 230).

FIGS. 23-34 illustrate the steps performed by the system 12 to identify the boundaries of the truck box 54. To detect the upper boundary line, the system converts the image 240 from the depth perception device 172, reflected in FIG. 23, into a threshold depth image by a small value, the output of which is a binary image 242, as reflected in FIG. 24. The system 10 then applies Canny edge detection to the depth image 242 to extract the edges 244 in from the image 242, as reflected in FIG. 25. The system 10 dilates the resultant image to fill small gaps, and then detects line segments 246, 248, 250 in the image using Hough Line Transform, as reflected in FIG. 26. The system them filters out line segments 246, 250 that do not meet the requirements for being an upper boundary by initially filtering out lines whose angles are greater than 10 degrees or less than −10 degrees. The system then calculates the lengths of the remaining line segments, and keeps only the longest line, which is determined to be the upper edge 248 of the truck box. The system then draws the final selected line 248 on the image 240.

Figure 27:
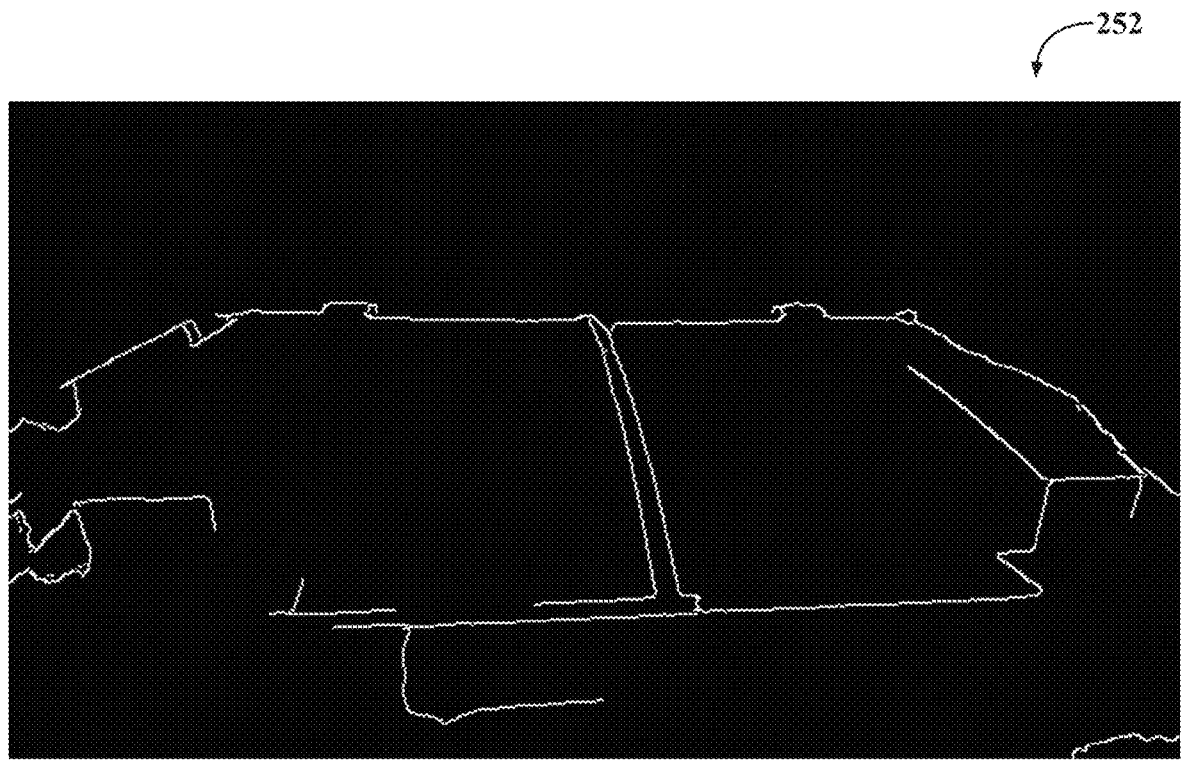
FIG. 27 illustrates a process for unloading crop material from a grain cart into a grain truck according to one implementation of the present invention.
Figure 28:
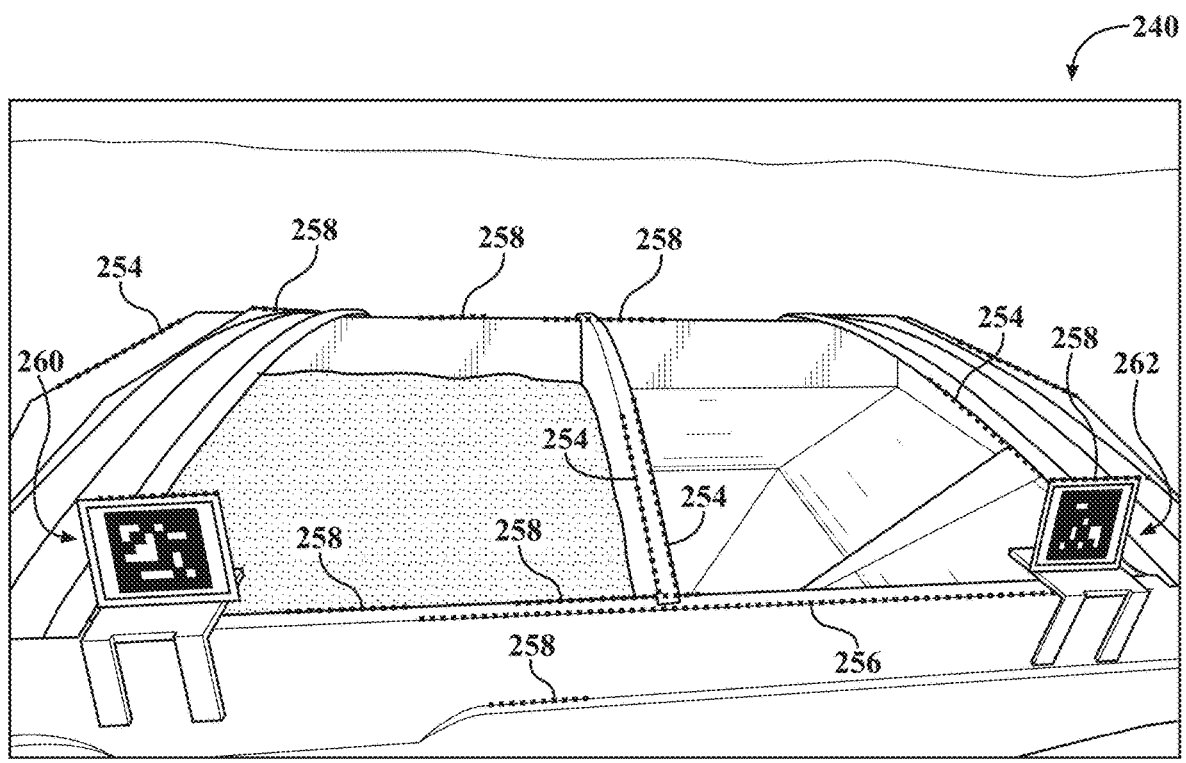
FIG. 28 illustrates a process for unloading crop material from a grain cart into a grain truck according to one implementation of the present invention.
Figure 29:
FIG. 29 illustrates a process for unloading crop material from a grain cart into a grain truck according to one implementation of the present invention.
Figure 30:
FIG. 30 illustrates a process for unloading crop material from a grain cart into a grain truck according to one implementation of the present invention.
Figure 31:
FIG. 31 illustrates a process for unloading crop material from a grain cart into a grain truck according to one implementation of the present invention.
Figure 32:
FIG. 32 illustrates a process for unloading crop material from a grain cart into a grain truck according to one implementation of the present invention.
Figure 33:
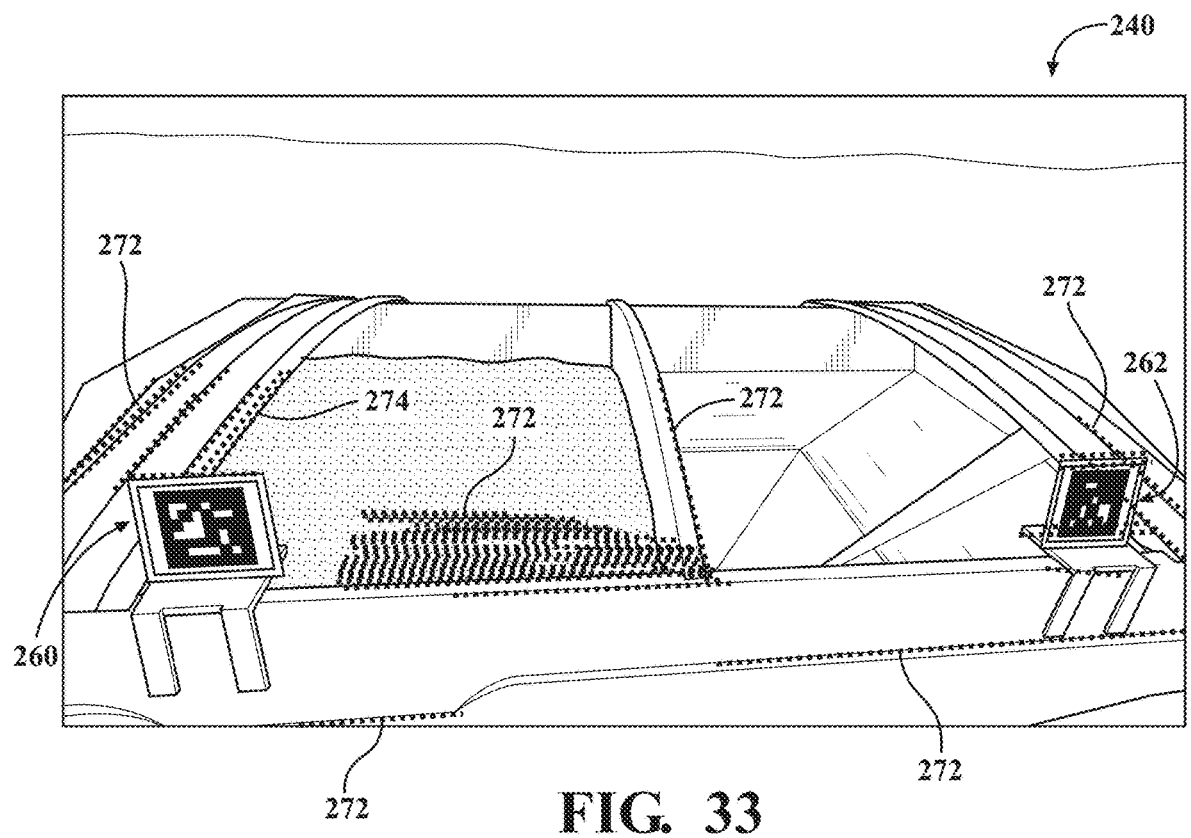
FIG. 33 illustrates a process for unloading crop material from a grain cart into a grain truck according to one implementation of the present invention.

In order to detect the lower boundary line, the system converts the image 240 from the depth perception device 172 into a depth image and applies Canny edge detection to the depth image to extract the edges 252 from the depth image, as reflected in FIG. 27. The system uses Hough Line Transform to detect the line segments 254, 256, 258 in the image, as reflected in FIG. 28. The system them filters out line segments 254, 258 that do not meet the requirements for being an upper boundary by initially filtering out lines 254 whose angles are greater than 10 degrees or less than −10 degrees. The system 12 then calculates the lengths of the remaining line segments, and keeps only the longest line 256, which is determined to be the upper edge 256 of the truck box. The system 12 then draws the final selected line 256 on the image 240.

Figure 34:
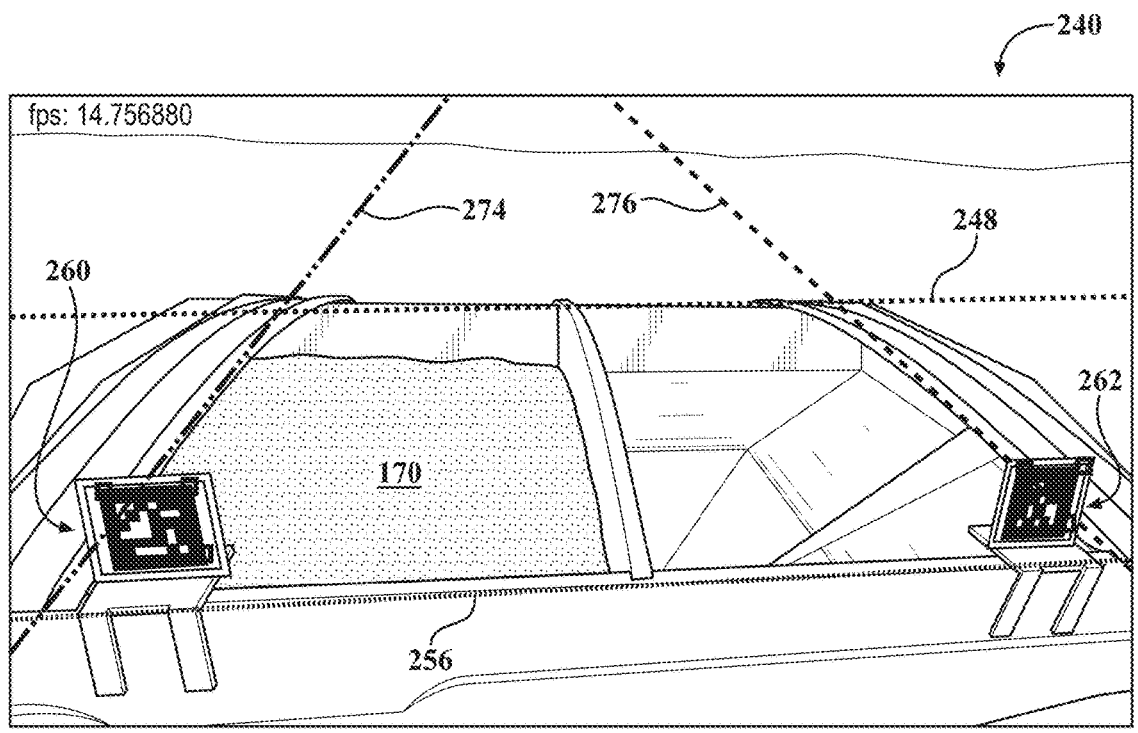
FIG. 34 illustrates a process for unloading crop material from a grain cart into a grain truck according to one implementation of the present invention.

In order to detect the left and right boundary lines, a marker 260, 262 (e.g., an ArUco marker) is placed on each end of the trailer. The same markers 88, 90 that were used to determine when the grain cart 10 is in the correct position relative to the grain truck 40 may be used to detect the left and right boundary lines. To detect the left boundary line, the system will initially detect the left marker 260 with the specific ID number and find the X and Y coordinates for its centroid. The system will convert the image into a gray scale image and apply Canny edge detection to extract the edges 264 from the gray scale image, as reflected in FIG. 29. The system 12 multiplies the edges 264 from the gray scale image with the threshold depth image 242 in FIG. 24 to focus on the edges 266 on the grain truck 40, as reflected in FIG. 30. The system 12 then creates a binary image 268 with a value of 1 for pixels which have depth values close to that of the centroid pixel of the left marker 260, and 0 everywhere else, as reflected in FIG. 31. The system will multiply the binary image 268 (FIG. 31) with the image 266 (FIG. 30) focusing on the edges on the grain truck 40 to derive the image 270 reflected in FIG. 32. The system 12 detects line segments from this image 270 using Hough Line Transform to identify the line segments 272, 274 reflected in FIG. 33. The system 12 will filter out lines that do not match being a left boundary line based on the position relative to the left marker 260 and the angle of the line, and draw the final selected line 274 on the image 240. The system will repeat the same steps to detect the right boundary line using the right marker 262 with its own unique ID number. The final results identifying the upper boundary line 248, lower boundary line 256, left boundary line 274 and right boundary line 276 is illustrated in FIG. 34.

Figure 35:
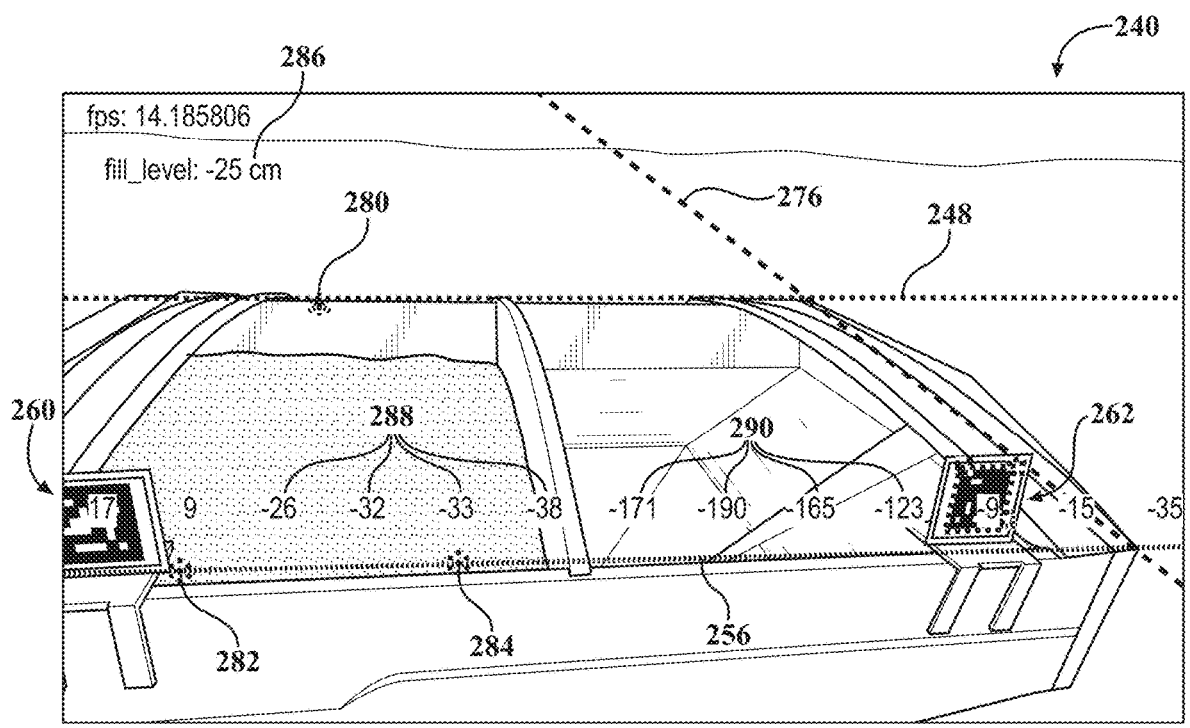
FIG. 35 illustrates a process for unloading crop material from a grain cart into a grain truck according to one implementation of the present invention.

Referring to FIG. 35, in order to determine fill level, the system selects one point 280 on the upper boundary line 248 and two points 282, 284 on the lower boundary line 256, obtains their 3D coordinates from the 3D camera and fits a plane to these three points. The plane can be represented by:

$$a*X+b*Y+c*Z=d=0$$

For any given point (X0, Y0, Z0) representing the fill level in the truck box 54, the system measures the distance to this plane:

$$\text{Fill\_level}=(a*Z0+b*Y0+c*Z0+d)/\text{sqrt}(a^2+b^2+c^2)$$

To calculate the fill level, the system 12 picks a few points around the area where it is unloading grain, calculates their distance to the plane, and then averages these values. The system 12 then uses a low pass filter to make the fill level smoother so that it does not fluctuate. As reflected in FIG. 35, the measured and filtered value for the fill level is 25 cm 286 (−25 because it is under the plane and not above it). FIG. 35 also identifies the fill levels calculated at various points across the trailer. The fill levels 288 in the hopper with corn ranges from 26-38 cm, and the fill level 290 in the hopper that is empty ranges from 123-190 cm.

In another embodiment, the system determines the fill level of the truck box by converting the distance matrix into an 8 bit unsigned with one channel image. The depth image is cropped with the region of interest set to the bottom half of the image. The distance matrix is converted to an array, and all values smaller than 100 cm are removed from the matrix to remove any objects that are too close to the camera since they are likely to be noise or dust particles. The array is sorted in ascending order, and the first element in the array is selected as the closest distance from the edge of the trailer to the camera. This approach may be used to measure the distance from the edge of the trailer to the camera on a good day, but when the crop is very dusty, it will be difficult to use this method to identify the truck edge, and the system 12 will likely select a dust particle instead.

In yet another embodiment, the system 12 may run a Canny edge detection on the distance image, dilate the edge image so that the edge lines are stronger and easier to fit a line, and run Hough line detection to detect the strong edge lines. The lines are filtered, and only those with an angle smaller than 10 degrees at the bottom of the image are selected. Then the longest line is chosen. A few points along this line are selected, and the point with the shortest distance to the camera is selected. If this distance is less than 300 cm and more than the distance measured with the previous method, then this value is selected as the distance from the trailer edge to the camera.

To measure the fill level a point inside the trailer, 10 random points are selected around that point in a radius of 30 pixels. The Z coordinates for these random points are obtained from the point cloud, and the largest Z value is selected. Selecting the largest Z value helps to filter out tarp lines on the trailer. The distance to the trailer's edge is measured by subtracting the distance to the trailer's edge from the largest Z value. If the difference (Delta Z) is greater than or equal to approx. 220, the fill level is 0 (i.e., the truck box is empty). If it is less than approx. 10, then the fill level is full, Otherwise, the fill level needs to be calculated using the following formulas:
If Delta_Z>90:

$$FillLevel=0.000951*Delta\_Z^2-0.728*Delta\_Z+113.1$$

Otherwise:

$$FillLevel=-0.00752*Delta\_Z^2+0.127*Delta\_Z+99.487$$

Figure 36:
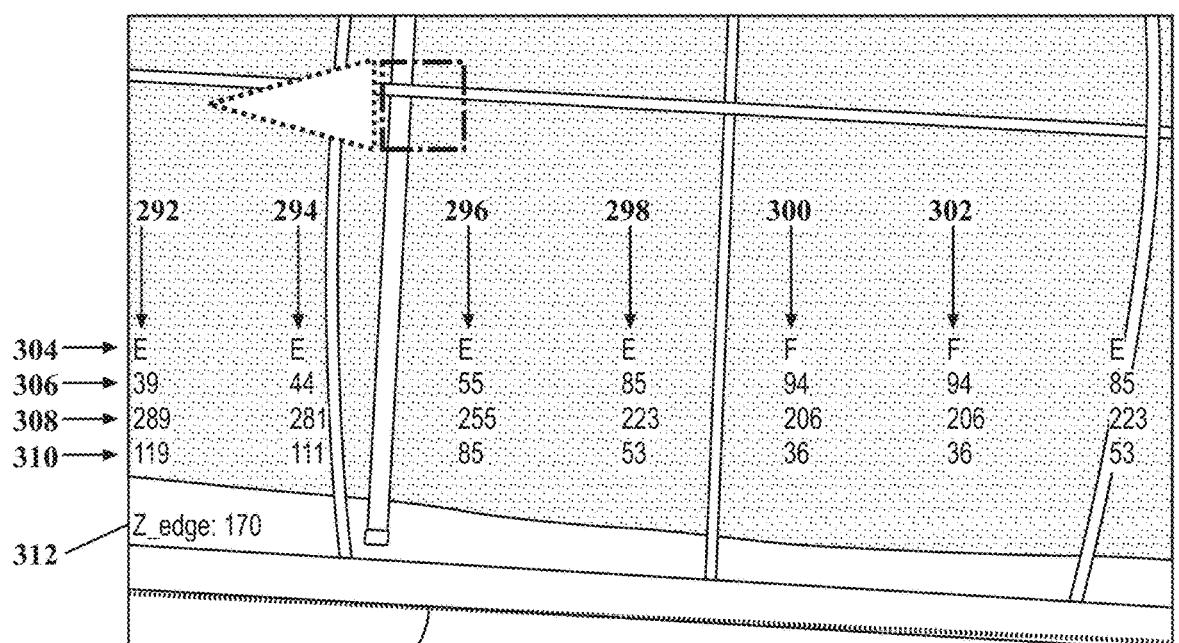
FIG. 36 illustrates a process for unloading crop material from a grain cart into a grain truck according to one implementation of the present invention.
Figure 37:
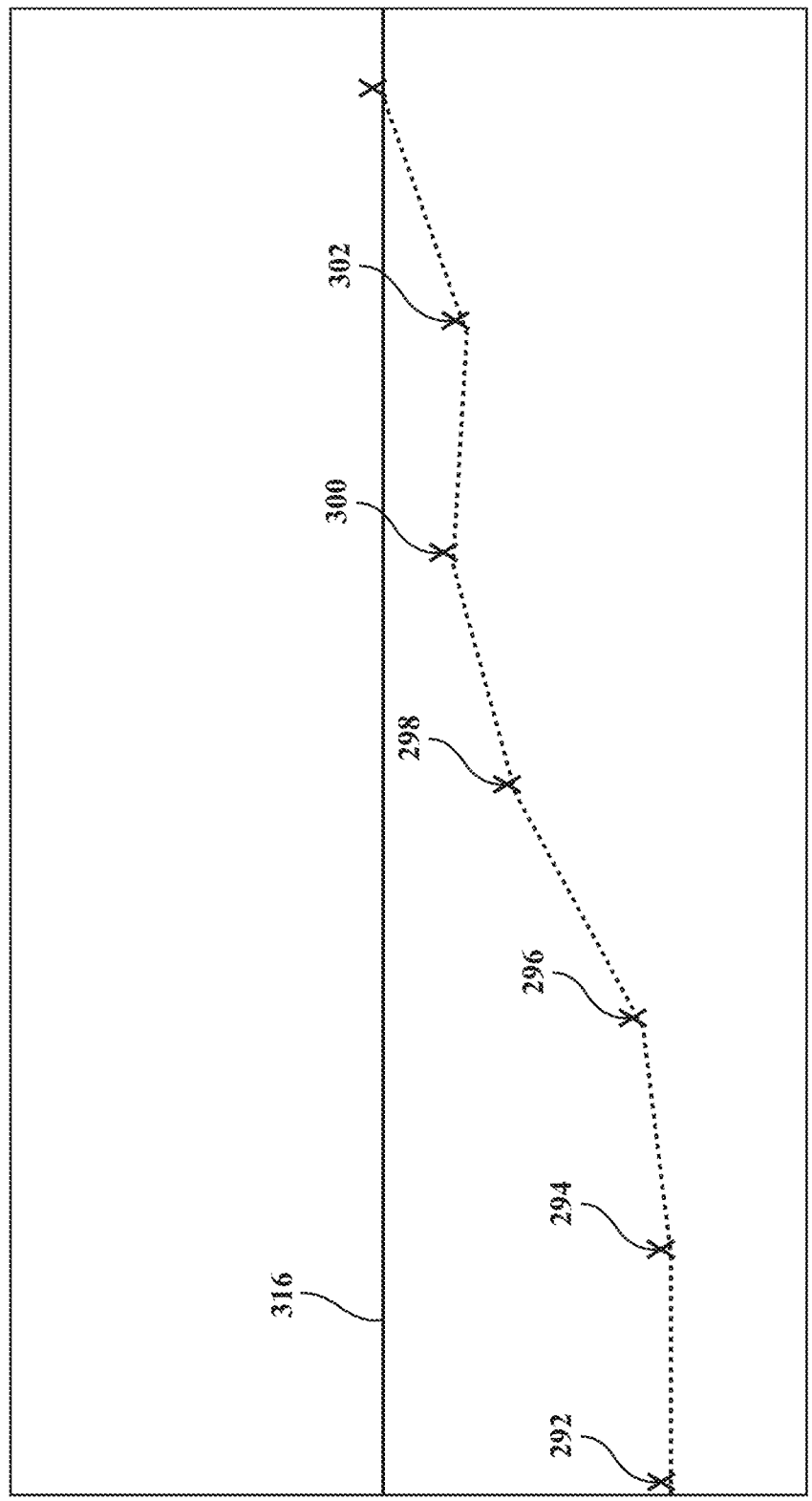
FIG. 37 illustrates a process for unloading crop material from a grain cart into a grain truck according to one implementation of the present invention.

FIG. 36 illustrates an exemplary output from the system along six different points 292, 294, 296, 298, 300, 302 within the trailer. The first row of values 304 indicates whether the trailer is empty ("E") or full ("F") at each point in the frame. The trailer is considered full if the fill level at that point is more than 90%. Otherwise, it is considered empty. The second row of values 306 shows the fill level percentage at each point along the frame. The third row of values 308 shows the vertical distance to the camera in cm. The fourth row of values 310 shows the distance from each point to the edge of the trailer in cm. The Z_edge 312 shows the distance from the detected edge of the trailer 314 to the camera in cm. FIG. 37 graphically illustrates the fill levels along the six different points 292, 294, 296, 298, 300, 302 of the frame relative to the top of the trailer 316.

Figure 38:
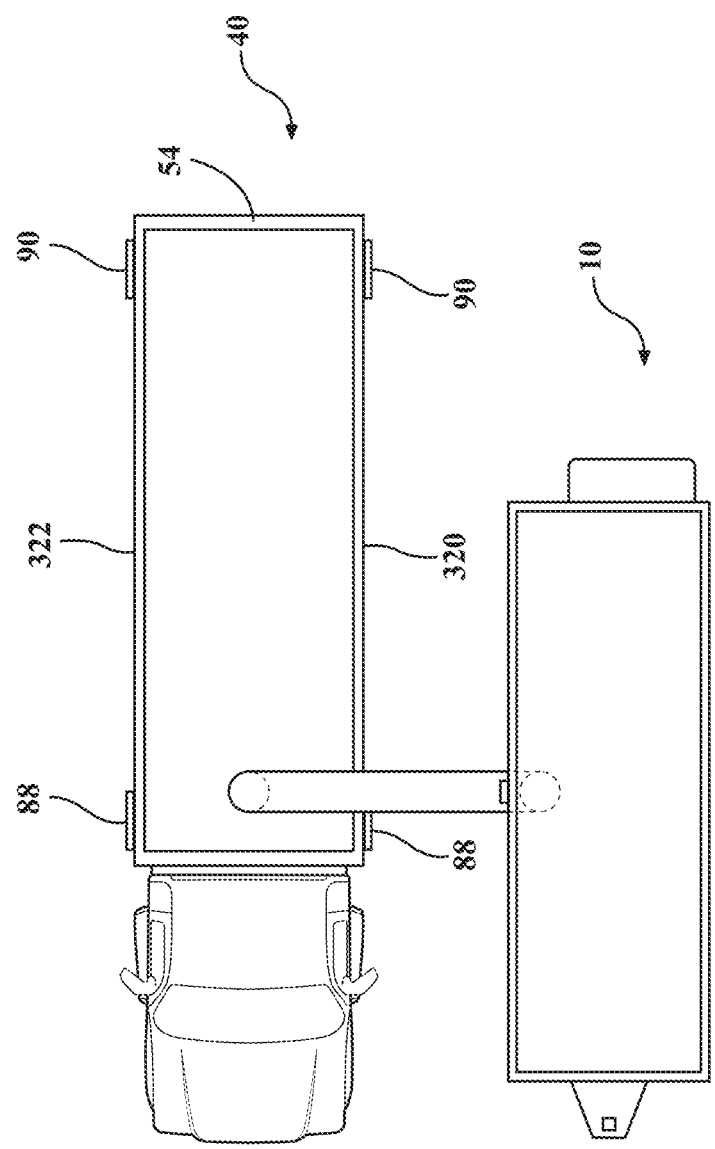
FIG. 38 illustrates a process for unloading crop material from a grain cart into a grain truck according to one implementation of the present invention.

This method of filling the grain truck 40 varies depending on the type of grain truck 40. Markers may be placed on the truck box in order to indicate the type of truck, but also to indicate the relative position of the truck box (front or rear, for example). The number and location of markers used on a grain truck 40 varies depending on the type of grain truck 40 to allow for different fill strategies. To allow a grain cart 10 to unload crop material from either side of the grain truck 40, the same markers are placed in corresponding positions on both the right and left sides of the truck box 54. Thus, referring to FIG. 38, if a grain truck 40 includes a front marker 88 and a rear marker 90, the front marker 88 is place on the front end of both the left side 320 and the right side 322 of the truck box 54. Similarly, the rear marker 90 is place on the rear end of both the left side 320 and the right side 322 of the truck box 54.

Figure 39:
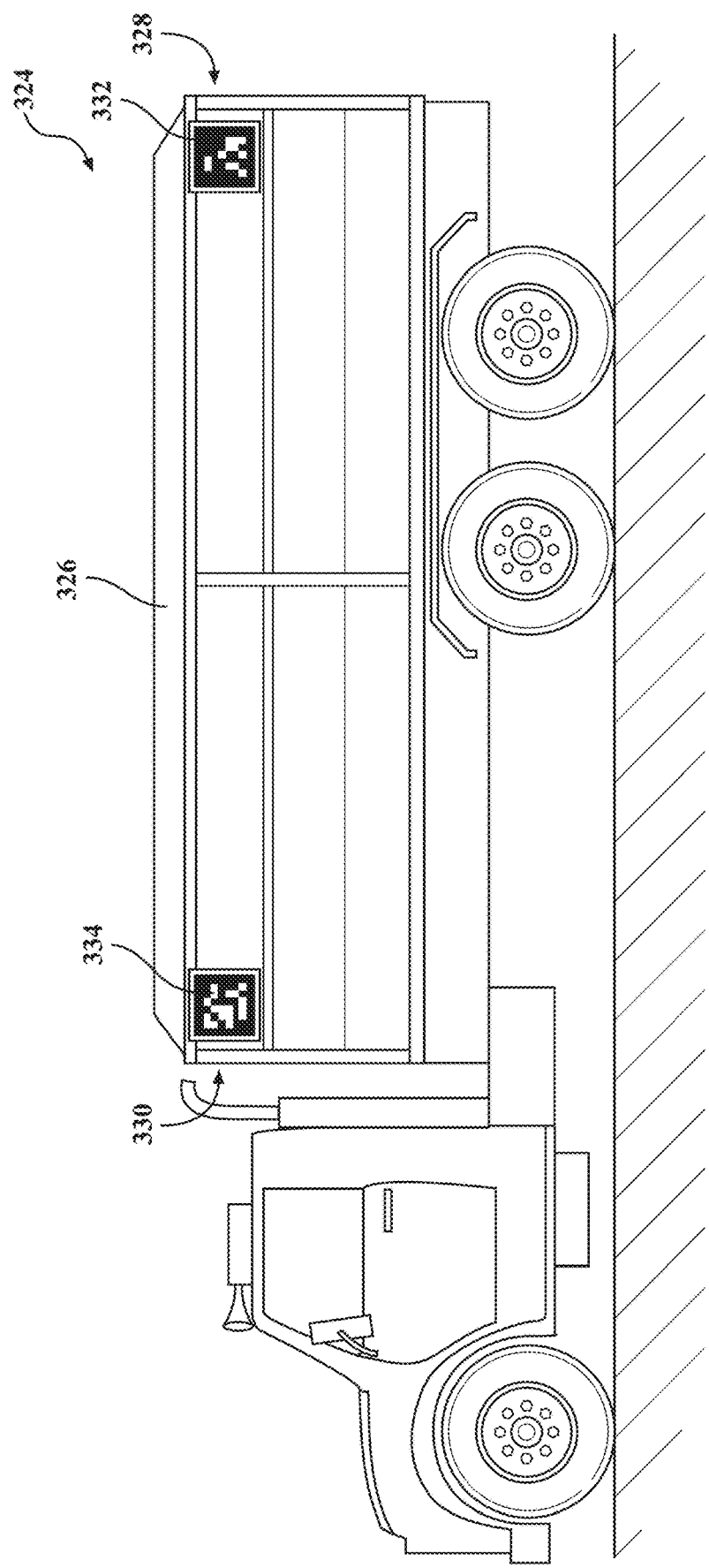
FIG. 39 is a side view of a grain truck with markers according to one implementation of the present invention.
Figure 40:
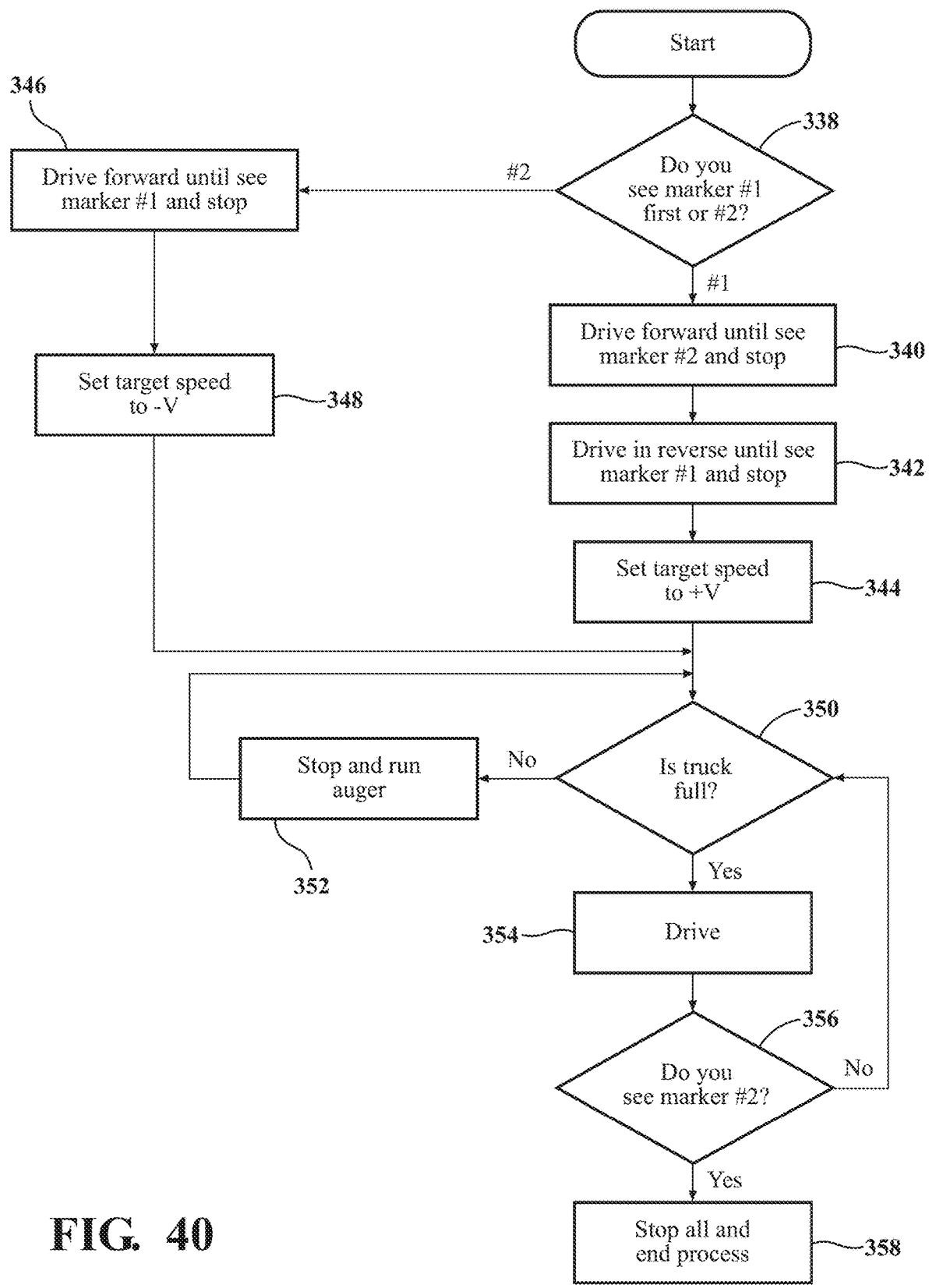
FIG. 40 illustrates an exemplary process for unloading crop material into the grain truck of FIG. 39.

FIGS. 39-40 relate to the method of unloading crop material from a grain cart 10 into a tandem grain truck 324. Referring to FIG. 39, the tandem grain truck 324 includes a first marker 332 on the rear end 328 of the truck box 326 and a second marker 334 on the front end 330 of the truck box 326. FIG. 40 illustrates an exemplary unload strategy for the grain cart 10 into the tandem grain truck 324. Initially, the system 12 determines whether it sees the first marker 332 on the rear end 328 of the truck box 326 or the second marker 334 on the front end 330 of the truck box 326 (step 338). In other words, the system 12 initially determines which end of the grain truck 40 the grain cart 10 has driven to. If the system 12 see the first marker 332 on the rear end 328 of the truck box 326, the system 12 drives forward until it sees the second marker 334 on the front end 330 of the truck box 326 and stops (step 340). The system 12 then drives in reverse until it sees the first marker 332 on the rear end 328 of the truck box 326 and stops (step 342). The system 12 then sets the target speed to +V to move the grain cart 10 in the forward direction (step 344). If at step 338, the system 12 sees the second marker 334 on the front end 330 of the truck box 326, the system 12 drives forward until it sees the first marker 332 on the rear end 328 of the truck box 326 and stops (step 346). The system 12 then sets the target speed of the grain cart 10 to −V to move the grain cart 10 in the reverse direction (step 348). After setting the target speed of the grain cart 10 at steps 344 and/or 348, the system 12 determines whether the current truck box location is full (step 350). If the current truck box location is not full, the system 12 keeps the grain cart 10 at the current location and runs the unload auger 24 (step 352). The system 12 continues unloading the crop material into the current truck box location (step 352) until it determines that it is full (step 350). When the system 12 determines that the current truck box location is full (step 350), the system 12 drives the grain cart 10 to the next location (step 354) and determines whether it sees the second marker 334 on the front end 330 of the truck box 326 (step 356). If the system 12 does not see the second marker 334 on the front end 330 of the truck box 326, the system 12 returns to step 350 to determine whether the current truck box location is full. Otherwise, if the system 12 sees the second marker 334 on the front end 330 of the truck box 326, the system 12 stops the unload auger 24 and ends the unload process (step 358).

Figure 41:
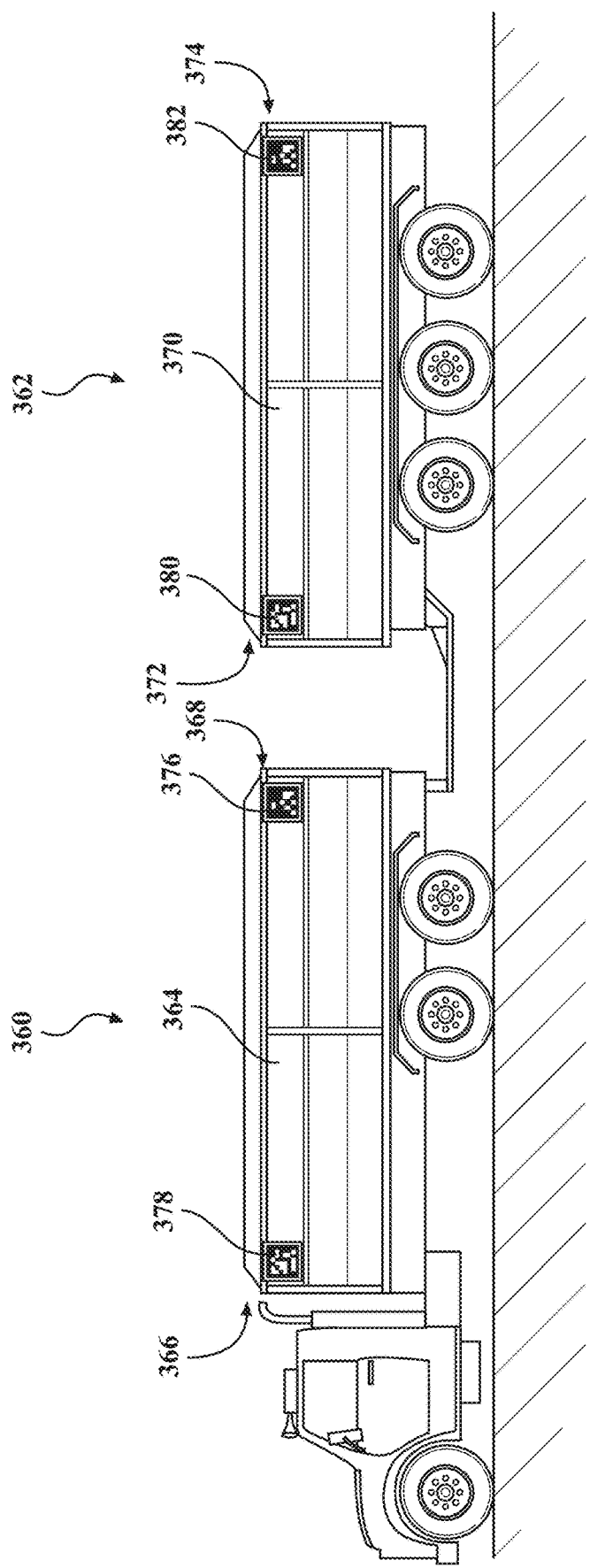
FIG. 41 is a side view of a grain truck with markers according to one implementation of the present invention.
Figure 42A:
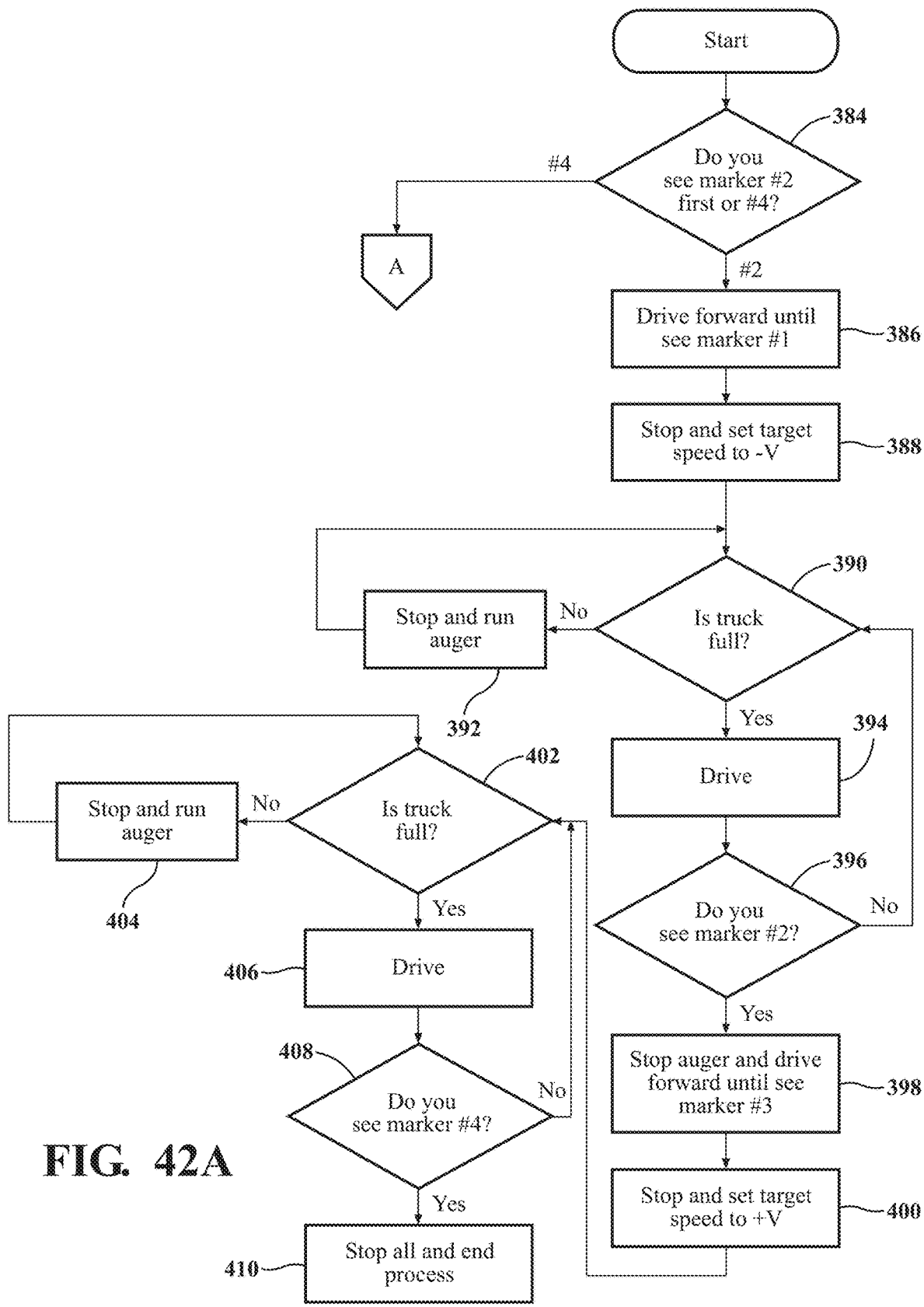
FIGS. 42A-B illustrate an exemplary process for unloading crop material into the grain truck of FIG. 41.
Figure 42B:
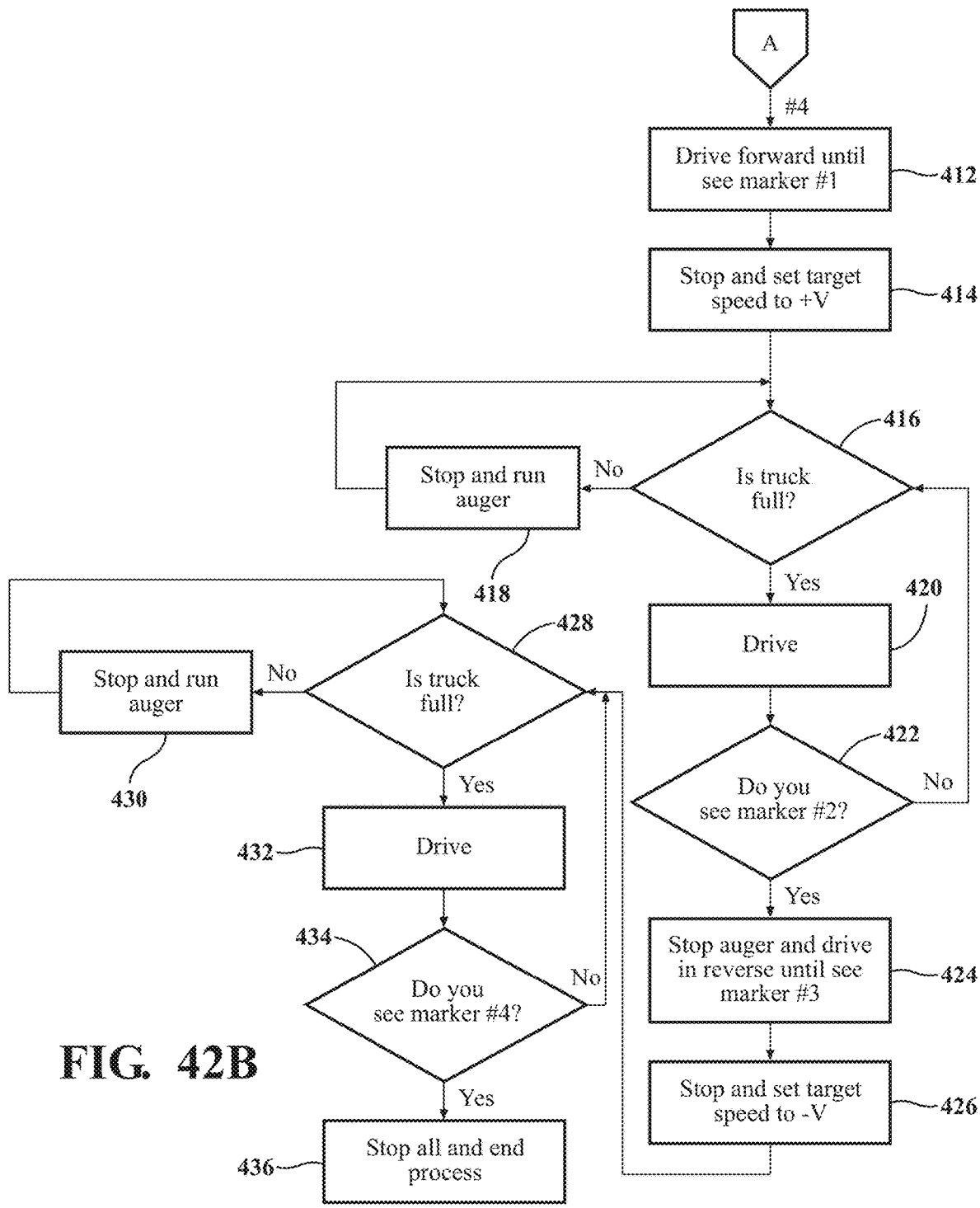

FIGS. 41 and 42A-42B relate to the method of unloading crop material from a grain cart 10 into a tandem grain truck 360 with a pup trailer 362. Referring to FIG. 41, the tandem grain truck 360 includes a first marker 376 on the rear end 368 of the grain truck box 364 and a second marker 378 on the front end 366 of the grain truck box 364. The pup trailer 362 includes a third marker 380 on the front end 372 of the pup trailer box 370 and a fourth marker 382 on the rear end 374 of the pup trailer box 370. FIGS. 42A-B illustrate an exemplary unload strategy for the grain cart 10 into the tandem grain truck 360 with the pup trailer 362. Initially, the system 12 determines whether it sees the second marker 378 on the front end 366 of the grain truck box 364 or the fourth marker 382 on the rear end 374 of the pup trailer box 370 (step 384). If the system 12 sees the second marker 378 on the front end 366 of the grain truck box 364, it drives the grain cart 10 forward until it sees the first marker 376 on the rear end 368 of the grain truck box 364 (step 386). The system 12 then stops the grain cart 10 and sets its target speed to −V (step 388). The system 12 then determines whether the current truck box location is full (step 390). If the current truck box location is not full, the system 12 keeps the grain cart 10 at the current location and runs the unload auger 24 (step 392). The system 12 continues unloading the crop material into the current truck box location (step 392) until it determines that it is full (step 390). When the system 12 determines that the current truck box location is full (step 390), the system 12 drives the grain cart 10 to the next location (step 394) and determines whether it sees the second marker 378 on the front end 366 of the grain truck box 364 (step 396). If the system 12 does not see the second marker 378 on the front end 366 of the grain truck box 364, the system 12 returns to step 390 to determine whether the current truck box location is full. Otherwise, if the system 12 sees the second marker 378 on the front end 366 of the grain truck box 364, the system 12 stops the unload auger 24 and drives the grain cart 10 forward until the system 12 sees the third marker 380 on the front end 372 of the pup trailer box 370 (step 398). When the system 12 sees the third marker 380 on the front end 372 of the pup trailer box 370, the system 12 stops the grain cart 10 and sets its target speed to +V (step 400). The system 12 then determines whether the current truck box location is full (step 402). If the current truck box location is not full, the system 12 keeps the grain cart 10 at the current location and runs the unload auger 24 (step 404). The system 12 continues unloading the crop material into the current truck box location (step 404) until it determines that it is full (step 402). When the system 12 determines that the current truck box location is full (step 402), the system 12 drives the grain cart 10 to the next location (step 406) and determines whether it sees the fourth marker 382 on the rear end 374 of the pup trailer box 370 (step 408). If the system 12 does not see the fourth marker 382 on the rear end 374 of the pup trailer box 370, the system 12 returns to step 402 to determine whether the current truck box location is full. Otherwise, if the system 12 sees the fourth marker 382 on the rear end 374 of the pup trailer box 370, the system 12 stops the unload auger 24 and ends the unload process (step 410).

If at step 384, the system 12 sees the fourth marker 382 on the rear end 374 of the pup trailer box 370, the system 12 drives the grain cart 10 forward until it sees the first marker 376 on the rear end 368 of the grain truck box 364 (step 412, FIG. 42B). The system 12 then stops the grain cart 10 and sets its target speed to +V (step 414). The system 12 then determines whether the current truck box location is full (step 416). If the current truck box location is not full, the system 12 keeps the grain cart 10 at the current location and runs the unload auger 24 (step 418). The system 12 continues unloading the crop material into the current truck box location (step 418) until it determines that it is full (step 416). When the system 12 determines that the current truck box location is full (step 416), the system 12 drives the grain cart 10 to the next location (step 420) and determines whether it sees the second marker 378 on the front end 366 of the grain truck box 364 (step 422). If the system 12 does not see the second marker 378 on the front end 366 of the grain truck box 364, the system 12 returns to step 416 to determine whether the current truck box location is full. Otherwise, if the system 12 sees the second marker 378 on the front end 366 of the grain truck box 364, the system 12 stops the unload auger 24 and drives the grain cart 10 in reverse until it sees the third marker 380 on the front end 372 of the pup trailer box 370 (step 424). When the system 12 sees the third marker 380 on the front end 372 of the pup trailer box 370, the system 12 stops the grain cart 10 and sets its target speed to −V (step 426). The system 12 then determines whether the current truck box location is full (step 428). If the current truck box location is not full, the system 12 keeps the grain cart 10 at the current location and runs the unload auger 24 (step 430). The system 12 continues unloading the crop material into the current truck box location (step 430) until it determines that it is full (step 428). When the system 12 determines that the current truck box location is full (step 428), the system 12 drives the grain cart 10 to the next location (step 432) and determines whether it sees the fourth marker 382 on the rear end 374 of the pup trailer box 370 (step 434). If the system 12 does not see the fourth marker 382 on the rear end 374 of the pup trailer box 370, the system 12 returns to step 428 to determine whether the current truck box location is full. Otherwise, if the system 12 sees the fourth marker 382 on the rear end 374 of the pup trailer box 370, the system 12 stops the unload auger 24 and ends the unload process (step 436).

Figure 43:
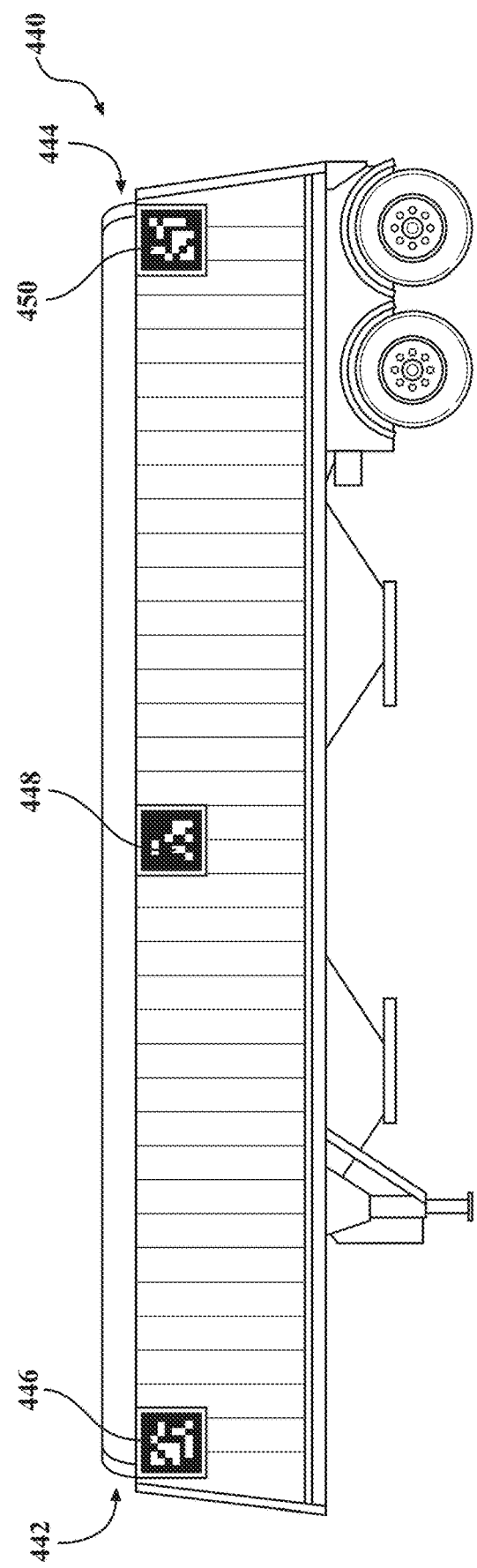
FIG. 43 is a side view of a grain truck with markers according to one implementation of the present invention.
Figure 44:
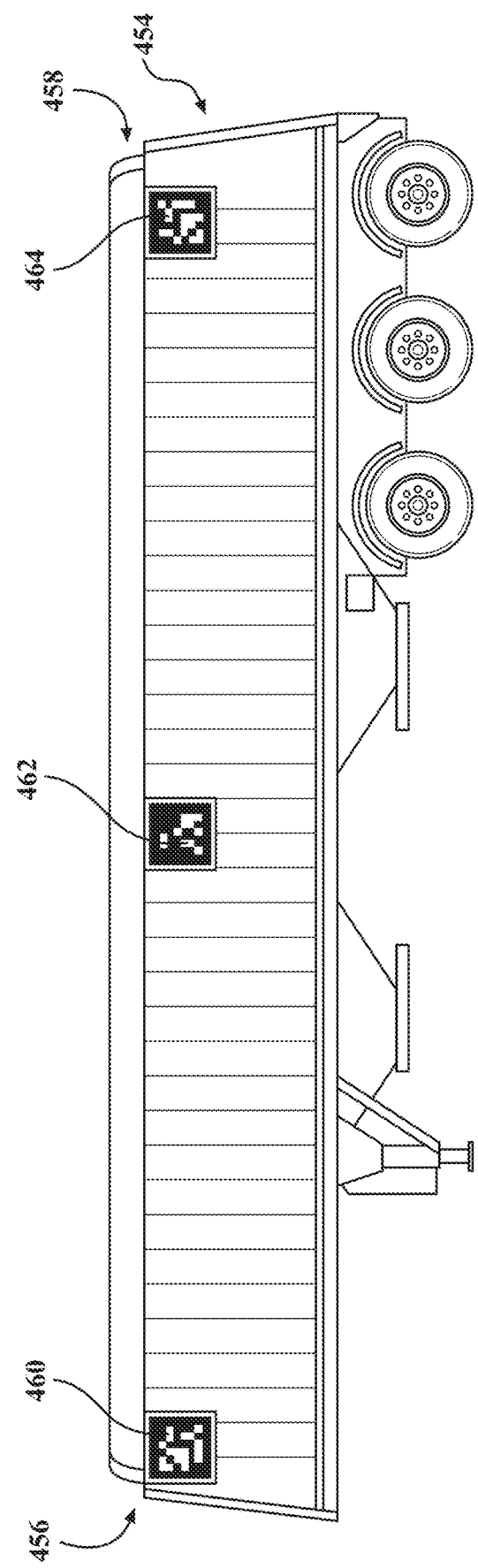
FIG. 44 is a side view of a grain truck with markers according to one implementation of the present invention.
Figure 45A:
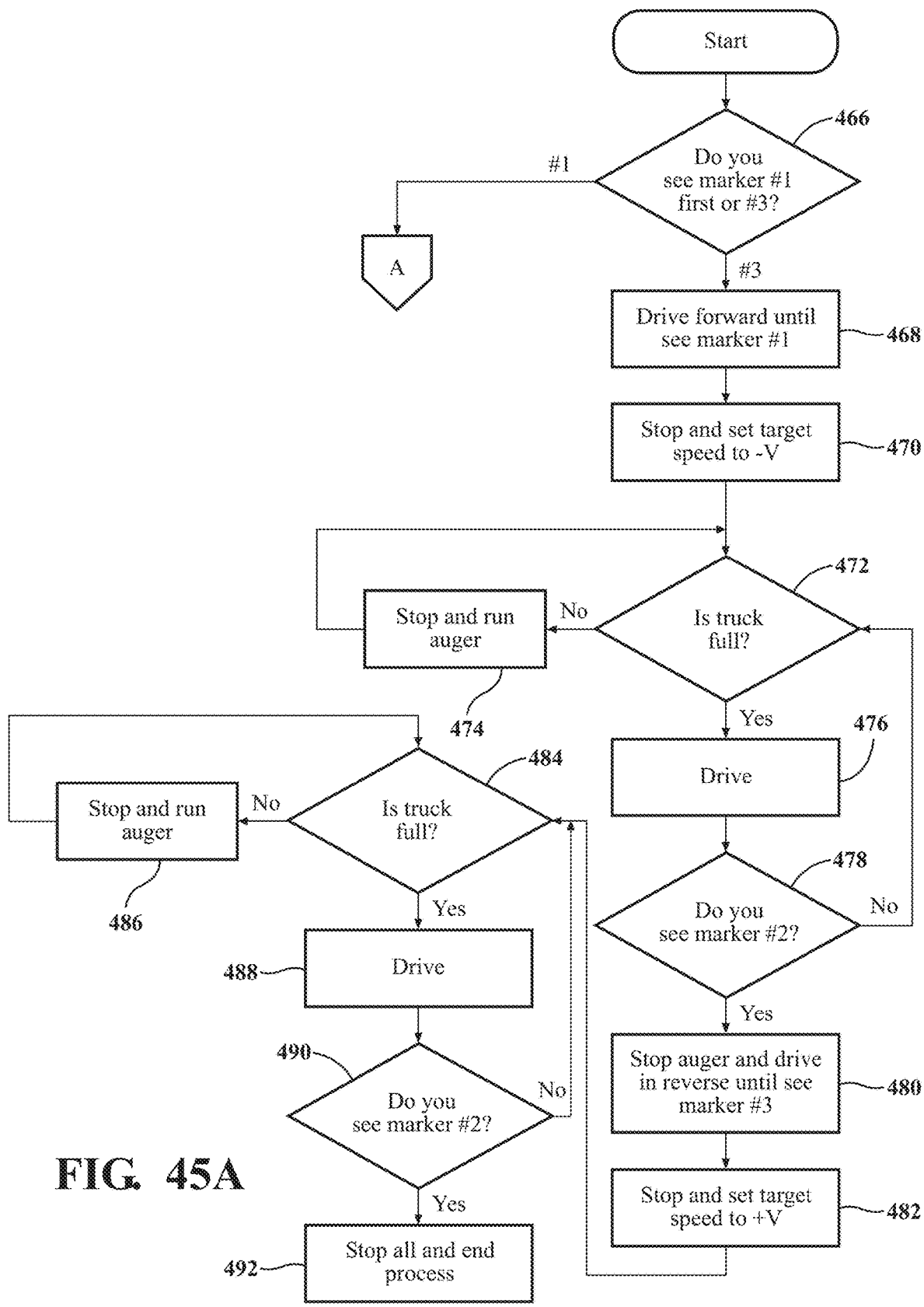
FIGS. 45A-B illustrate an exemplary process for unloading crop material into the grain truck of FIG. 43 or FIG. 44.
Figure 45B:
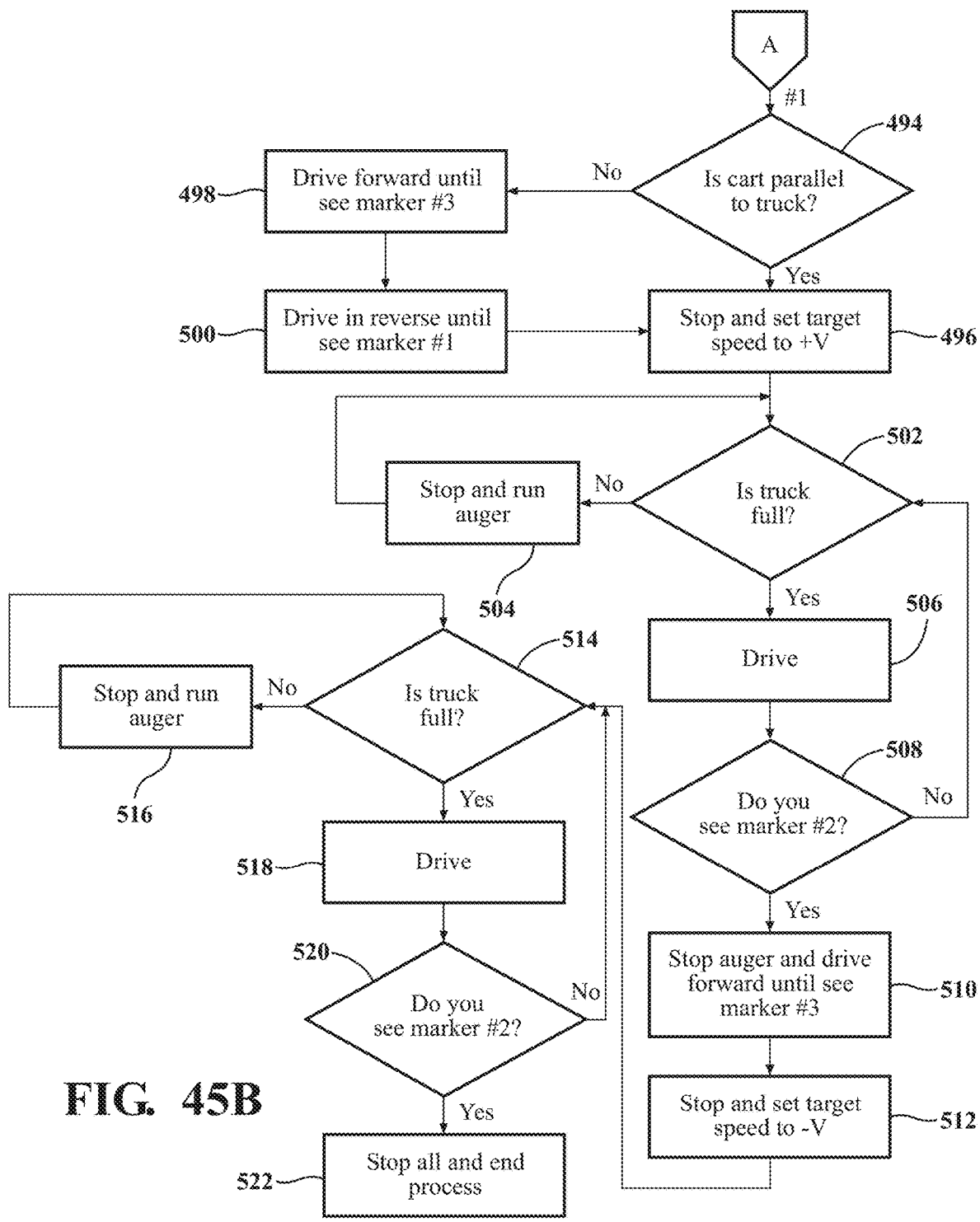

FIGS. 43, 44 and 45A-45B relate to the method of unloading crop material from a grain cart 10 into a tandem 2 hopper 440 or a tridem 2 hopper 454. Referring to FIG. 43, the tandem 2 hopper 440 includes a first marker 446 on the front end 442 of the hopper 440, a third marker 450 on the rear end 444 of the hopper 440, and a second marker 448 in the center portion of the hopper 440 between the first marker 446 and the third marker 450. Referring to FIG. 44, the tridem 2 hopper 454 includes a first marker 460 on the front end 456 of the hopper 454, a third marker 464 on the rear end 458 of the hopper 454, and a second marker 462 in the center portion of the hopper 454 between the first marker 460 and the third marker 464. FIGS. 45A-B illustrate an exemplary unload strategy for the grain cart 10 into the tandem 2 hopper 440 or the tridem 2 hopper 454. Initially, the system 12 determines whether it sees the first marker 446, 460 on the front end 442, 454 of the hopper 440, 454 or the third marker 450, 464 on the rear end 444, 458 of the hopper 440, 454 (step 466). If the system 12 sees the third marker 450, 464 on the rear end 444, 458 of the hopper 440, 454, it drives the grain cart 10 forward until it sees the first marker 446, 460 on the front end 442, 456 of the hopper 440, 454 (step 468). The system 12 then stops the grain cart 10 and sets its target speed to −V (step 470). The system 12 then determines whether the current hopper location is full (step 472). If the current hopper location is not full, the system 12 keeps the grain cart 10 at the current location and runs the unload auger 24 (step 474). The system 12 continues unloading the crop material into the current hopper location (step 474) until it determines that it is full (step 472). When the system 12 determines that the current hopper location is full (step 472), the system 12 drives the grain cart 10 to the next location (step 476) and determines whether it sees the second marker 448, 462 in the center portion of the hopper 440, 454 (step 478). If the system 12 does not see the second marker 448, 462 in the center portion of the hopper 440, 454, the system 12 returns to step 472 to determine whether the current hopper location is full. Otherwise, if the system 12 sees the second marker 448, 462 in the center portion of the hopper 440, 454, the system 12 stops the unload auger 24 and drives the grain cart 10 in reverse until it sees the third marker 450, 464 on the rear end 444, 458 of the hopper 440, 454 (step 480). When the system 12 sees the third marker 450, 464 on the rear end 444, 458 of the hopper 440, 454, the system 12 stops the grain cart 10 and sets its target speed to +V (step 482). The system 12 then determines whether the current hopper location is full (step 484). If the current hopper location is not full, the system 12 keeps the grain cart 10 at the current location and runs the unload auger 24 (step 486). The system 12 continues unloading the crop material into the current hopper location (step 486) until it determines that it is full (step 484). When the system 12 determines that the current hopper location is full (step 402), the system 12 drives the grain cart 10 to the next location (step 488) and determines whether it sees the second marker 448, 462 in the center portion of the hopper 440, 454 (step 490). If the system 12 does not see the second marker 448, 462 in the center portion of the hopper 440, 454, the system 12 returns to step 484 to determine whether the current hopper location is full. Otherwise, if the system 12 sees the second marker 448, 462 in the center portion of the hopper 440, 454, the system 12 stops the unload auger 24 and ends the unload process (step 492).

If at step 466, the system 12 sees the first marker 446, 460 on the front end 442, 456 of the hopper 440, 454, the system 12 determines whether the grain cart 10 is parallel to the hopper 440, 454 (step 494). If the grain cart 10 is parallel to the hopper 440, 454, the system 12 stops the grain cart 10 and sets its target speed to +V (step 496). Otherwise, the system 12 drives the grain cart 10 forward until it sees the third marker 450, 464 on the rear end 444, 458 of the hopper 440, 454 (step 498) and then drives the grain cart 10 in reverse until it sees the first marker 446, 460 on the front end 442, 456 of the hopper 440, 454 (step 500) before it stops the grain cart 10 and sets its target speed to +V (step 496). The system 12 then determines whether the current hopper location is full (step 502). If the current hopper location is not full, the system 12 keeps the grain cart 10 at the current location and runs the unload auger 24 (step 504). The system 12 continues unloading the crop material into the current hopper location (step 504) until it determines that it is full (step 502). When the system 12 determines that the current hopper location is full (step 502), the system 12 drives the grain cart 10 to the next location (step 506) and determines whether it sees the second marker 448, 462 in the center portion of the hopper 440, 454 (step 508). If the system 12 does not see the second marker 448, 462 in the center portion of the hopper 440, 454, the system 12 returns to step 502 to determine whether the current hopper location is full. Otherwise, if the system 12 sees the second marker 448, 462 in the center portion of the hopper 440, 454, the system 12 stops the unload auger 24 and drives the grain cart 10 forward until it sees the third marker 450, 464 on the rear end 444, 458 of the hopper 440, 454 (step 510). When the system 12 sees the third marker 450, 464 on the rear end 444, 458 of the hopper 440, 454, the system 12 stops the grain cart 10 and sets its target speed to −V (step 512). The system 12 then determines whether the current hopper location is full (step 514). If the current hopper location is not full, the system 12 keeps the grain cart 10 at the current location and runs the unload auger 24 (step 516). The system 12 continues unloading the crop material into the current hopper location (step 516) until it determines that it is full (step 514). When the system 12 determines that the current hopper location is full (step 514), the system 12 drives the grain cart 10 to the next location (step 518) and determines whether it sees the second marker 448, 462 in the center portion of the hopper 440, 454 (step 520). If the system 12 does not see the second marker 448, 462 in the center portion of the hopper 440, 454, the system 12 returns to step 514 to determine whether the current hopper location is full. Otherwise, if the system 12 sees the second marker 448, 462 in the center portion of the hopper 440, 454, the system 12 stops the unload auger 24 and ends the unload process (step 522).

Figure 46:
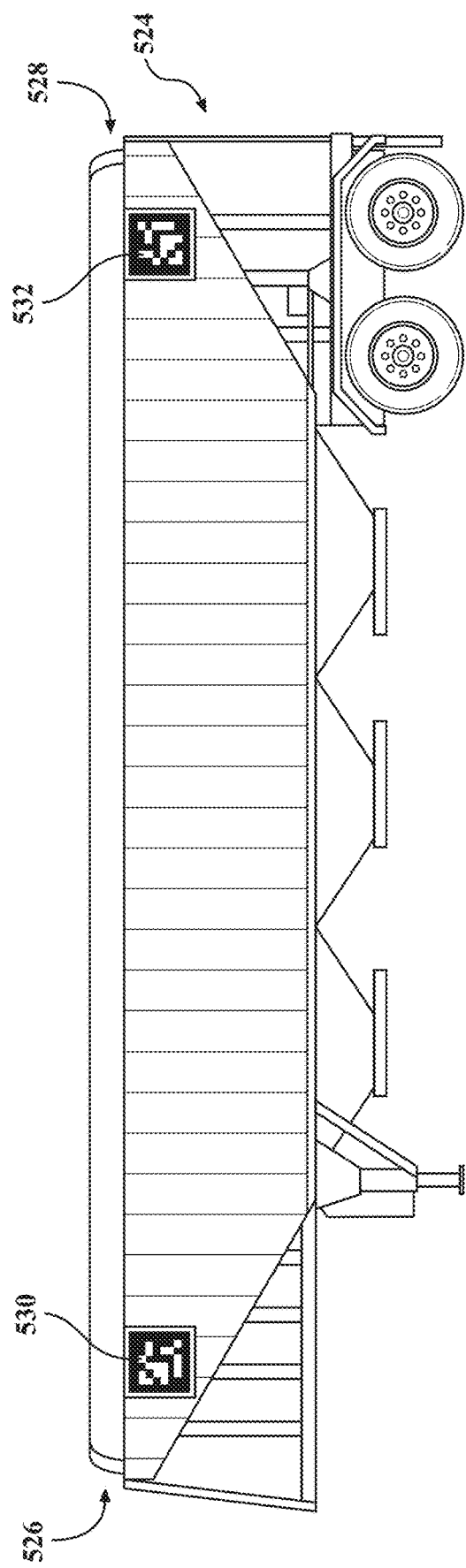
FIG. 46 is a side view of a grain truck with markers according to one implementation of the present invention.
Figure 47:
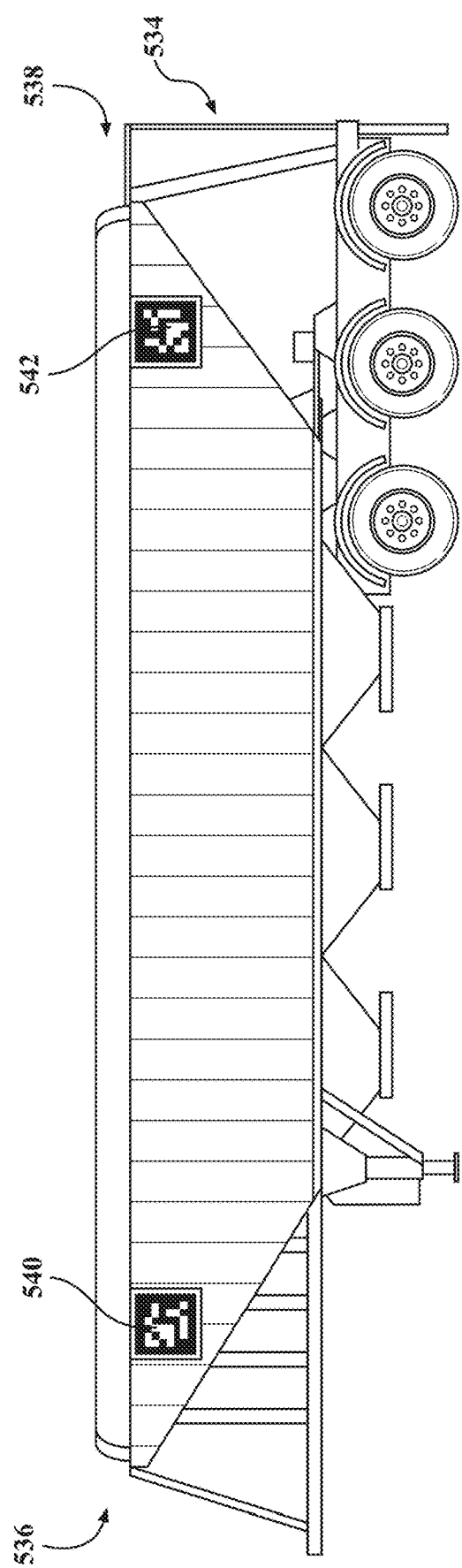
FIG. 47 is a side view of a grain truck with markers according to one implementation of the present invention.
Figure 48A:
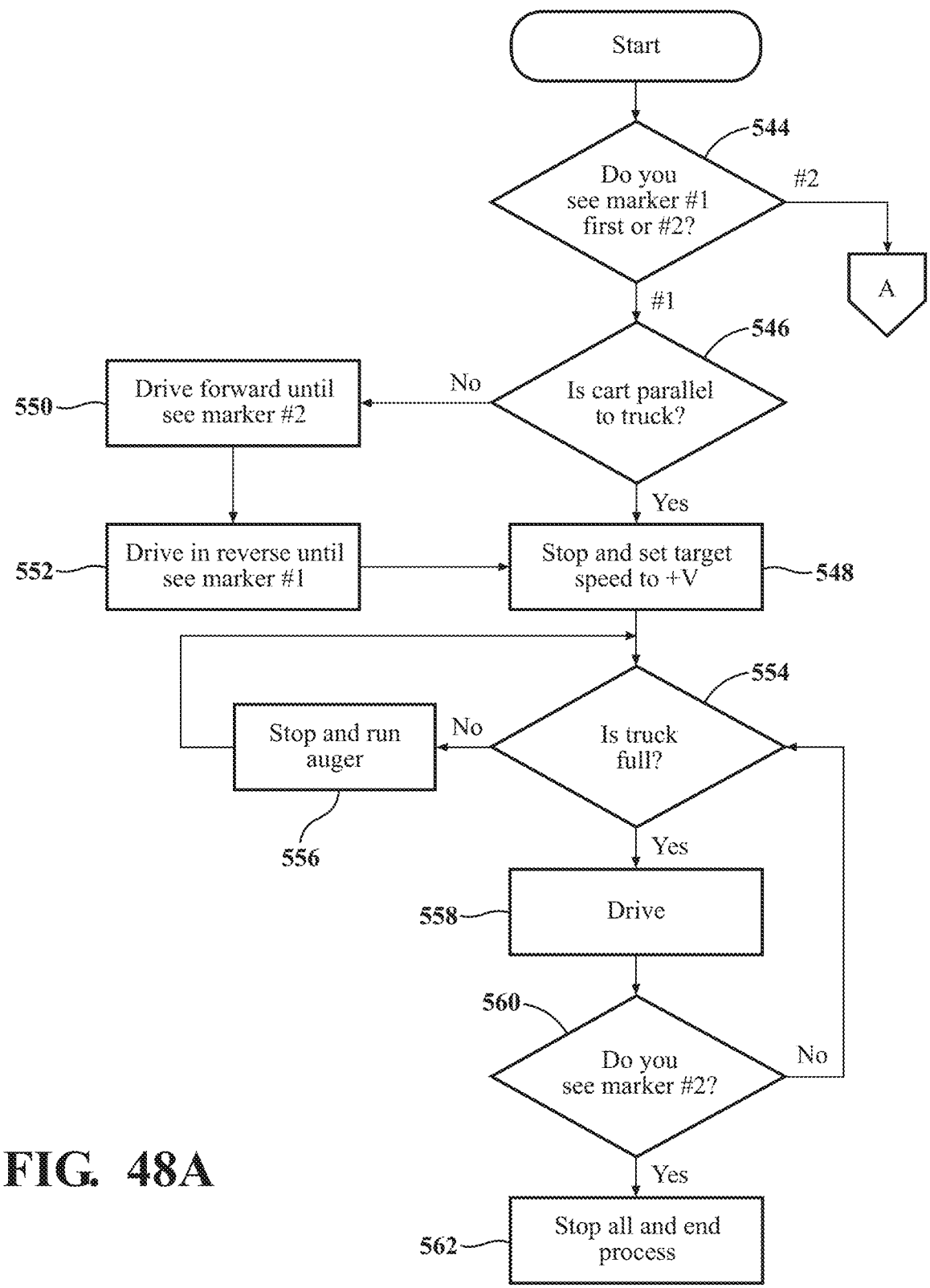
FIGS. 48A-B illustrate an exemplary process for unloading crop material into the grain truck of FIG. 46 or FIG. 47.
Figure 48B:
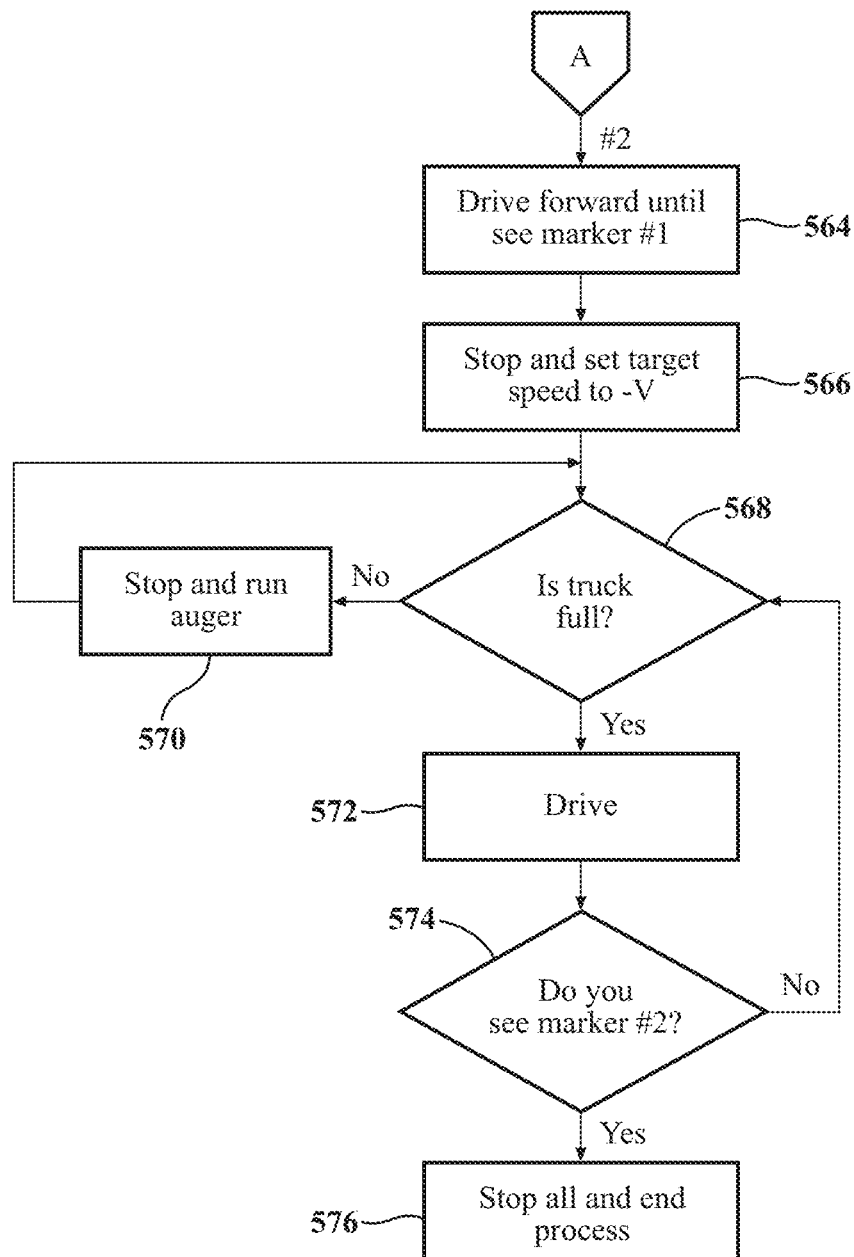

FIGS. 46, 47 and 48A-48B relate to the method of unloading crop material from a grain cart 10 into a tandem 3 hopper 524 or a tridem 3 hopper 534. Referring to FIG. 46, the tandem 3 hopper 524 includes a first marker 530 on the front end 526 of the hopper 524 and a second marker 532 on the rear end 528 of the hopper 524. Referring to FIG. 47, the tridem 3 hopper 534 includes a first marker 540 on the front end 536 of the hopper 534 and a second marker 542 on the rear end 538 of the hopper 534. FIGS. 48A-B illustrate an exemplary unload strategy for the grain cart 10 into the tandem 3 hopper 524 or the tridem 3 hopper 534. Initially, the system 12 determines whether it sees the first marker 530, 540 on the front end 526, 536 of the hopper 524, 534 or the second marker 532, 542 on the rear end 528, 538 of the hopper 524, 534 (step 544). If the system 12 sees the first marker 530, 540 on the front end 526, 536 of the hopper 524, 534, it determines whether the grain cart 10 is parallel to the hopper (step 546). If the grain cart 10 is parallel to the hopper, the system 12 stops the grain cart 10 and sets its target speed to +V (step 548). Otherwise, the system 12 drives the grain cart 10 forward until it sees the second marker 532, 542 on the rear end 528, 538 of the hopper 524, 534 (step 550), and then it drives the grain cart 10 in reverse until it sees the first marker 530, 540 on the front end 526, 536 of the hopper 524, 534 (step 552) before it stops the grain cart 10 and sets its target speed to +V (step 548). The system 12 then determines whether the current hopper location is full (step 554). If the current hopper location is not full, the system 12 keeps the grain cart 10 at the current location and runs the unload auger 24 (step 556). The system 12 continues unloading the crop material into the current hopper location (step 556) until it determines that it is full (step 554). When the system 12 determines that the current hopper location is full (step 554), the system 12 drives the grain cart 10 to the next location (step 558) and determines whether it sees the second marker 532, 542 on the rear end 528, 538 of the hopper 524, 534 (step 560). If the system 12 does not see the second marker 532, 542 on the rear end 528, 538 of the hopper 524, 534, the system 12 returns to step 554 to determine whether the current hopper location is full. Otherwise, if the system 12 sees the second marker 532, 542 on the rear end 528, 538 of the hopper 524, 534, the system 12 stops the unload auger 24 and ends the unload process (step 562).

If at step 544, the system 12 sees the second marker 532, 542 on the rear end 528, 538 of the hopper 524, 534, the system 12 drives the grain cart 10 forward until it sees the first marker 530, 540 on the front end 526, 536 of the hopper 524, 534 (step 564, FIG. 48B). The system 12 then stops the grain cart 10 and sets its target speed to −V (step 566). The system 12 then determines whether the current hopper location is full (step 568). If the current hopper location is not full, the system 12 keeps the grain cart 10 at the current location and runs the unload auger 24 (step 570). The system 12 continues unloading the crop material into the current hopper location (step 570) until it determines that it is full (step 568). When the system 12 determines that the current hopper location is full (step 568), the system 12 drives the grain cart 10 to the next location (step 572) and determines whether it sees the second marker 532, 542 on the rear end 528, 538 of the hopper 524, 534 (step 574). If the system 12 does not see the second marker 532, 542 on the rear end 528, 538 of the hopper 524, 534, the system 12 returns to step 568 to determine whether the current hopper location is full. Otherwise, if the system 12 sees the second marker 532, 542 on the rear end 528, 538 of the hopper 524, 534, the system 12 stops the unload auger 24 and ends the unload process (step 576).

Figure 49:
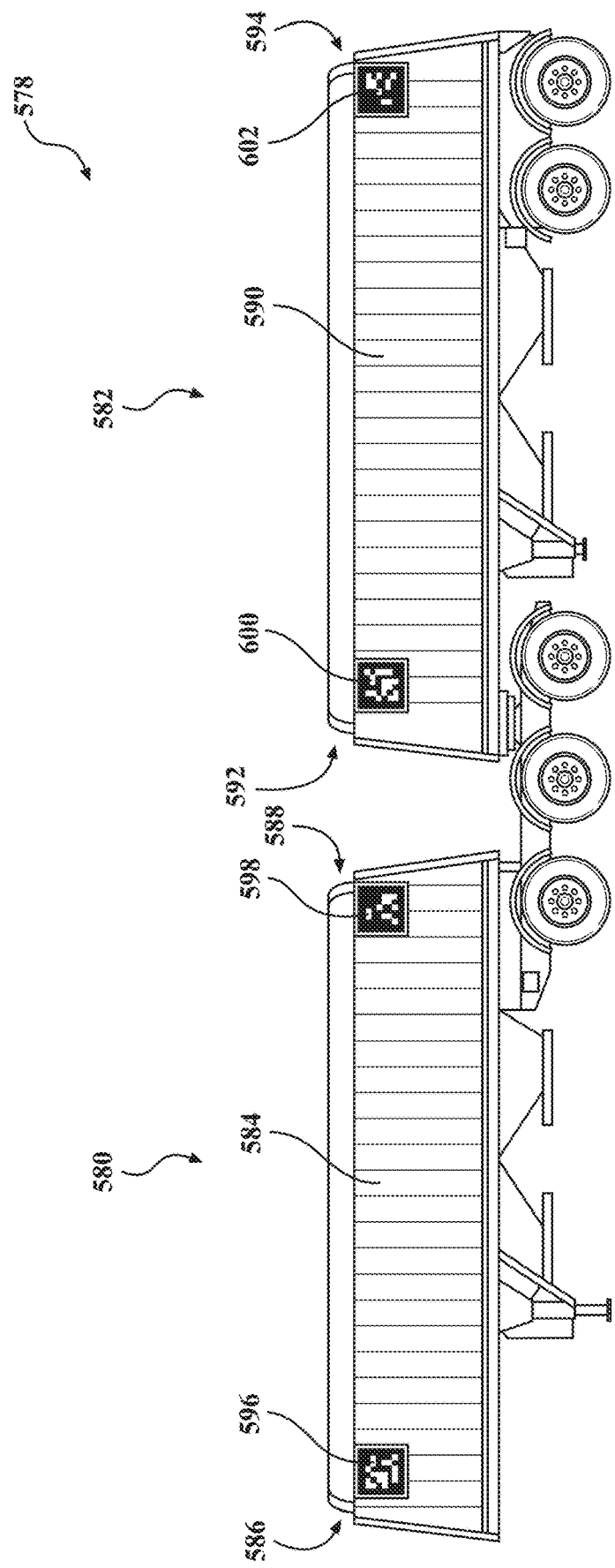
FIG. 49 is a side view of a grain truck with markers according to one implementation of the present invention.
Figure 50A:
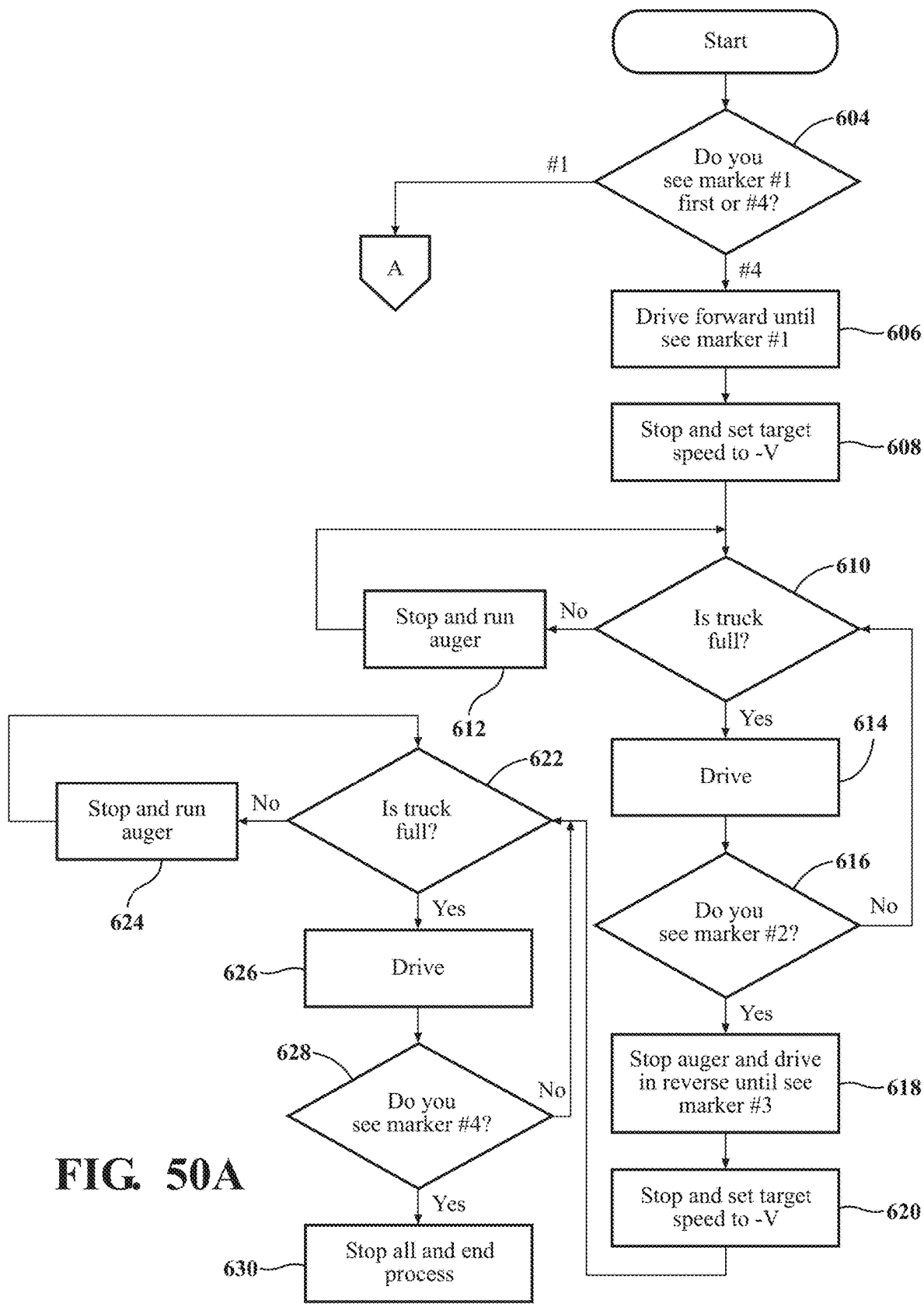
FIGS. 50A-B illustrate an exemplary process for unloading crop material into the grain truck of FIG. 43 or FIG. 44.
Figure 50B:
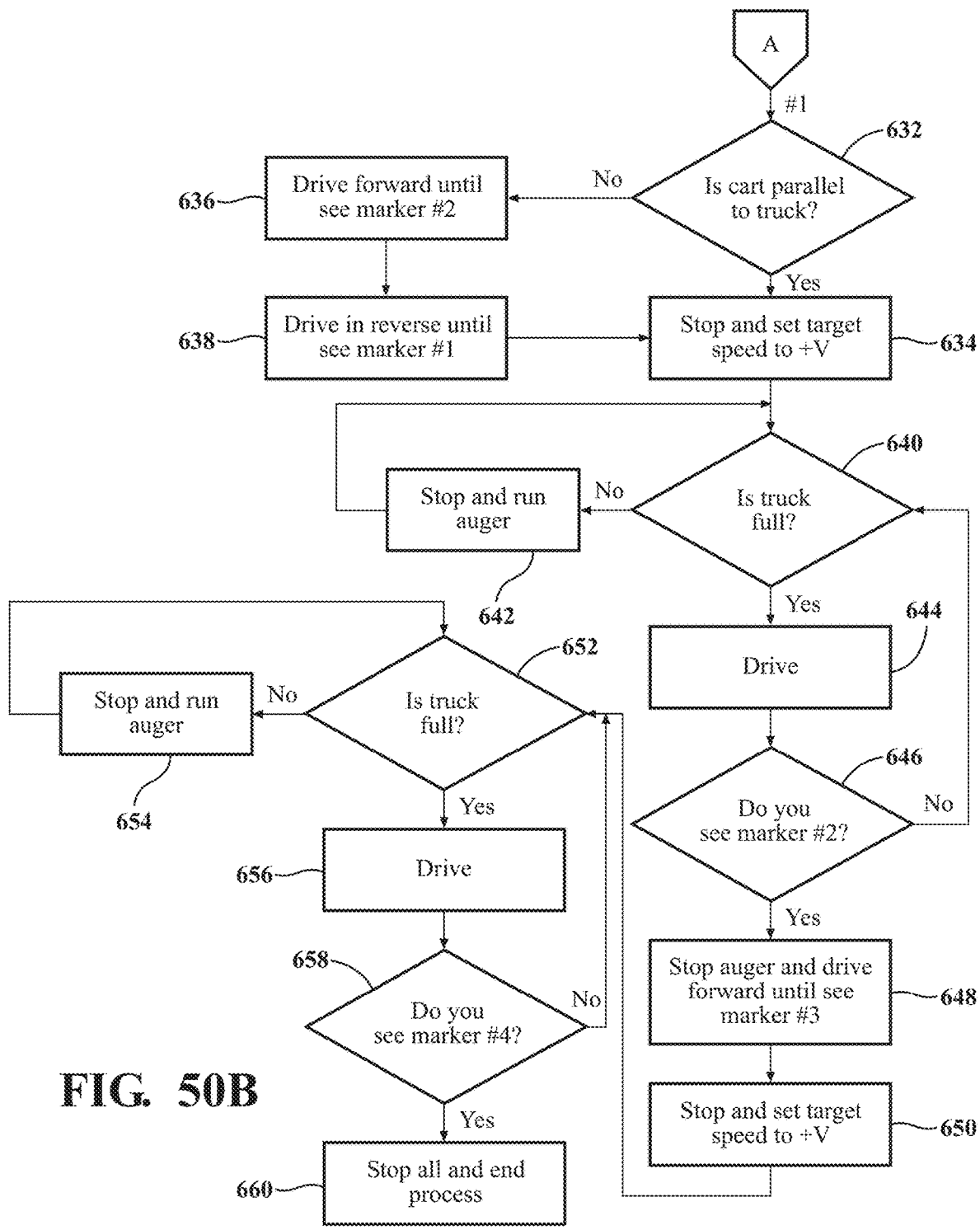

FIGS. 49 and 50A-50B relate to the method of unloading crop material from a grain cart 10 into a Super B 578. Referring to FIG. 49, the Super B 578 includes a lead trailer 580 and a pup trailer 582. The lead trailer 580 includes a first marker 596 on the front end 586 of the lead trailer truck box 584, and a second marker 598 on the rear end 588 of the lead trailer truck box 584. The pup trailer 582 includes a third marker 600 on the front end 592 of the pup trailer box 590, and a fourth marker 602 on the rear end 594 of the pup trailer truck box 590. FIGS. 50A-B illustrate an exemplary unload strategy into the Super B 578. Initially, the system 12 determines whether it sees the first marker 596 on the front end 586 of the lead trailer truck box 584 or the fourth marker 602 on the rear end 594 of the pup trailer truck box 590 (step 604). If the system 12 sees the fourth marker 602 on the rear end 594 of the pup trailer truck box 590, it drives the grain cart 10 forward until it sees the first marker 596 on the front end 586 of the lead trailer truck box 584 (step 606). The system 12 then stops the grain cart 10 and sets its target speed to −V (step 608). The system 12 then determines whether the current truck box location is full (step 610). If the current truck box location is not full, the system 12 keeps the grain cart 10 at the current location and runs the unload auger 24 (step 612). The system 12 continues unloading the crop material into the current truck box location (step 612) until it determines that it is full (step 610). When the system 12 determines that the current truck box location is full (step 610), the system 12 drives the grain cart 10 to the next location (step 614) and determines whether it sees the second marker 598 on the rear end 588 of the lead trailer truck box 584 (step 616). If the system 12 does not see the second marker 598 on the rear end 588 of the lead trailer truck box 584, the system 12 returns to step 610 to determine whether the current truck box location is full. Otherwise, if the system sees the second marker 598 on the rear end 588 of the lead trailer truck box 584, the system 12 stops the unload auger 24 and drives the grain cart 10 in reverse until it sees the third marker 600 on the front end 592 of the pup trailer box 590 (step 618). When the system 12 sees the third marker 600 on the front end 592 of the pup trailer box 590, the system 12 stops the grain cart 10 and sets its target speed to −V (step 620). The system 12 then determines whether the current truck box location is full (step 622). If the current truck box location is not full, the system 12 keeps the grain cart 10 at the current location and runs the unload auger 24 (step 624). The system 12 continues unloading the crop material into the current truck box location (step 624) until it determines that it is full (step 622). When the system 12 determines that the current truck box location is full (step 622), the system 12 drives the grain cart 10 to the next location (step 626) and determines whether it sees the fourth marker 602 on the rear end 594 of the pup trailer truck box 590 (step 628). If the system 12 does not see the fourth marker 602 on the rear end 594 of the pup trailer truck box 590, the system 12 returns to step 622 to determine whether the current hopper location is full. Otherwise, if the system 12 sees the fourth marker 602 on the rear end 594 of the pup trailer truck box 590, the system 12 stops the unload auger 24 and ends the unload process (step 630).

If at step 604, the system 12 sees the first marker 596 on the front end 586 of the lead trailer truck box 584, the system 12 determines whether the grain cart 10 is parallel to the lead trailer 580 (step 632). If the grain cart 10 is parallel to the lead trailer 580, the system 12 stops the grain cart 10 and sets the target speed to +V (step 634). Otherwise, the system 12 drives the grain cart 10 forward until it sees the second marker 598 on the rear end 588 of the lead trailer truck box 584 (step 636) and then it drives the grain cart 10 in reverse until it sees the first marker 596 on the front end 586 of the lead trailer truck box 584 (step 638) before it stops the grain cart 10 and sets its target speed to +V (step 634). The system 10 then determines whether the current truck box location is full (step 640). If the current truck box location is not full, the system 12 keeps the grain cart 10 at the current location and runs the unload auger 24 (step 642). The system 12 continues unloading the crop material into the current truck box location (step 642) until it determines that it is full (step 640). When the system 12 determines that the current truck box location is full (step 640), the system 12 drives the grain cart 10 to the next location (step 644) and determines whether it sees the second marker 598 on the rear end 588 of the lead trailer truck box 584 (step 646). If the system 12 does not see the second marker 598 on the rear end 588 of the lead trailer truck box 584, the system 12 returns to step 640 to determine whether the current truck box location is full. Otherwise, if the grain cart 10 sees the second marker 598 on the rear end 588 of the lead trailer truck box 584, the system 12 stops the unload auger 24 and drives the grain cart 10 forward until it sees the third marker 600 on the front end 592 of the pup trailer box 590 (step 648). When the system 12 sees the third marker 600 on the front end 592 of the pup trailer box 590, the system 12 stops the grain cart 10 and sets its target speed to +V (step 650). The system 12 then determines whether the current truck box location is full (step 652). If the current truck box location is not full, the system 12 keeps the grain cart 10 at the current location and runs the unload auger 24 (step 654). The system 12 continues unloading the crop material into the current truck box location (step 654) until it determines that it is full (step 652). When the system 12 determines that the current truck box location is full (step 652), the system 12 drives the grain cart 10 to the next location (step 656) and determines whether it sees the fourth marker 602 on the rear end 594 of the pup trailer truck box 590 (step 658). If the system 12 does not see the fourth marker 602 on the rear end 594 of the pup trailer truck box 590, the system 12 returns to step 652 to determine whether the current truck box location is full. Otherwise, if the grain cart 10 sees the fourth marker 602 on the rear end 594 of the pup trailer truck box 590, the system 12 stops the unload auger 24 and ends the unload process (step 660).

The invention has been described in an illustrative manner, and it is to be understood that the terminology which has been used is intended to be in the nature of words of description rather than of limitation. Directional references employed or shown in the description, figures or claims, such as top, bottom, upper, lower, upward, downward, lengthwise, widthwise, longitudinal, lateral, and the like, are relative terms employed for ease of description and are not intended to limit the scope of the invention in any respect. Many modifications and variations of the present invention are possible in light of the above teachings. It is, therefore, to be understood that within the scope of the appended claims, the invention may be practiced other than as specifically described.

The invention claimed is:

1. A system for controlling a grain cart relative to a grain truck, wherein the grain cart includes a grain tank and an unload auger configured to transfer crop material out of the grain tank, wherein the grain truck includes a truck box extending from a first end to a second end, wherein the truck box includes a top edge extending around the top of the truck box, the system comprising:

a ranging device configured to;

identify a distance to the top edge of the truck box; and
identify a distance to an area in the truck box; and
a controller configured to:
   drive the grain cart along a path from the first end of the truck box to the second end of the truck box;
   determine a position of the grain cart relative to the grain truck;
   determine whether the grain cart is positioned near the first end of the truck box; and
   if the controller determines that the grain cart is positioned near the first end of the truck box, the controller is configured to:
      determine a fill level in the area based on the distance to the top edge of the truck box and the distance to the area in the truck box;
      determine whether the fill level exceeds a threshold;
      if the controller determines that the fill level does not exceed the threshold, the controller is configured to start the unload auger; and
      if the controller determines that the fill level exceeds the threshold, the controller is configured to drive the grain cart to a next location on the path toward the second end of the truck box.

2. The system of claim 1, wherein if the controller determines that the grain cart is not positioned near the first end of the truck box, the controller is configured to:
   drive the grain cart to the first end of the truck box;
   determine a fill level in the area based on the distance to the top edge of the truck box and the distance to the area in the truck box;
   determine whether the fill level exceeds the threshold; and
   if the controller determines that the fill level does not exceed the threshold, the controller is configured to start the unload auger.

3. The system of claim 2, wherein if the controller determines that the fill level exceeds the threshold, the controller is configured to drive the grain cart to a next location on the path toward the second end of the truck box.

4. The system of claim 1, wherein the controller is configured to:
   determine whether the grain cart is positioned near the second end of the truck box; and
   if the controller determines that the grain cart is positioned near the second end of the truck box, the controller is configured to stop the unload auger.

5. The system of claim 1, wherein the controller is configured to:
   determine an amount of crop material in the grain cart tank;
   determine whether the amount of crop material in the grain cart tank is below a minimum threshold; and
   if the controller determines that the amount of crop material in the grain cart is below the minimum threshold, the controller is configured to stop the unload auger.

6. A system for controlling a grain cart relative to a grain truck, wherein the grain cart includes a grain tank and an unload auger configured to transfer crop material out of the grain tank, wherein the grain truck includes a truck box extending from a first end to a second end, wherein the truck box includes a top edge extending around the top of the truck box, the system comprising:
a ranging device configured to;
   identify a distance to the top edge of the truck box; and
   identify a distance to an area in the truck box; and
a controller configured to:
   identify a configuration of the grain truck;
   determine a fill strategy based on the configuration of the grain truck;
   drive the grain cart to one of the first and the second end of the truck box based on the fill strategy;
   drive the grain cart along a path from the one of the first and the second ends of the truck box to another one of the first and the second ends of the truck box;
   determine a fill level in the area based on the distance to the top edge of the truck box and the distance to the area in the truck box;
   determine whether the fill level exceeds a threshold;
   if the controller determines that the fill level does not exceed the threshold, the controller is configured to start the unload auger; and
   if the controller determines that the fill level exceeds the threshold, the controller is configured to drive the grain cart to a next location on the path toward the other one of the first and the second ends of the truck box.

7. The system of claim 6, wherein if the controller drove the grain cart to the next location on the path, the controller is configured to:
   determine a fill level in the area at the next location based on the distance to the top edge of the truck box and the distance to the area in the truck box;
   determine whether the fill level exceeds the threshold; and
   if the controller determines that the fill level does not exceed the threshold, the controller is configured to start the unload auger.

8. The system of claim 7, wherein if the controller determines that the fill level exceeds the threshold, the controller is configured to drive the grain cart to a next location toward the other one of the first and the second ends of the truck box.

9. The system of claim 6, wherein the controller is configured to:
   determine whether the grain cart is positioned near the other one of the first and the second ends of the truck box; and
   if the controller determines that the grain cart is positioned near the other one of the first and the second ends of the truck box, the controller is configured to stop the unload auger.

10. The system of claim 6, wherein the controller is configured to:
   determine an amount of crop material in the grain cart tank;
   determine whether the amount of crop material in the grain cart tank is below a minimum threshold; and
   if the controller determines that the amount of crop material in the grain cart is below the minimum threshold, the controller is configured to stop the unload auger.

* * * * *